(12) United States Patent
Lim et al.

(10) Patent No.: US 10,338,436 B2
(45) Date of Patent: Jul. 2, 2019

(54) METHOD OF MANUFACTURING CURVED LIQUID CRYSTAL DISPLAY DEVICE AND CURVED LIQUID CRYSTAL DISPLAY DEVICE

(71) Applicant: Samsung Display Co., Ltd., Yongin-si (KR)

(72) Inventors: Ho Lim, Suwon-si (KR); Jiphyo Hong, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 51 days.

(21) Appl. No.: 15/496,063

(22) Filed: Apr. 25, 2017

(65) Prior Publication Data

US 2018/0081243 A1 Mar. 22, 2018

(30) Foreign Application Priority Data

Sep. 22, 2016 (KR) .................. 10-2016-0121648

(51) Int. Cl.
| | |
|---|---|
| *G02F 1/1337* | (2006.01) |
| *C09K 19/56* | (2006.01) |
| *C09K 19/20* | (2006.01) |
| *C09K 19/34* | (2006.01) |
| *G02F 1/1335* | (2006.01) |
| *C09K 19/04* | (2006.01) |

(Continued)

(52) U.S. Cl.
CPC ........ *G02F 1/133723* (2013.01); *C09K 19/20* (2013.01); *C09K 19/3444* (2013.01); *C09K 19/3475* (2013.01); *C09K 19/56* (2013.01); *G02F 1/133788* (2013.01); *C09K 2019/0448* (2013.01); *C09K 2019/122* (2013.01); *C09K 2019/123* (2013.01); *C09K 2019/301* (2013.01); *C09K 2019/3004* (2013.01);

(Continued)

(58) Field of Classification Search
USPC ......... 428/1.1, 1.2, 1.26; 349/123, 127, 128, 349/130, 187; 427/162, 553
See application file for complete search history.

(56) References Cited

U.S. PATENT DOCUMENTS

| | | | |
|---|---|---|---|
| 2008/0284960 | A1 | 11/2008 | Sohn et al. |
| 2014/0306263 | A1 | 10/2014 | Garbar et al. |

(Continued)

FOREIGN PATENT DOCUMENTS

| | | |
|---|---|---|
| KR | 10-1234881 | 2/2013 |
| KR | 10-1350875 | 1/2014 |

(Continued)

*Primary Examiner* — Ruiyun Zhang
(74) *Attorney, Agent, or Firm* — H.C. Park & Associates, PLC

(57) ABSTRACT

Provided are a curved liquid crystal display device and a method of manufacturing thereof. The curved liquid crystal display device includes a bent first substrate, a second substrate which is disposed to opposite to the first substrate and bent, a liquid crystal layer disposed between the first substrate and the second substrate, a first alignment inducing layer disposed between the first substrate and the liquid crystal layer, and a second alignment inducing layer disposed between the second substrate and the liquid crystal layer. One of the first alignment inducing layer and the second alignment inducing layer includes a polymerized reactive mesogen, and the remaining alignment inducing layer includes a polyimide. Display quality of the device may be improved.

23 Claims, 13 Drawing Sheets

(51) Int. Cl.
  *C09K 19/12* (2006.01)
  *C09K 19/30* (2006.01)
(52) U.S. Cl.
  CPC ............... *C09K 2019/3009* (2013.01); *G02F 1/133512* (2013.01); *G02F 1/133514* (2013.01); *G02F 2001/133726* (2013.01); *G02F 2001/133742* (2013.01); *G02F 2001/133746* (2013.01); *Y10T 428/10* (2015.01); *Y10T 428/1005* (2015.01); *Y10T 428/1023* (2015.01)

(56) References Cited

U.S. PATENT DOCUMENTS

2014/0320448 A1  10/2014  Kim et al.
2015/0301368 A1  10/2015  Archetti et al.
2015/0322342 A1  11/2015  Archetti et al.
2016/0259212 A1* 9/2016  Yun ..................... C09K 19/56
2017/0045783 A1  2/2017  Lim
2017/0210993 A1  7/2017  Lim et al.

FOREIGN PATENT DOCUMENTS

| KR | 10-1403480     | 6/2014  |
| KR | 10-2014-0129805 | 11/2014 |
| KR | 10-1477291     | 12/2014 |
| KR | 10-2015-0105798 | 9/2015  |
| KR | 10-2016-0002599 | 1/2016  |
| KR | 10-2016-0067151 | 6/2016  |
| KR | 10-2016-0071301 | 6/2016  |
| KR | 10-2017-0088282 | 8/2017  |

\* cited by examiner

METHOD OF MANUFACTURING CURVED LIQUID CRYSTAL DISPLAY DEVICE AND CURVED LIQUID CRYSTAL DISPLAY DEVICE

CROSS-REFERENCE TO RELATED APPLICATION

This application claims priority from and the benefit of Korean Patent Application No. 10-2016-0121648, filed on Sep. 22, 2016, which is hereby incorporated by reference for all purposes as if fully set forth herein.

BACKGROUND

Field

The present disclosure herein relates to a method of manufacturing a curved liquid crystal display device and a curved liquid crystal display device. In particular, the present disclosure relates to a method of manufacturing a curved liquid crystal display device having different pretilt angles of liquid crystal compounds, respectively adjacent to an upper substrate and a lower substrate, and a curved liquid crystal display device having different pretilt angles of liquid crystal compounds, respectively adjacent to an upper substrate and a lower substrate.

Discussion of the Background

Generally, liquid crystal displays are classified as a twisted nematic mode liquid crystal display, an in-plane switching mode liquid crystal display, a vertical alignment mode liquid crystal display, etc., Liquid crystal molecules of a vertical alignment mode liquid crystal display align in a pre-determined direction when no electric field is applied to the liquid crystal layer. The longitudinal axes of these liquid crystal molecules are vertically aligned with respect to a substrate surface in this default state.

The alignment of liquid crystal molecules may be done via a rubbing method, a photo-aligning method, etc. are used. For a vertical alignment mode liquid crystal display, reactive mesogens may be used to align liquid crystal molecules in a pre-determined direction.

The above information disclosed in this Background section is only for enhancement of understanding of the background of the inventive concept, and, therefore, it may contain information that does not form the prior art that is already known in this country to a person of ordinary skill in the art.

SUMMARY

The present disclosure provides a manufacturing method of a curved liquid crystal display device, in which the pretilt angles of liquid crystal molecules, respectively adjacent to an upper substrate and a lower substrate are controlled differently.

The present disclosure also provides a curved liquid crystal display device having different pretilt angles of liquid crystal molecules, respectively adjacent to an upper substrate and a lower substrate.

Additional aspects will be set forth in the detailed description which follows, and, in part, will be apparent from the disclosure, or may be learned by practice of the inventive concept.

An exemplary embodiment of the inventive concept provides a method of manufacturing a curved liquid crystal display device. The method includes disposing an alignment solution on one of a first substrate and a second substrate opposing to each other to form a polyimide alignment layer, disposing a reactive mesogen between the first substrate and the second substrate, disposing a liquid crystal compound between the first substrate and the second substrate, forming an electric field between the first substrate and the second substrate, irradiating first ultraviolet rays at the reactive mesogen, and forming an alignment layer including the reactive mesogen polymerized by the first ultraviolet rays on a remaining substrate, among the first substrate and the second substrate, on which the polyimide alignment layer is not formed.

In an exemplary embodiment of the inventive concept, a curved liquid crystal display device includes a first bent substrate, a second bent substrate disposed facing the first substrate, a liquid crystal layer disposed between the first bent substrate and the second bent substrate. The liquid crystal layer includes first liquid crystal molecules disposed adjacent to the first bent substrate and second liquid crystal molecules disposed adjacent to the second bent substrate. The curved liquid crystal display device also includes a first alignment inducing layer disposed between the first bent substrate and the liquid crystal layer and a second alignment inducing layer disposed between the second bent substrate and the liquid crystal layer. One of the first alignment inducing layer and the second alignment inducing layer is formed by including a polymerized reactive mesogen, and the remaining alignment inducing layer is formed by including polyimide.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
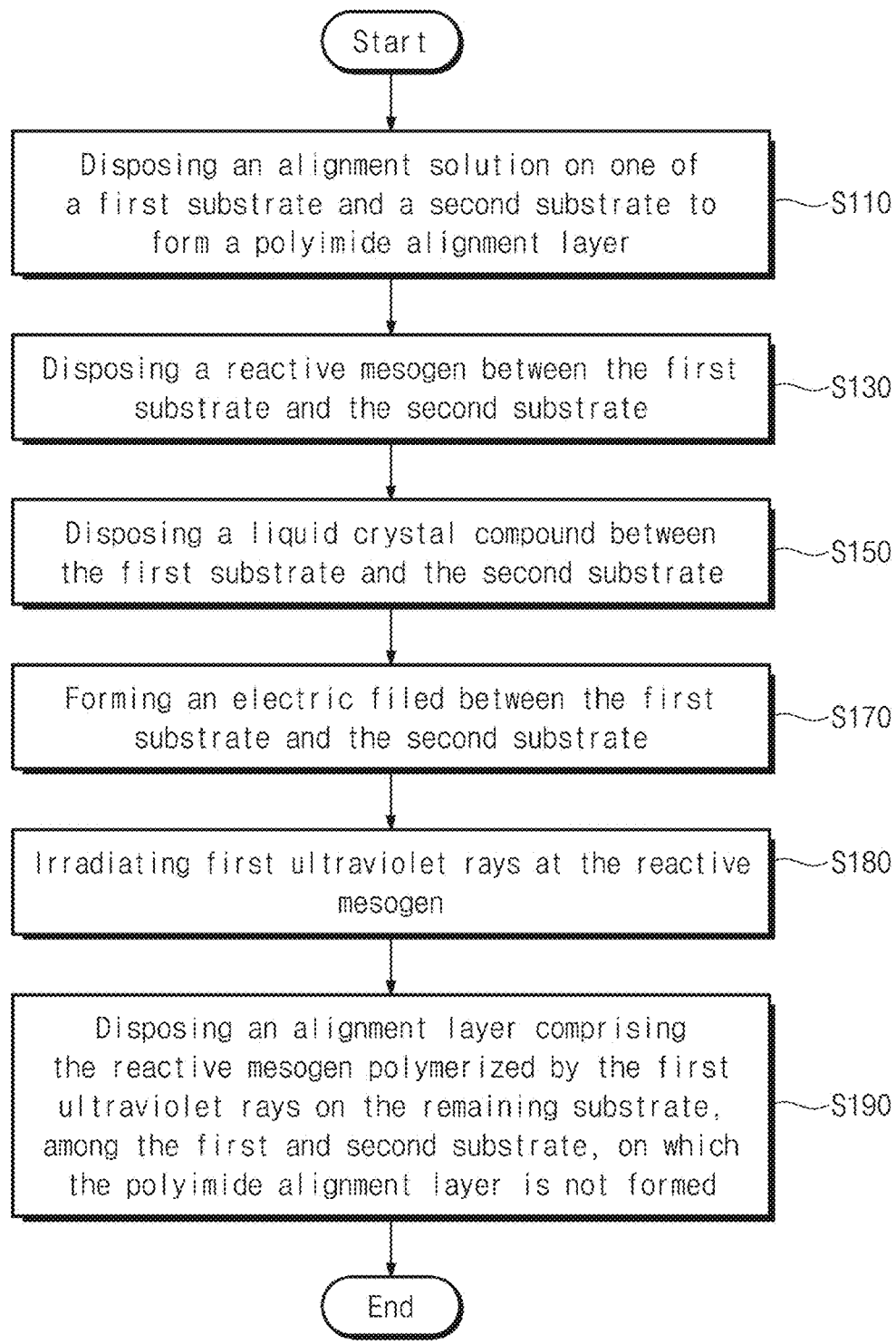
FIG. 1 is a flowchart for illustrating a method of manufacturing a curved liquid crystal display device according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z," "at least one selected from the group consisting of X, Y, and Z," and "at least one element selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. As such, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter a method of manufacturing a curved liquid crystal display device according to an exemplary embodiment and a curved liquid crystal display device according to an exemplary embodiment will be explained.

FIG. 1 is a flowchart for illustrating a method of manufacturing a liquid crystal display device according to an exemplary embodiment. A method of manufacturing a curved liquid crystal display device according to an exemplary embodiment may include disposing a polyimide alignment layer on one of a first substrate and a second substrate (S110), disposing a reactive mesogen between the first substrate and the second substrate (S130), disposing a liquid crystal compound between the first substrate and the second substrate (S150), forming an electric field between the first substrate and the second substrate (S170), irradiating first ultraviolet rays at the reactive mesogen (S180), and disposing an alignment layer including a polymerized reactive mesogen on a remaining substrate on which the polyimide alignment layer is not formed among the first substrate and the second substrate (S190).

The first substrate and the second substrate may be a flat substrate or a curved substrate.

In an exemplary embodiment the first substrate and the second substrate are flat substrates. In this case, the manufacturing method may further include a step of bending the first substrate and the second substrate. The first substrate may be a substrate bent to have a first radius of curvature and the second substrate may be a substrate bent to have a second radius of curvature. The first radius of curvature may be greater than or equal to the second radius of curvature.

The step of bending the first substrate and the second substrate may be conducted after the step of forming an alignment layer including a polymerized reactive mesogen. Alternatively, the step of bending the first substrate and the second substrate may be conducted after the step of forming a polyimide alignment layer. However, exemplary embodiments of the inventive concept are not limited thereto, and the step of bending the first substrate and the second substrate for manufacturing a curved liquid crystal display device may be conducted in another step altogether.

In the step of disposing a polyimide alignment layer (S110), an alignment solution may be provided on one of the first substrate and the second substrate. The alignment solution provided may be a polyimide alignment solution. The alignment solution may be provided on the first substrate or the second substrate. A thermal curing process may be conducted to form a polyimide alignment layer on either the first substrate or the second substrate. The alignment solution may include a compound containing a vertical alignment group. The polyimide alignment layer may be formed to have a vertical alignment group.

In addition, the first substrate and the second substrate may include a pixel electrode and a common electrode, respectively. On the first substrate, the pixel electrode may be disposed, and on the second substrate, the common electrode may be disposed. The alignment solution may be provided on the pixel electrode or the common electrode.

In the step of disposing a reactive mesogen between the first substrate and the second substrate (S130), the reactive mesogen may be provided together with the alignment solution or together with a liquid crystal compound at the step of providing a liquid crystal compound between the first substrate and the second substrate (S150), which will be described hereinafter.

The reactive mesogen may be a compound containing a vertical alignment group for aligning a liquid crystal compound. The reactive mesogen may be overlapped to form an alignment layer. The reactive mesogen may be a compound having a polymerizable group. The reactive mesogen used in the method of manufacturing a curved liquid crystal display device according to an exemplary embodiment will be explained in detail below.

In an exemplary embodiment, a step of disposing a liquid crystal compound between the first substrate and the second substrate (S150) is conducted after conducting the step of disposing a reactive mesogen (S130). Alternatively, the step of providing a reactive mesogen (S130) and the step of providing a liquid crystal compound (S150) may be conducted in one step. For example, the step of disposing a reactive mesogen (S130) and the step of disposing a liquid crystal compound (S150) may be conducted at the same time.

The liquid crystal compound may include a plurality of liquid crystal molecules. The liquid crystal compound may be vertically aligned liquid crystal molecules which are aligned substantially vertically with respect to a curved substrate. The liquid crystal compound may include nematic liquid crystal molecules. The liquid crystal compound may be one liquid crystal molecule or may include a plurality of different liquid crystal molecules.

For example, the liquid crystal compound may include at least one of the following L-1 to L-10.

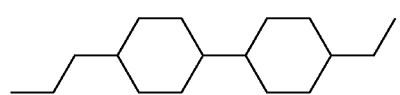

L-1

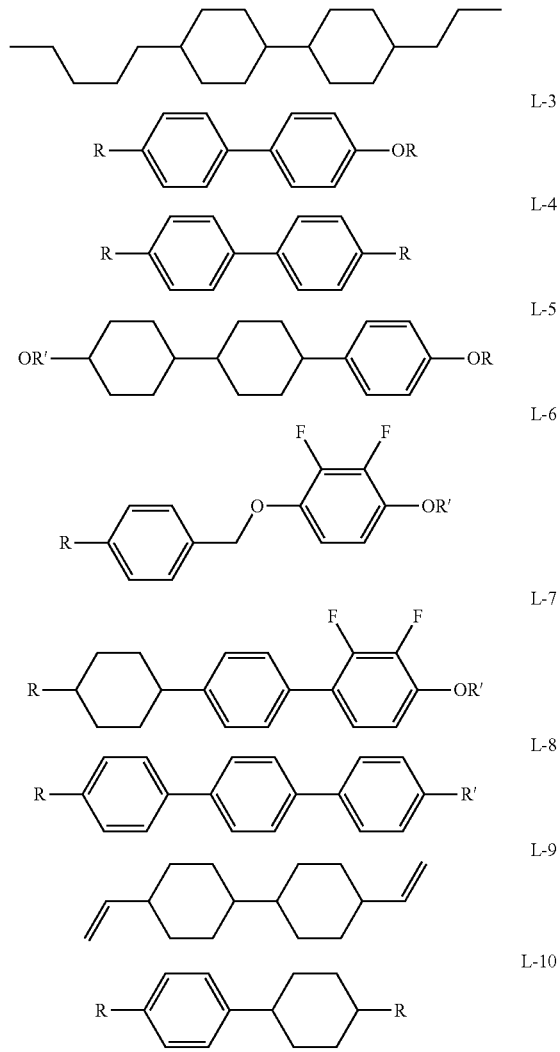

A liquid crystal compound may be provided between the first substrate and the second substrate by a liquid crystal dropping method or a liquid crystal injection method. However, an embodiment of the inventive concept is not limited thereto, and any method for supplying a liquid crystal compound into a space provided between the first substrate and the second substrate may be used, without limitation.

In the case where a liquid crystal compound is provided using a liquid crystal dropping method, the liquid crystal compound may be provided on one substrate among the first substrate and the second substrate prior to attaching the first substrate to the second substrate or vice versa. For example, the liquid crystal compound may be provided on a substrate on which a polyimide alignment layer is not formed.

The liquid crystal compound provided on one substrate, among the first substrate and the second substrate, may be provided by dropping only on one region of the substrate. After that, the provided liquid crystal compound may be diffused and distributed on the whole substrate. For example, the liquid crystal compound may be diffused and distributed via the alignment and attachment of the first substrate and the second substrate, and the application of a pressure thereto. In this case, the liquid crystal compound may be diffused to be distributed on the whole display area of a liquid crystal display device.

Meanwhile, in the case where a liquid crystal compound is provided using a liquid crystal injection method, the first substrate and the second substrate may be provided in a state of attachment prior to the injection of the liquid crystal compound. The liquid crystal compound may be provided via a liquid crystal inlet formed between the attached first substrate and second substrate. For example, the liquid crystal compound may be provided between the first substrate and the second substrate in a vacuum chamber.

When disposing a reactive mesogen (S130) and disposing a liquid crystal compound (S150) are conducted in one step, the reactive mesogen may be blended with the liquid crystal compound and the blend of reactive mesogen and liquid crystal compound may be provided between the first substrate and the second substrate. Accordingly, the reactive mesogen, together with the liquid crystal compound, may be disposed between the first substrate and the second substrate by a liquid crystal dropping method or a liquid crystal injection method.

The reactive mesogen may be provided together with an alignment solution. For example, forming a polyimide alignment layer by disposing an alignment solution on one of the first substrate and the second substrate (S110) and disposing a reactive mesogen between the first substrate and the second substrate (S130) may be conducted in one step. That is, the reactive mesogen may be provided together with the alignment solution.

After disposing a reactive mesogen (S130) and disposing a liquid crystal compound (S150), heat may be provided to the reactive mesogen and the liquid crystal compound. The step of providing heat may be a step of annealing the reactive mesogen and the liquid crystal compound.

The reactive mesogen provided between the first substrate and the second substrate may move to a substrate on which a polyimide alignment layer is not formed. For example, after the annealing step, the reactive mesogen may move to a curved substrate on which the polyimide alignment layer is not formed and may be disposed and adsorbed onto the substrate. In this case, the reactive mesogen may be adsorbed onto an electrode layer disposed on the substrate.

After disposing a reactive mesogen (S130) disposing a liquid crystal compound (S150), an electric field may be formed between the first substrate and the second substrate (S170).

An electric field may be formed by a voltage difference at the first substrate compared to the second substrate. With the formation of the electric field between the first substrate and the second substrate, the liquid crystal molecules of the liquid crystal compound may be aligned with a predetermined pretilt angle with respect to a curved substrate.

After the step of forming an electric field between the first substrate and the second substrate (S170), first ultraviolet rays may be irradiated at the reactive mesogen (S180). Forming an electric field between the first substrate and the second substrate (S170) and irradiating first ultraviolet rays at the reactive mesogen (S180) may be conducted in one step. For example, the forming an electric field (S170) and irradiating first ultraviolet rays (S180) may be done at the same time.

The first ultraviolet rays may be irradiated at the reactive mesogen to polymerize the reactive mesogen. The polymerized reactive mesogen may form an alignment layer on a remaining substrate on which a polyimide alignment layer is not formed among the first substrate and the second substrate. The alignment layer may be aligned so that the liquid crystal molecules of the liquid crystal compound may have a certain pretilt angle. For example, the polymerized reactive mesogen may play the role of an alignment layer for vertically aligning liquid crystal molecules.

The electric field formed between the first substrate and the second substrate may be maintained during a time period of irradiating the first ultraviolet rays. After the reactive mesogen is polymerized by the first ultraviolet rays and forms an alignment layer, the electric field is removed. The liquid crystal molecules may maintain their pretilt angle after the electric filed is removed.

After forming the alignment layer using the polymerized reactive mesogen, the electric field formed between the first substrate and the second substrate may be removed. After removing the electric field, second ultraviolet rays may be irradiated at a curved liquid crystal display device. The second ultraviolet rays may be irradiated at the alignment layer formed using the polymerized reactive mesogen, a liquid crystal compound, and an unreacted reactive mesogen.

The second ultraviolet rays may be ultraviolet rays having a different wavelength region from the first ultraviolet rays. Alternatively, the second ultraviolet rays and the first ultraviolet rays may have the same wavelength region. In this case, the dosage of the second ultraviolet rays may be smaller than the dosage of the first ultraviolet rays. That is, the intensity of the second ultraviolet rays may be weaker than the intensity of the first ultraviolet rays.

By irradiating the second ultraviolet rays at the liquid crystal compound and the reactive mesogen, the amount of an unreacted and remaining reactive mesogen may decrease. Accordingly, by irradiating second ultraviolet rays, in addition to irradiating first ultraviolet rays, the generation of impurities in a liquid crystal layer disposed between the first substrate and the second substrate may be minimized. Accordingly, the display quality of a display device may be improved, and excellent reliability characteristics may be attained.

The reactive mesogen used in the method of manufacturing a curved liquid crystal display device according to an exemplary embodiment may include a polymerization reactive group and an alignment inducing group for aligning a liquid crystal compound. In an exemplary embodiment, the reactive mesogen may include at least one of a first reactive mesogen represented by the following Formula 1 and a second reactive mesogen represented by the following Formula 2.

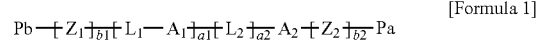

[Formula 1]

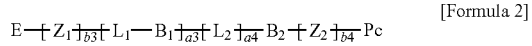

[Formula 2]

In Formulas 1 and 2, $A_1$, $A_2$, $B_1$, and $B_2$ are each independently a substituted or unsubstituted divalent hydrocarbon ring, or a substituted or unsubstituted divalent heterocycle. In addition, a1, a3, b1, b2, b3, and b4 are each independently an integer of 0 to 6, and a2 and a4 are each independently 0 or 1.

However, in the case where a1, b1, and b2 are an integer of 2 or more, $A_1$-$L_1$, $Z_1$, and $Z_2$ may be obtained by connecting the same or different groups. For example, in the case where b1 is 2 or more, $Z_1$ may be obtained by repeating one of the subsequently described examples of $Z_1$ or by connecting different compounds subsequently illustrated. In addition, the same may apply to the case where a2 is 2 or more ($A_1$-$L_1$) and b2 is 2 or more ($Z_2$).

In the description on Formulas 1 and 2 and in the description of chemical formulas below, the term "substituted or unsubstituted" corresponds to substituted or unsubstituted with at least one substituent selected from the group consisting of a deuterium atom, a halogen atom, a cyano group, a nitrile group, a nitro group, an amino group, a silyl group, a boron group, a phosphine oxide group, an alkyl group, an alkenyl group, a fluorenyl group, an aryl group, and a heterocycle. In addition, each of the substituents may be substituted or unsubstituted. For example, a biphenyl group may be interpreted as an aryl group, or a phenyl group substituted with a phenyl group.

In addition, the terms "forming a ring via the combination of adjacent groups" may mean forming a substituted or unsubstituted hydrocarbon ring, or substituted or unsubstituted heterocycle via the combination of adjacent groups. The hydrocarbon ring includes an aliphatic hydrocarbon ring and an aromatic hydrocarbon ring. The heterocycle includes an aliphatic heterocycle and an aromatic heterocycle. The hydrocarbon ring and the heterocycle may be a monocycle or a polycycle. In addition, a ring formed via the combination of adjacent groups may be combined with another ring to form a spiro structure.

In the description on Formulas 1 and 2 and in the description of chemical formulas in the present disclosure below, the terms "an adjacent group" may mean a substituent substituted for an atom which is directly combined with an atom substituted with a corresponding substituent, another substituent substituted for an atom which is substituted with a corresponding substituent, or a substituent sterically positioned at the nearest position to a corresponding substituent. For example, in 1,2-dimethylbenzene, two methyl groups may be interpreted as "adjacent groups" to each other, and in 1,1-diethylcyclopentene, two ethyl groups may be interpreted as "adjacent groups" to each other.

In the description of chemical formulas in the present disclosure below, the halogen may include at least one of fluorine, chlorine, bromine, and iodine.

In addition, the alkyl may be a linear, branched, or cyclic type. The carbon number of the alkyl may be from 1 to 30, from 1 to 20, from 1 to 10, or from 1 to 6. The alkyl may include methyl, ethyl, n-propyl, isopropyl, n-butyl, s-butyl, t-butyl, i-butyl, 2-ethylbutyl, 3,3-dimethylbutyl, n-pentyl, i-pentyl, neopentyl, t-pentyl, cyclopentyl, 1-methylpentyl, 3-methylpentyl, 2-ethylpentyl, 4-methyl-2-pentyl, n-hexyl, 1-methylhexyl, 2-ethylhexyl, 2-butylhexyl, cyclohexyl, 4-methylcyclohexyl, 4-t-butylcyclohexyl, n-heptyl, 1-methylheptyl, 2,2-dimethylheptyl, 2-ethylheptyl, 2-butylheptyl, n-octyl, t-octyl, 2-ethyloctyl, 2-butyloctyl, 2-hexyloctyl, 3,7-dimethyloctyl, cyclooctyl, n-nonyl, n-decyl, adamantyl, 2-ethyldecyl, 2-butyldecyl, 2-hexyldecyl, 2-octyldecyl, n-undecyl, n-dodecyl, 2-ethyldodecyl, 2-butyldodecyl, 2-hexyldocecyl, 2-octyldodecyl, n-tridecyl, n-tetradecyl, n-pentadecyl, n-hexadecyl, 2-ethylhexadecyl, 2-butylhexadecyl, 2-hexylhexadecyl, 2-octylhexadecyl, n-heptadecyl, n-octadecyl, n-nonadecyl, n-eicosyl, 2-ethyleicosyl, 2-butyleicosyl, 2-hexyleicosyl, 2-octyleicosyl, n-henicosyl, n-docosyl, n-tricosyl, n-tetracosyl, n-pentacosyl, n-hexacosyl, n-heptacosyl, n-octacosyl, n-nonacosyl, n-triacontyl, etc., without limitation.

In the description of chemical formulas in the present disclosure, the aryl may be monocyclic aryl or polycyclic aryl. The explanation of the arylene may be the same as that of the aryl except that the arylene is divalent. The aryl may be monocyclic aryl or polycyclic aryl. The carbon number for forming a ring in the aryl may be 6 to 30, 6 to 20, or 6 to 15. Examples of the aryl may include phenyl, naphthyl, anthracenyl, phenanthryl, biphenyl, terphenyl, quaterphenyl, quinqphenyl, sexiphenyl, triphenylene, pyrenyl, fluorenyl, benzofluoranthenyl, chrysenyl, etc. However, exemplary embodiments of the aryl is not limited thereto. In addition, the aryl may be substituted or unsubstituted. In the substituted aryl, two substituents may combine with each other to form a spiro structure. For example, in the case where fluorenyl group is substituted,

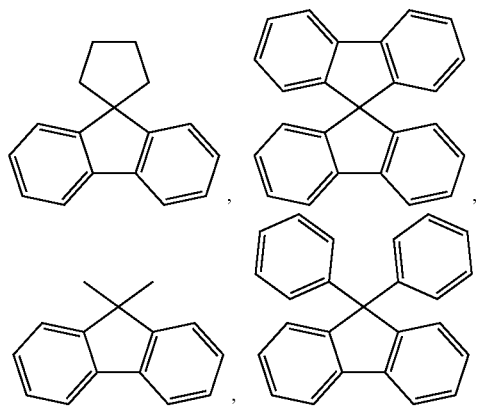

etc. may be obtained. However, exemplary embodiments are not limited thereto.

The heteroaryl may be heteroaryl including at least one of O, N, or S as a heteroatom. The carbon number for forming a ring of the heteroaryl may be 2 to 30, or 2 to 20. Examples of the heteroaryl may include thiophene, furan, pyrrole, imidazole, thiazole, oxazole, oxadiazole, triazole, pyridyl, bipyridyl, pyrimidyl, triazine, triazole, acridyl, pyridazine, pyrazinyl, quinolinyl, quinazoline, quinoxalinyl, phenoxazyl, phthalazinyl, pyrido pyrimidinyl, pyrido pyrazinyl, pyrazino pyrazinyl, isoquinoline, indole, carbazole, N-arylcarbazole, N-heteroarylcarbazole, N-alkylcarbazole, benzoxazole, benzoimidazole, benzothiazole, benzocarbazole, benzothiophene, dibenzothiophene, thienothiophene, benzofuranyl, phenanthroline, thiazolyl, isooxazolyl, oxadiazolyl, thiadiazolyl, benzothiazolyl, phenothiazinyl, dibenzufuranyl, etc., without limitation.

In the description on the chemical formulas, explanation on the aryl may be applied to the arylene except that the arylene is a divalent group. In addition, the divalent group of biphenyl which is an aryl group may be represented by divalent biphenyl.

In the description on the chemical formulas, explanation on the arylene may be applied to aryl except that the arylene is a divalent group. In addition, the divalent of a phenyl group which is an aryl group may be represented by a divalent biphenyl group.

In the description on the chemical formulas, explanation on the heteroarylene may be applied to heteroaryl except that the heteroarylene is a divalent group. In the description, "-*" may mean a connecting part in a compound.

The first reactive mesogen represented by Formula 1 may have polymerizable groups at both terminals with the core parts $A_1$ and $A_2$ at the center part. In addition, the second reactive mesogen represented by Formula 2 may have a polymerizable group only at one terminal thereof. The second reactive mesogen may have a polymerizable group represented by Pc at one terminal and an anchoring group represented by E at the other terminal with core parts $B_1$ and $B_2$ at the center part. The anchoring group may be a bonding group which causes the adsorption of the reactive mesogen onto the substrate.

$A_1$, $A_2$, $B_1$, and $B_2$ are each independently a substituted or unsubstituted aromatic ring having 6 to 30 carbon atoms for forming a ring, a substituted or unsubstituted heteroaromatic ring having 2 to 30 carbon atoms for forming a ring, a substituted or unsubstituted aliphatic ring having 5 to 30 carbon atoms for forming a ring, or a substituted or unsubstituted heteroaliphatic ring having 2 to 30 carbon atoms for forming a ring. Meanwhile, heteroatoms in the heterocycle may be O, N, or S. In addition, $A_1$, $A_2$, $B_1$, and $B_2$ may be a polycyclic ring, and the polycyclic ring may be a condensed ring formed via the bonding of adjacent rings or a substituent with an adjacent ring.

$A_1$, $A_2$, $B_1$, and $B_2$ may be a divalent ring compound, for example, a substituted or unsubstituted arylene having 6 to 30 carbon atoms for forming a ring, or a substituted or unsubstituted heteroarylene having 2 to 30 carbon atoms for forming a ring. In addition, $A_1$, $A_2$, $B_1$, and $B_2$ may be a divalent substituted or unsubstituted cycloalkane or cycloalkene having 5 to 30 carbon atoms for forming a ring or a divalent substituted or unsubstituted heterocycloalkane or heterocycloalkene having 2 to 30 carbon atoms for forming a ring.

Meanwhile, in the case where a1 is an integer of 2 or more, $A_1$-$L_1$ may be obtained by repeating the same group. Alternatively, $A_1$-$L_1$ may be obtained by connecting different groups.

In the first reactive mesogen represented by Formula 1, A1 and A2 may be each independently selected from the following ring compounds of A-1 to A-35.

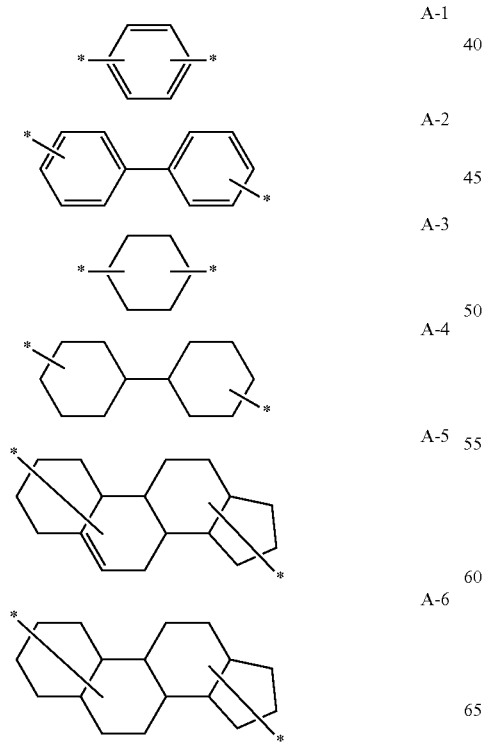

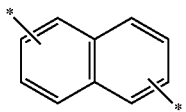

A-7

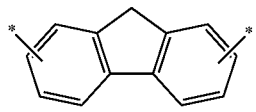

A-8

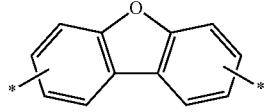

A-9

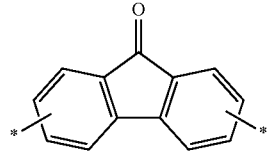

A-10

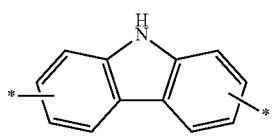

A-11

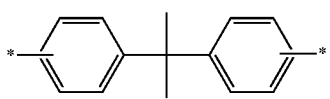

A-12

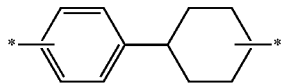

A-13

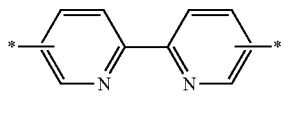

A-14

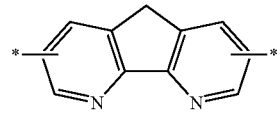

A-15

A-16

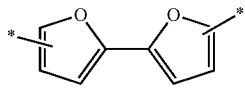

A-17

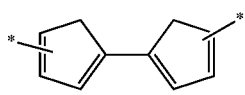

A-18

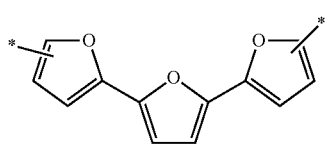

A-19

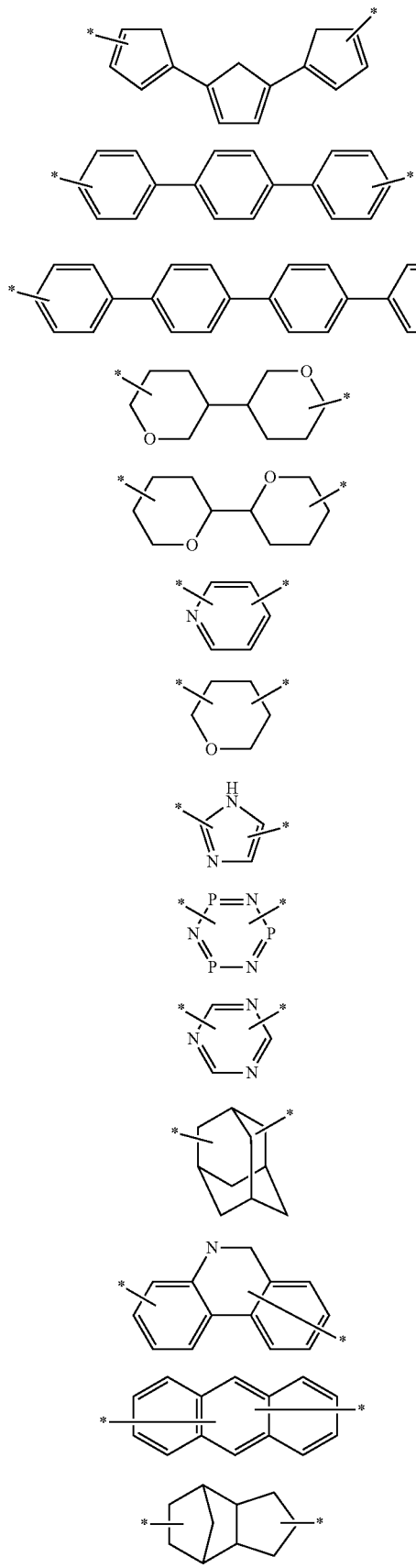

$A_1$ and $A_2$ may be each independently substituted with at least one of a deuterium atom, a halogen atom, —OH, —SH, —NH$_2$, —CN, —CF$_3$, —B(OH)$_2$, or —R$^0$(CH$_2$)$_r$R$^1$. Here, R$^0$ may be one of —O—, —NH—, —S—, —C=O—, or —O—C=O—, R$_1$ may be one of —OH, —NH$_2$, —CN, —CF$_3$, —B(OH)$_2$, —SH, and —CH$_3$, and r may be an integer of 1 to 12.

In the first reactive mesogen represented by Formula 1, the substituent for $A_1$ and $A_2$ may play the role of a bonding group which causes the adsorption of the first reactive mesogen onto the substrate. For example, the substituent for $A_1$ and $A_2$ may be a bonding group for making a hydrogen bond of the first reactive mesogen with a transparent electrode provided on a curved substrate in a curved liquid crystal display device which will be described below.

$L_1$ and $L_2$ may be each independently a direct linkage, —O—, —S—, —CO—, —COO—, —OCOO—, —O(CH$_2$)$_{k1}$—, —S(CH$_2$)$_{k1}$—, —O(CF$_2$)$_{k1}$—, —S(CF$_2$)$_{k1}$—, —(CH$_2$)$_{k1}$—, —CF$_2$CH$_2$—, —(CF$_2$)$_{k1}$, —CH=CH—, —CF=CF—, —C≡C—, —CH=CH—COO—, or —(CH$_2$)$_{k1}$—COO—(CH$_2$)$_{k2}$—O—. Here, k1 and k2 may be each independently an integer of 0 to 4.

$L_1$ and $L_2$ may be a connecting group for connecting $A_1$ and $A_2$, which are core groups, with each other. Alternatively, $L_1$ and $L_2$ may be a connecting group for connecting $A_1$ and $A_2$, which are core groups with polymerizable groups Pa and Pb, which are terminal reactive groups.

Exemplary embodiments of $L_1$ and $L_2$ are not limited to the suggested connecting groups, and combination order may be changed. For example, —O(CH$_2$)$_{k1}$— may include —(CH$_2$)$_{k1}$O—. This may be applied to other suggested connecting groups.

$Z_1$ and $Z_2$ may be each independently a direct linkage, —O—, —S—, —CO—, —COO—, —OCOO—, —O(CH$_2$)$_{m1}$—, —S(CH$_2$)$_{m1}$—, —O(CF$_2$)$_{m1}$—, —S(CF$_2$)$_{m1}$—, —(CH$_2$)$_{m1}$—, —CF$_2$CH$_2$—, —(CF$_2$)$_{m1}$, —CH=CH—, —CF=CF—, —C≡C—, —CH=CH—COO—, —(CH$_2$)$_{m1}$—COO—, —(CH$_2$)$_{m1}$—COO—(CH$_2$)$_{m2}$—O—, —CH—(S$_p$—Pa)—, —CH$_2$CH—(S$_p$—Pa)—, or —(CH—(S$_p$—Pa)—CH—(S$_p$—Pa))—. In this case, m1 and m2 may be each independently an integer of 0 to 4. S$_p$ may be a direct linkage or a spacer group, and Pa may be a polymerizable group.

The spacer group may be a connecting group between a core group (for example, $A_2$) and a polymerizable group, or a core group and an anchoring group. For example, the spacer group may be alkyl having 1 to 12 carbon atoms, or alkoxy having 1 to 12 carbon atoms. However, an embodiment is not limited thereto, and the spacer group may be, for example, —(CH$_2$)$_{i1}$—, —(CH$_2$CH$_2$O)$_{i1}$—CH$_2$CH$_2$—, —CH$_2$CH$_2$—S—CH$_2$CH$_2$—, —CH$_2$CH$_2$—NH—CH$_2$CH$_2$—, or —(SiR$^2$R$^3$—O)$_{i1}$—. In this case, R$^2$ and R$^3$ may be each independently a hydrogen atom, or alkyl having 1 to 12 carbon atoms, and i1 may be an integer of 1 to 12.

In Formula 1, L$_1$ to L$_2$, and Z$_1$ to Z$_2$ may be connecting groups. In addition, Z$_1$ to Z$_2$ may be spacer groups connected with a polymerizable group, Pa or Pb. Meanwhile, a

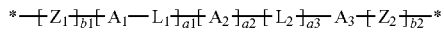

part in Formula 1 may be a vertical alignment group for aligning a liquid crystal compound.

In Formula 1, Pa and Pb may be polymerizable groups. Pa and Pb may be polymerizable reactive groups. For example, Pa and Pb may be reactive groups for chain polymerization. Particularly, Pa and Pb may be reactive groups containing a —C=C— double bond or a —C≡C— triple bond.

In Formula 1, Pa and Pb may be each independently one polymerizable group among P-1 to P-10. In P-10, p may be an integer of 1 to 20. However, a case where both Pa and Pb are P-10 is excluded. That is, in the case where Pa is P-10, Pb may be any one selected from P-1 to P-9, and in the case where Pb is P-10, Pa may be any one selected from P-1 to P-9.

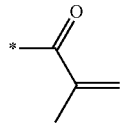 P-1

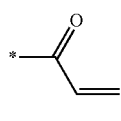 P-2

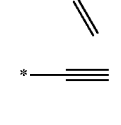 P-3

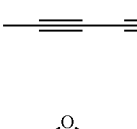 P-4

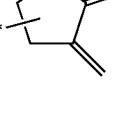 P-5

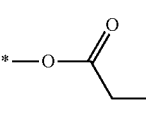 P-6

 P-7

-continued

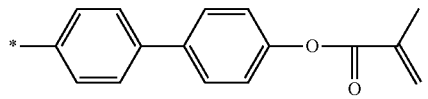 P-8

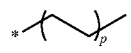 P-9

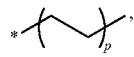 P-10

That is, both terminals of the first reactive mesogen represented by Formula 1 may have polymerizable groups. In addition, in the case where one of Pa and Pb is

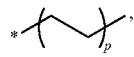, only one terminal may have a polymerizable group.

The first reactive mesogen may be one compound among the following Compounds (1-1) to (1-3). However, an embodiment of the inventive concept is not limited thereto. The first reactive mesogen may be a reactive mesogen having polymerizable reactive groups at both terminals thereof and a vertical alignment group between the polymerizable reactive groups.

(1-1)

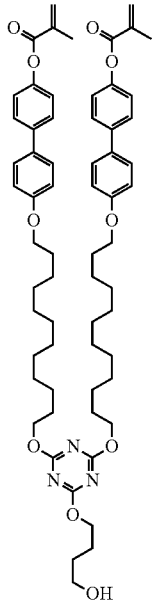

(1-2)
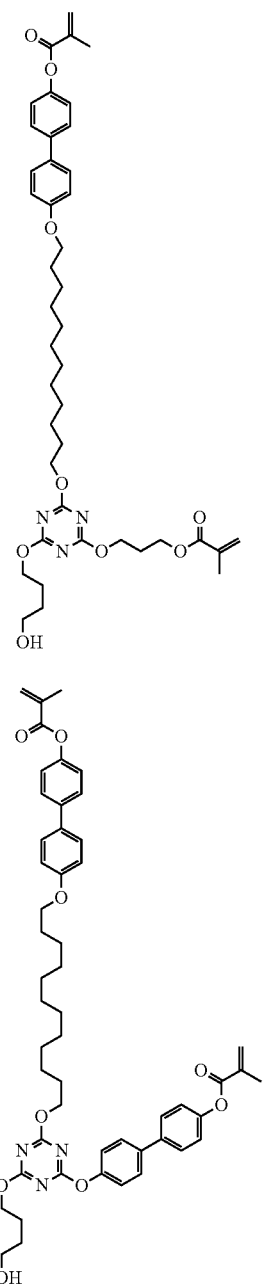
(1-3)
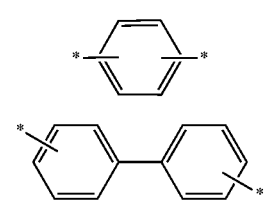
In the second reactive mesogen represented by Formula 2, $B_1$ and $B_2$ are each independently selected from substituted or unsubstituted ring compounds of the following A-1 to A-22.
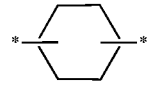
A-1
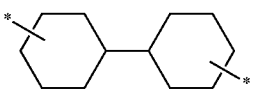
A-2
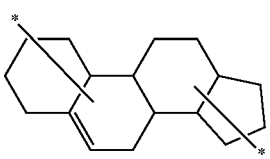
A-3
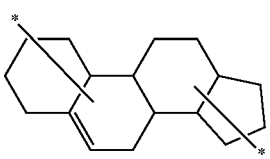
A-4
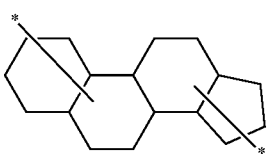
A-5
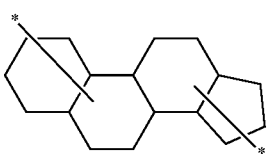
A-6
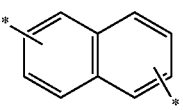
A-7
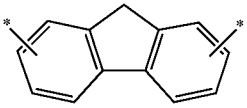
A-8
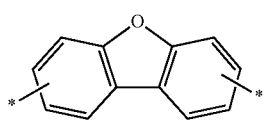
A-9
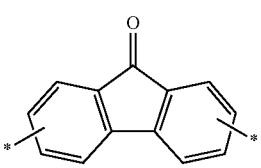
A-10
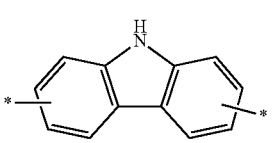
A-11
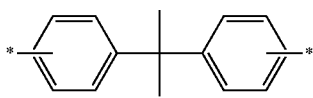
A-12
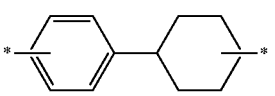
A-13
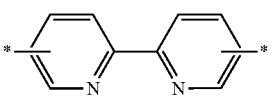
A-14

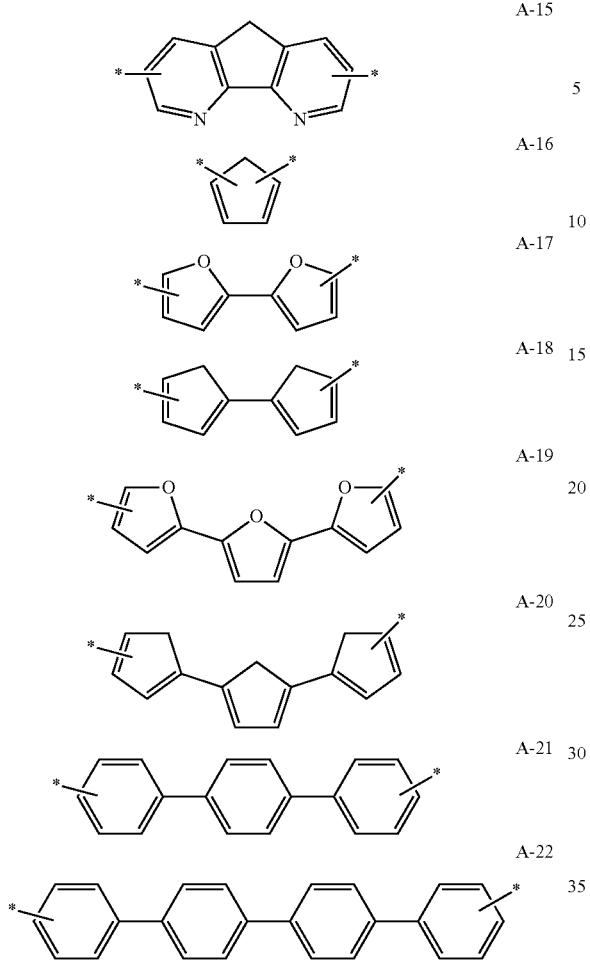

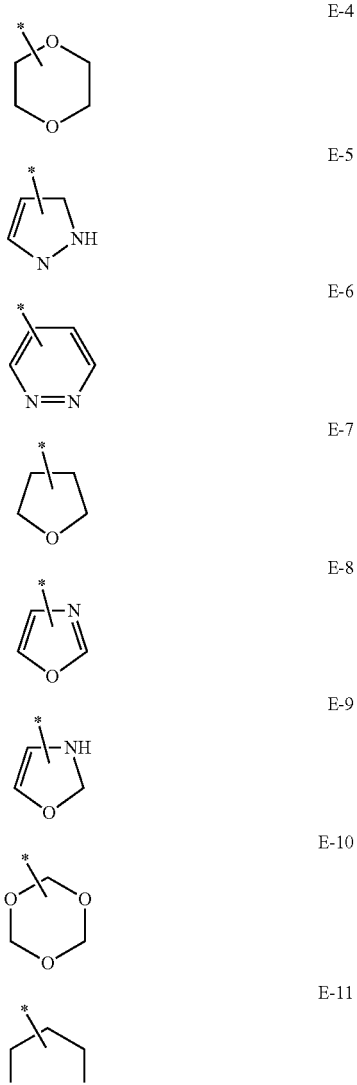

In Formula 2, $L_1$ to $L_2$, and $Z_1$ to $Z_2$ may be connecting groups. $L_1$ to $L_2$, and $Z_1$ to $Z_2$ of Formula 2 may be the same as defined in Formula 1. The same explanation on $L_1$ to $L_2$, and $Z_1$ to $Z_2$ in Formula 1 may be applied for $L_1$ to $L_2$, and $Z_1$ to $Z_2$ in Formula 2.

Meanwhile, E may be an anchoring group in Formula 2. E may be a hydrogen bonding group including at least one of nitrogen or oxygen.

For example, E in Formula 2 may be selected from the heterocycles of the following E-1 to E-19.

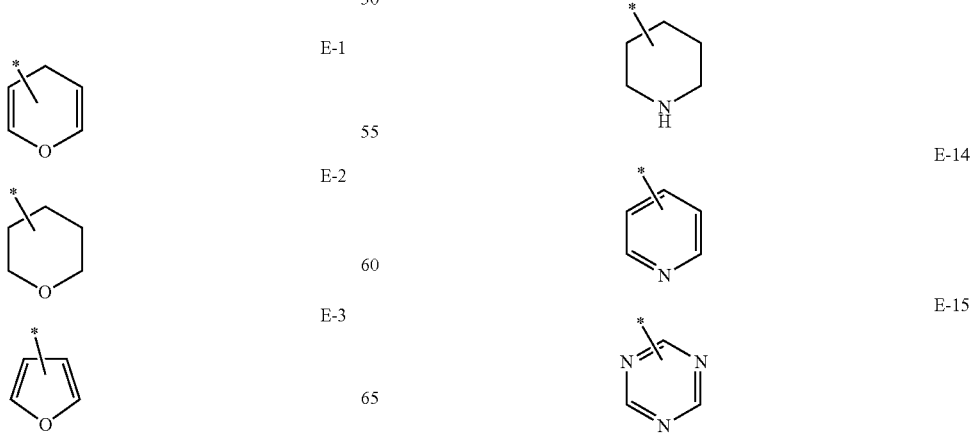

-continued
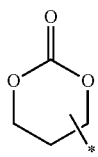
E-16
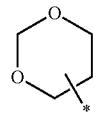
E-17
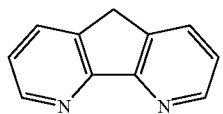
E-18
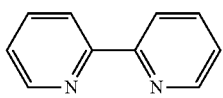
E-19
In Formula 2, E may be selected from substituted or unsubstituted triazine compounds and triazine derivatives of the following E-20 to E-30.
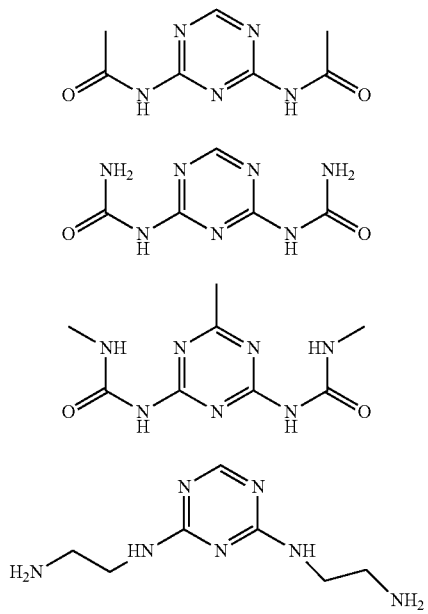
E-20
E-21
E-22
E-23
E-24
E-25
-continued
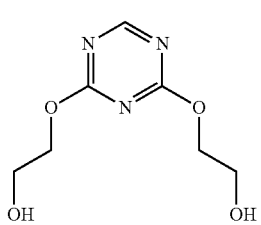
E-26
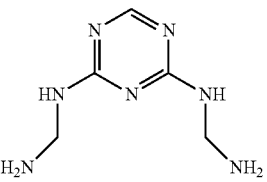
E-27
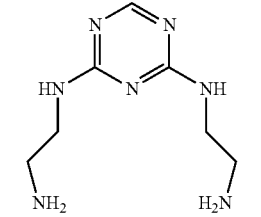
E-28
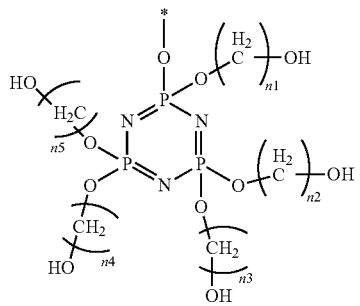
E-29
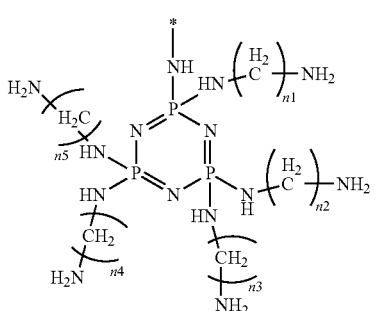
E-30
In addition, E in Formula 2 may be selected from any amine compound of the following E-31 to E-41.
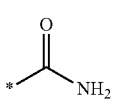
E-31
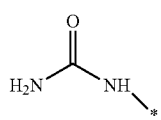
E-32

-continued

E-33 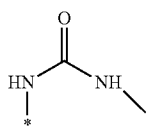

E-34 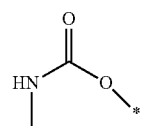

E-35 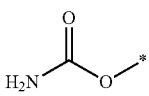

E-36 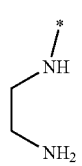

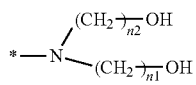

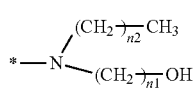

E-40 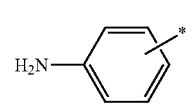

E-41 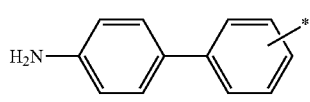

In addition, E in Formula 2 may be selected from any amine compound of the following E-42 to E-47.

E-42 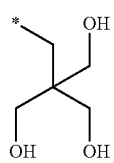

E-43 

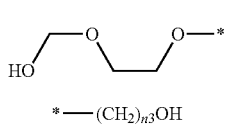

E-45

E-46 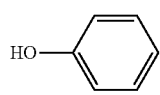

-continued

E-47 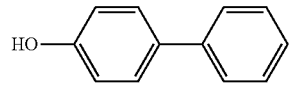

In the second reactive mesogen represented by Formula 2, Pc may be a polymerizable reactive group. For example, Pc may be a reactive group for a chain polymerization. Particularly, Pc may be a reactive group containing a —C=C— double bond or a —C≡C— triple bond.

Pc may be any one selected from P-1 to P-9.

P-1 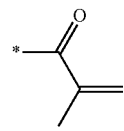

P-2 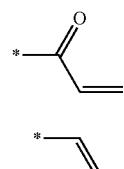

P-3 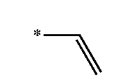

P-4 

P-5 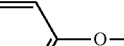

P-6 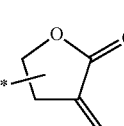

P-7 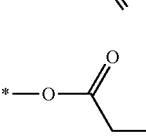

P-8 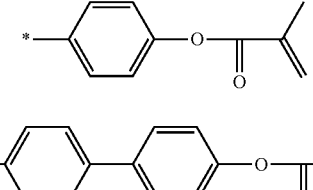

P-9 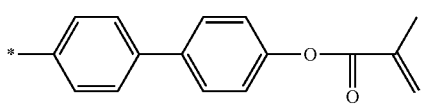

The second reactive mesogen represented by Formula 2 may be any compound of the following Compounds (2-1) to (2-5). However, an exemplary embodiment of the inventive concept is not limited thereto. The second reactive mesogen may be a reactive mesogen having a polymerizable reactive group at one terminal thereof, a functional group capable of forming a hydrogen bond at the other terminal, and a vertical alignment group between the polymerizable reactive group and the functional group for forming a hydrogen bond.

(2-1)
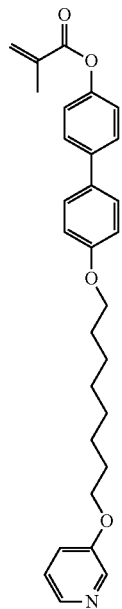
(2-2)
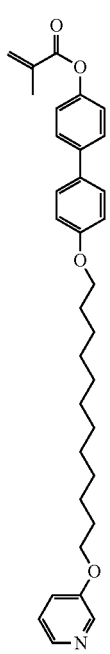
(2-3)
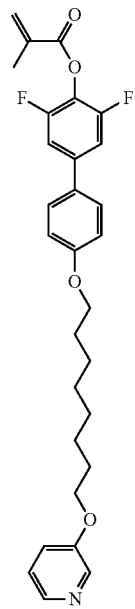
(2-4)

-continued (2-5)

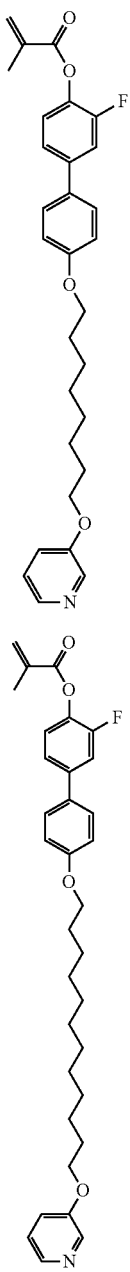

(2-6)

Meanwhile, the reactive mesogen containing the first reactive mesogen represented by Formula 1 and the second reactive mesogen represented by Formula 2 may be provided in an amount of about 0.05 to about 0.9 parts by weight on the basis of about 100 parts by weight of the liquid crystal compound.

In the case where the amount included of the reactive mesogen is less than about 0.05 parts by weight, an alignment layer may not be formed on a curved substrate. In the case where the amount included of the reactive mesogen is greater than about 0.9 parts by weight, the reactive mesogen may not be dissolved in a liquid crystal compound.

The reactive mesogen may further include a reactive mesogen having polymerizable reactive groups at both terminals thereof in addition to the first reactive mesogen represented by Formula 1. The additional polymerizable reactive mesogen may be any reactive mesogen commonly used, without limitation.

In addition, in the method of manufacturing a curved liquid crystal display device according to an exemplary embodiment, the liquid crystal compound may further include an additive for vertical alignment. The additive for vertical alignment may be provided together with a liquid crystal compound or an alignment solution.

The vertical alignment of liquid crystal molecules may be easily attained by the additive for vertical alignment. The additive for vertical alignment may be combined with an alignment layer formed using the reactive mesogen or with a polyimide alignment layer.

The additive for vertical alignment may be any one of the following V-1 to V-18.

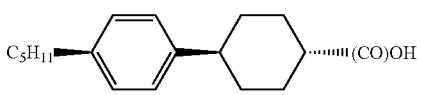

V-1

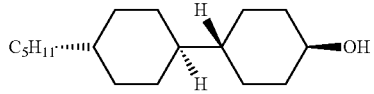

V-2

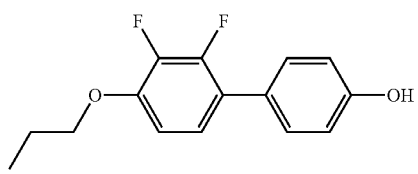

V-3

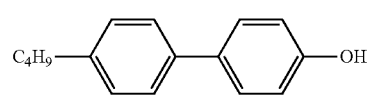

V-4

V-5

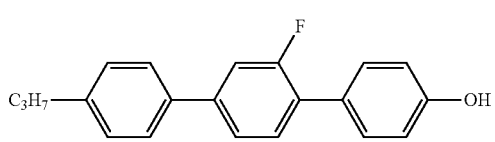

V-6

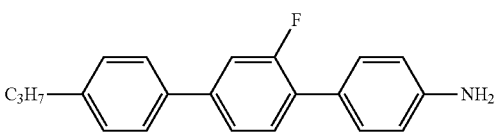

V-7

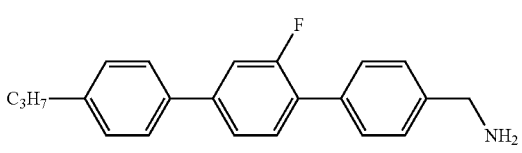

V-8

-continued

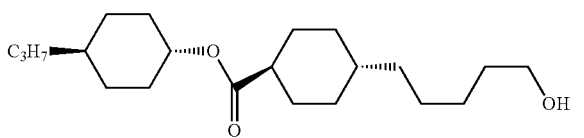
V-9

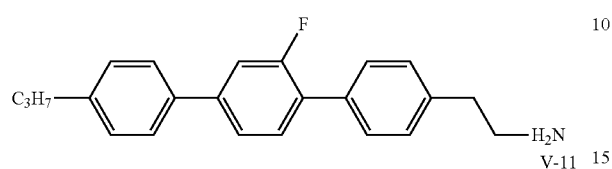
V-10

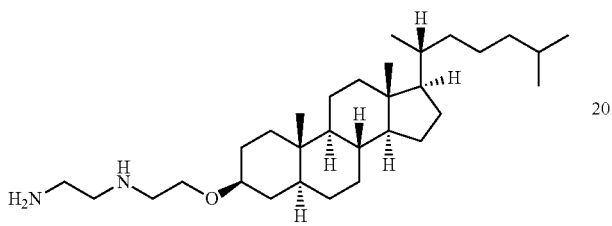
V-11

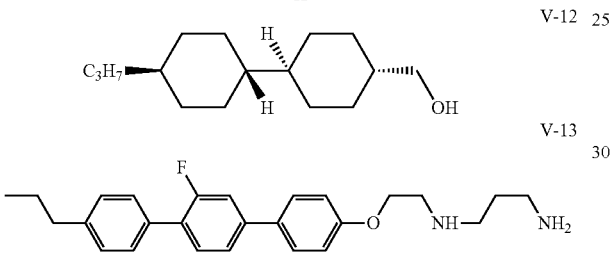
V-12

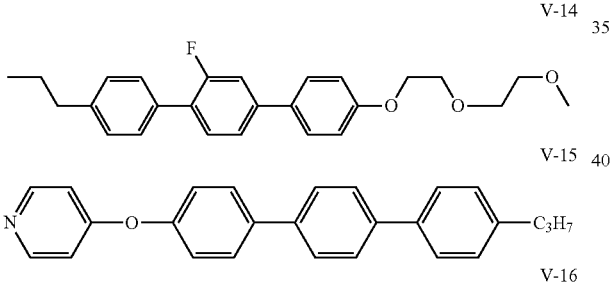
V-13

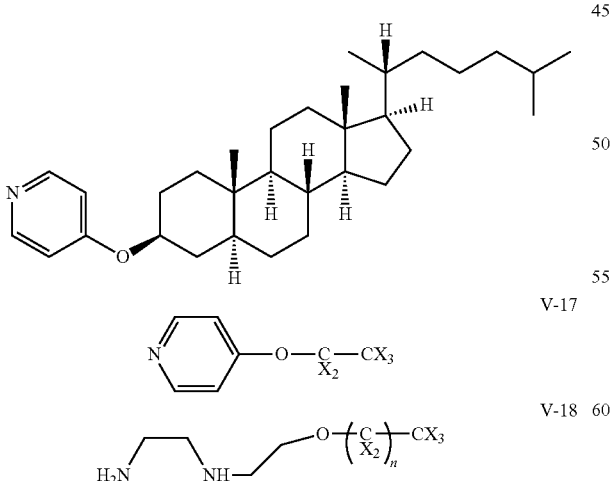
V-14

V-15

V-16

V-17

V-18

In the method of manufacturing a curved liquid crystal display device according to an exemplary embodiment, the radius of curvature of a first substrate may be greater than or equal to the radius of curvature of a second substrate. For example, the radius of curvature of a first substrate may be greater than the radius of curvature of a second substrate.

In an exemplary embodiment, an alignment solution is provided on the second substrate to form a polyimide alignment layer, and a reactive mesogen is provided on the first substrate to form an alignment layer including a polymerized reactive mesogen.

In the case where an alignment layer including a polymerized reactive mesogen is formed on the first substrate, the reactive mesogen provided may further include a third reactive mesogen represented by the following Formula 3.

$$G\text{---}[Z_1]_{\overline{b5}}\text{---}X\text{---}[Z_2]_{\overline{b6}}\text{---}Pc \quad \text{[Formula 3]}$$

In Formula 3, X may be one of the following X-1 to X-17.

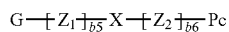
X-1

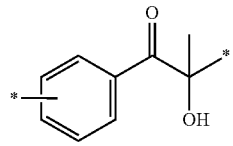
X-2

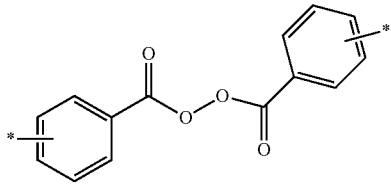
X-3

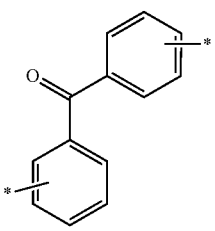
X-4

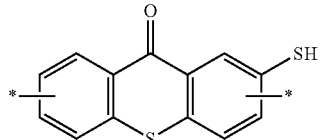
X-5

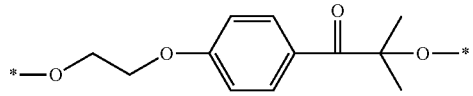
X-6

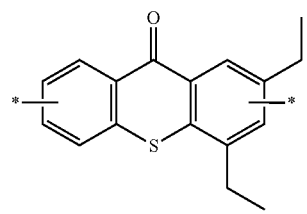

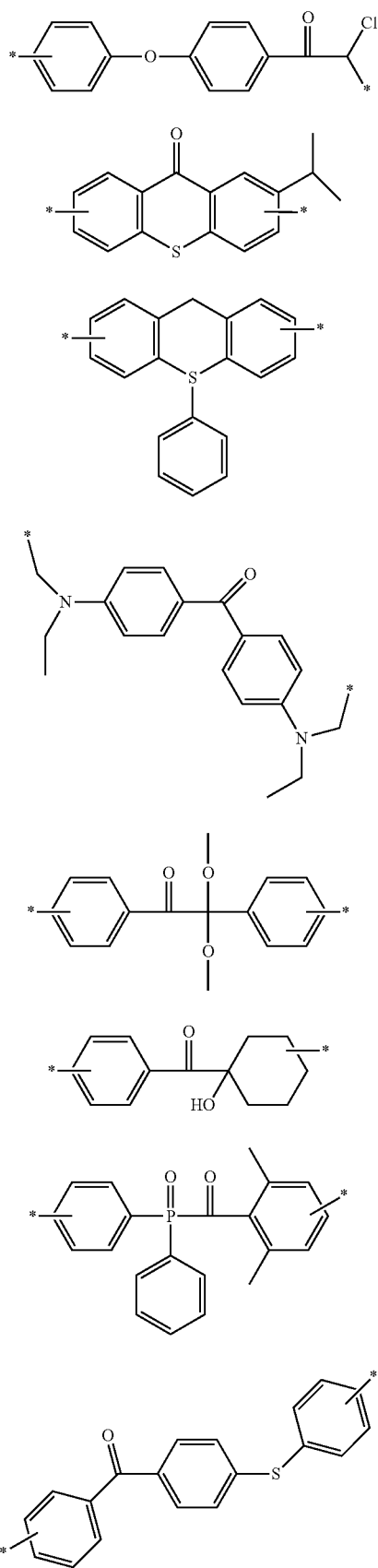
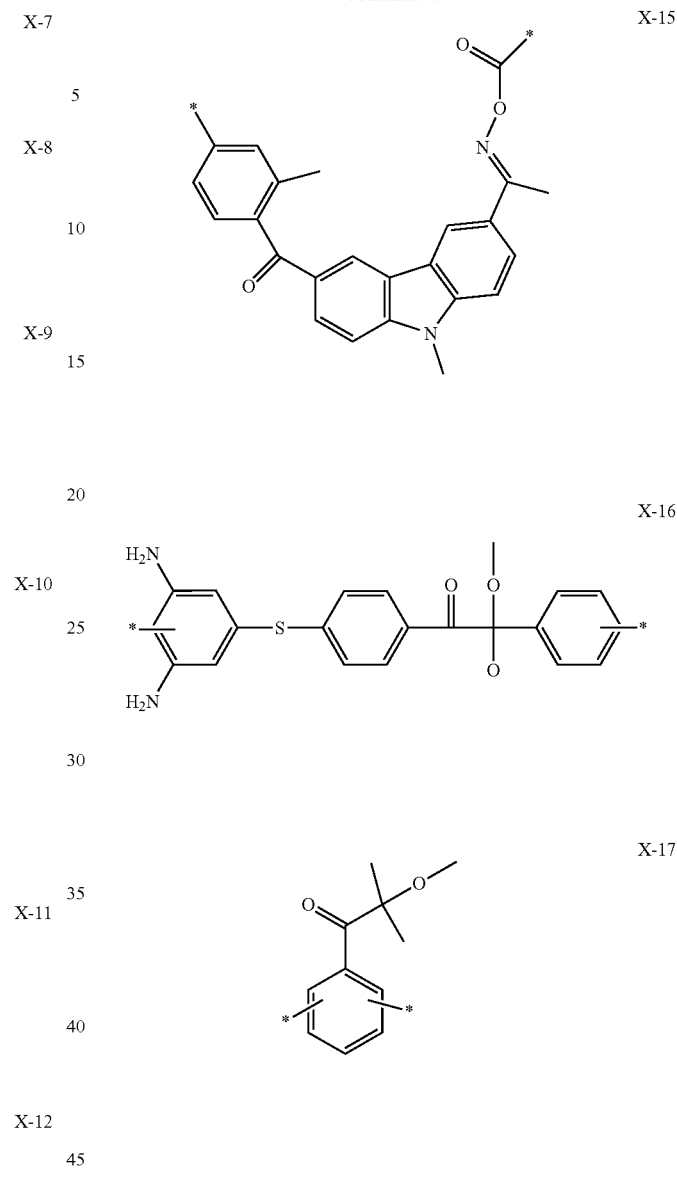

In Formula 3, G may be one of a deuterium atom, a halogen atom, —OH, —NH$_2$, —CN, —CF$_3$, —B(OH)$_2$, and —R$^0$(CH$_2$)$_r$R$^1$. R$^0$ may be one of —O—, —NH—, —S—, —C═O, and —O—C═O, R$^1$ may be one of —OH, —NH$_2$, —CN, —CF$_3$, —B(OH)$_2$, —SH, and —CH$_3$, and r may be an integer of 1 to 12. Z$_1$, Z$_2$, and Pc are the same as defined in Formulae 1 and 2. b5 and b6 may be each independently an integer of 0 to 6.

The third reactive mesogen represented by Formula 3 may be any compound of the following Compounds (3-1) to (3-7). However, exemplary embodiment of the inventive concept is not limited thereto. The third reactive mesogen may be a reactive mesogen having a polymerizable reactive group at one terminal thereof, a functional group capable for forming a hydrogen bond at the other terminal thereof, and a core part which produces radicals to play the role of an initiator, between the polymerizable reactive group and the functional group for forming a hydrogen bond.

(3-1)
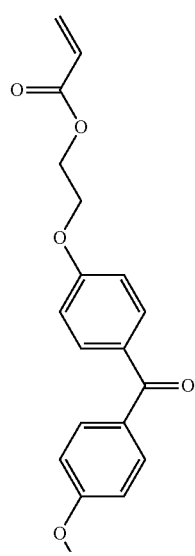
(3-3)
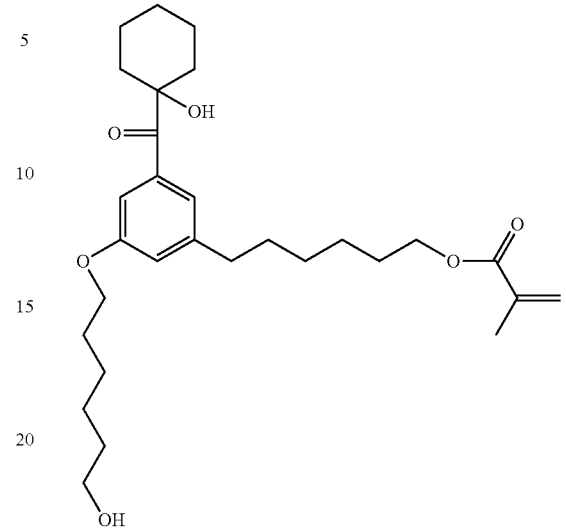
(3-2)
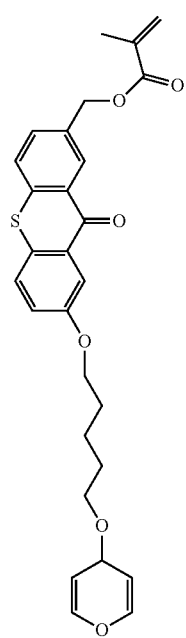
(3-4)
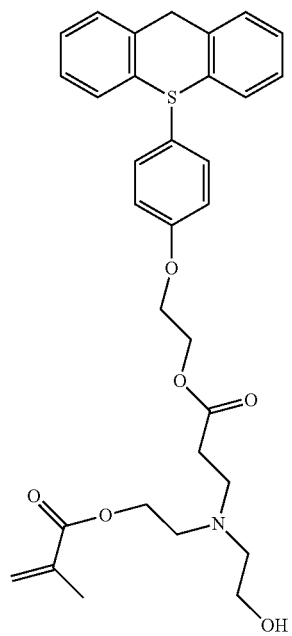
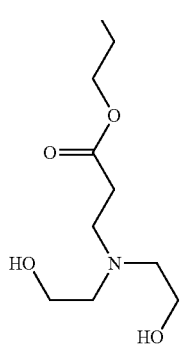

-continued (3-5)

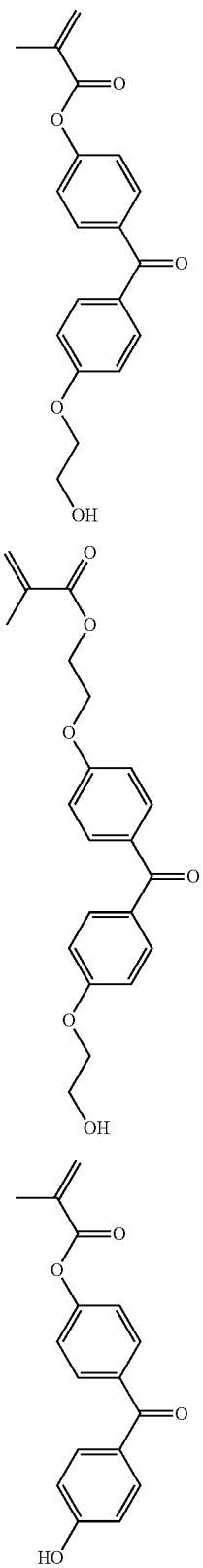

(3-6)

(3-7)

In the case where an alignment layer including a polymerized reactive mesogen is formed on the first substrate, a polyimide alignment layer may be formed on the second substrate. The polyimide alignment layer may be formed from an alignment layer including at least one dianhydride compound selected from the following Compound Group 1 and at least one diamine compound selected from the following Compound Group 2.

[Compound 1]

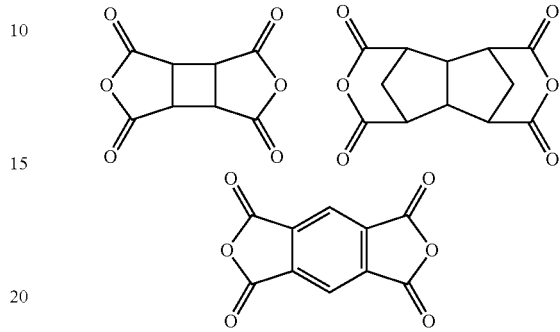

[Compound 2]

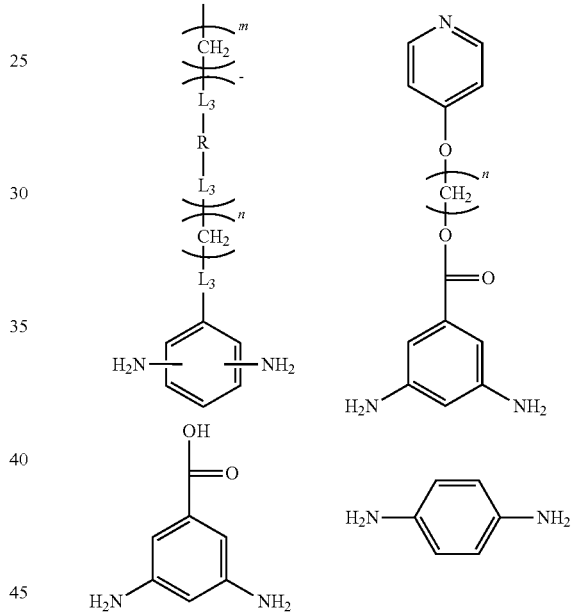

In Compound Group 2, n and m may be each independently an integer of 1 to 12, and l may be an integer of 0 to 2. R may be a substituted or unsubstituted, divalent hydrocarbon ring, or a substituted or unsubstituted, divalent heterocycle, and $L_3$ may be a spacer group.

R is a divalent cyclic compound, for example, a substituted or unsubstituted arylene having 6 to 30 carbon atoms for forming a ring, or a substituted or unsubstituted heteroarylene having 2 to 30 carbon atoms for forming a ring. In addition, R may be a divalent, substituted or unsubstituted cycloalkane or cycloalkene having 5 to 30 carbon atoms for forming a ring, or a divalent, substituted or unsubstituted heterocycloalkane or heterocycloalkene having 2 to 30 carbon atoms for forming a ring.

The spacer group, $L_3$ may be an alkyl having 1 to 12 carbon atoms, or an alkoxy having 1 to 12 carbon atoms. However, an embodiment of the inventive concept is not limited thereto. For example, the spacer group may be $-(CH_2)_{i1}-$, $-(CH_2CH_2O)_{i1}-CH_2CH_2-$, $-CH_2CH_2-S-CH_2CH_2-$, $-CH_2CH_2-NH-CH_2CH_2-$, or —(SiR²R³—O)$_{i1}$—. In this case, R² and R³ may be each independently a hydrogen atom or an alkyl having 1 to 12 carbon atoms. i1 may be an integer of 1 to 12.

When a polyimide alignment layer is formed on the first substrate, and an alignment layer formed using a polymerized reactive mesogen is formed on the second substrate, the polyimide alignment layer may be formed using a polyimide alignment solution including at least one dianhydride compound selected from the following Compound Group 3 and at least one diamine compound selected from the following Compound Group 4. In this case, the diamine compound may essentially include AM-1.

[Compound Group 3]

AH-1

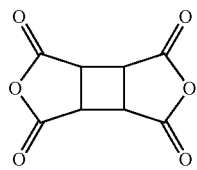

AH-2

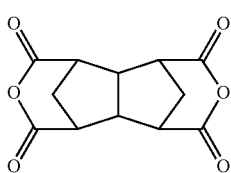

AH-3

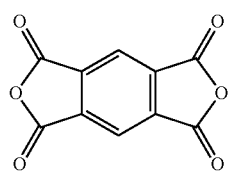

[Compound Group 4]

AM-1

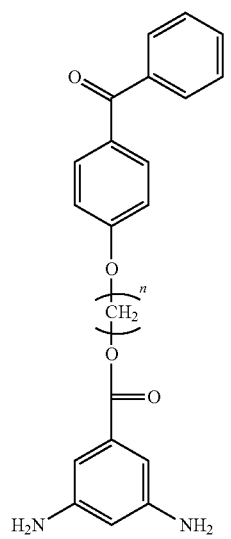

AM-2

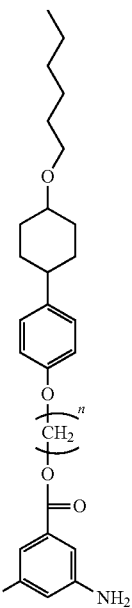

AM-3

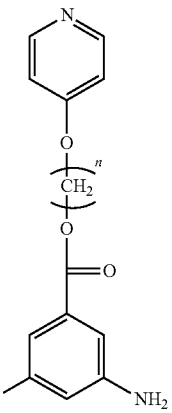

AM-4

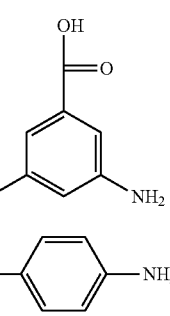

AM-5

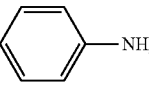

In Compound Group 4, n may be an integer of 1 to 12.

In the case where a polyimide alignment layer is formed on the first substrate, an alignment layer may be formed using a polymerized reactive mesogen on the second substrate. The alignment layer formed on the second substrate may be formed using a reactive mesogen including at least one of the first reactive mesogen represented by Formula 1 and the second reactive mesogen represented by Formula 2

When disposing a reactive mesogen (S130) in the method of manufacturing a curved liquid crystal display device according to an exemplary embodiment, a reactive mesogen represented by (4-1) to (4-16) may be further included. In the compounds of (4-8) to (4-14), X may be any one of H, CH$_3$, (CH$_2$)$_n$CH$_3$, F, Br, I, OH, C$_3$H$_7$, NH$_2$, or CN. In addition, R in the compounds of (4-8) to (4-14) may be a polymerizable group.
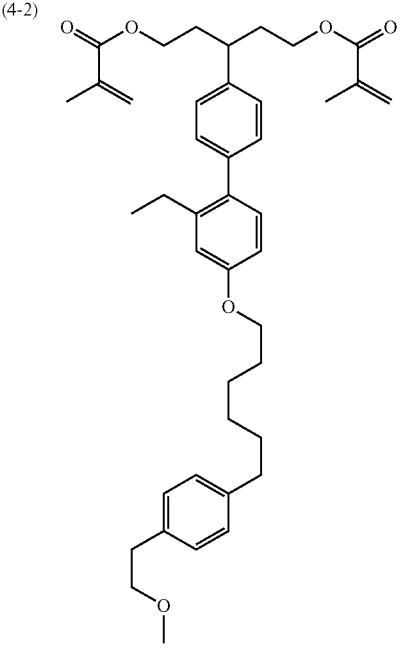
(4-1)
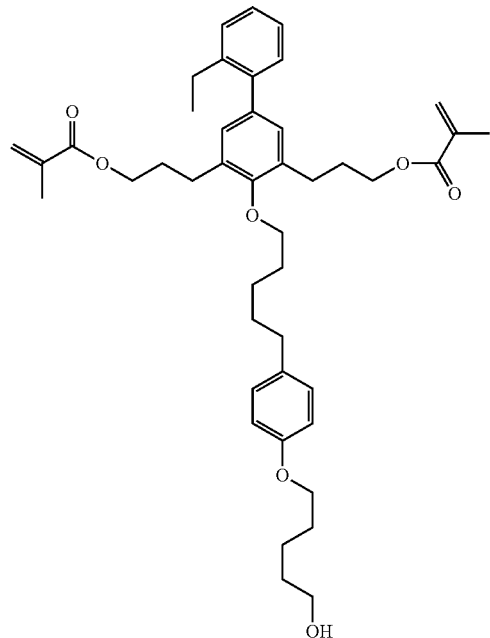
(4-2)
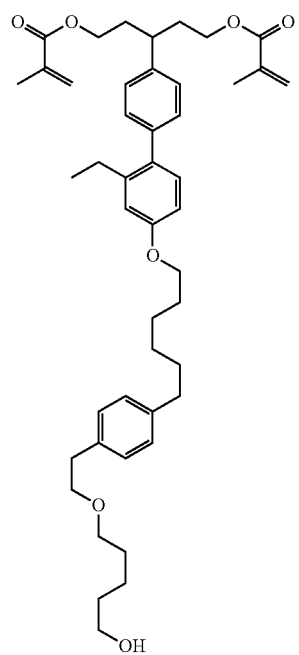
(4-3)
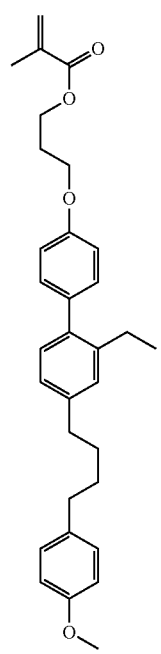
(4-4)

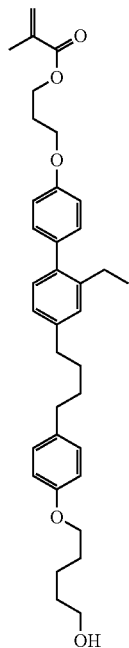
(4-5)
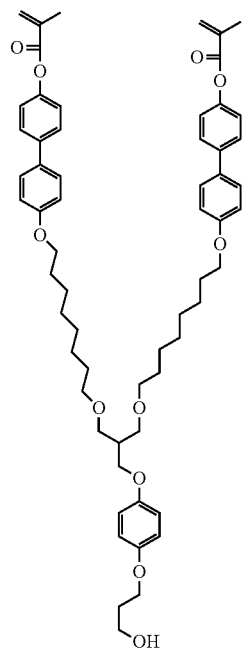
(4-6)
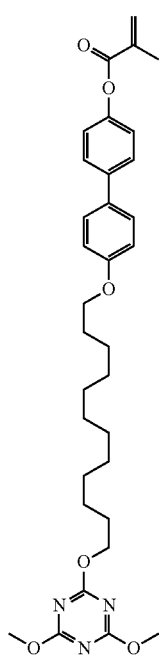
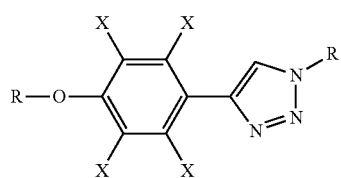
(4-7)
(4-8)
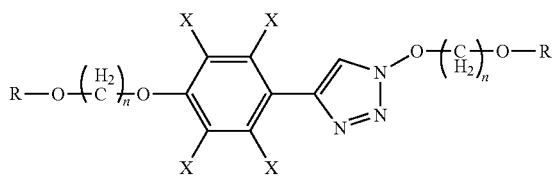
(4-9)
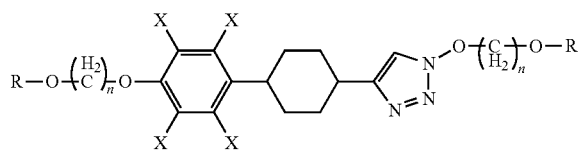
(4-10)

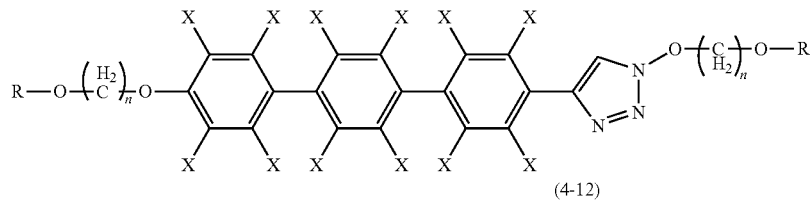
(4-11)

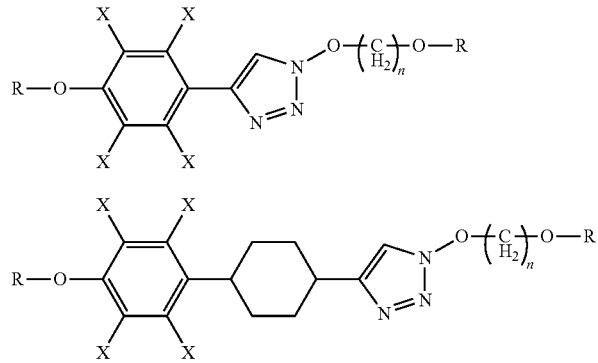
(4-12)

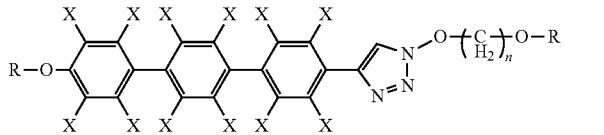
(4-13)

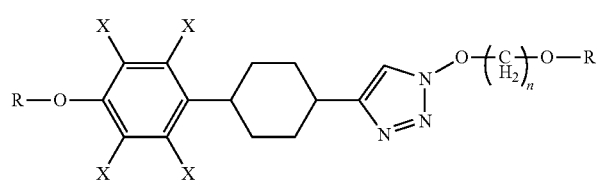
(4-14)

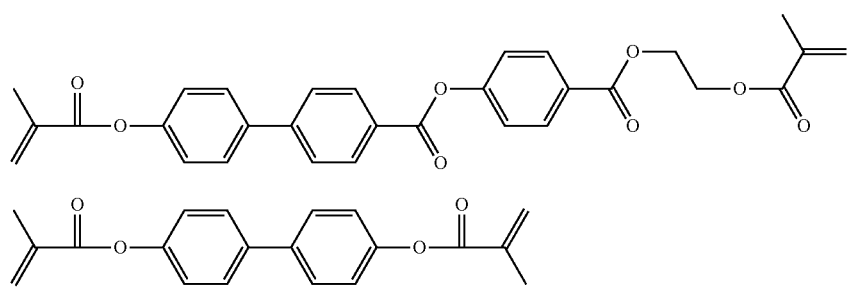
(4-15)

(4-16)

In the method of manufacturing a curved liquid crystal display device according to an exemplary embodiment, any known reactive mesogen material having a polymerizable group may be used in addition to the suggested reactive mesogens. For example, reactive mesogen compounds having a vertical alignment group may be used.

Hereinafter, referring to FIGS. 2 to 10, a curved liquid crystal display device according to an embodiment will be explained.

Figure 2:
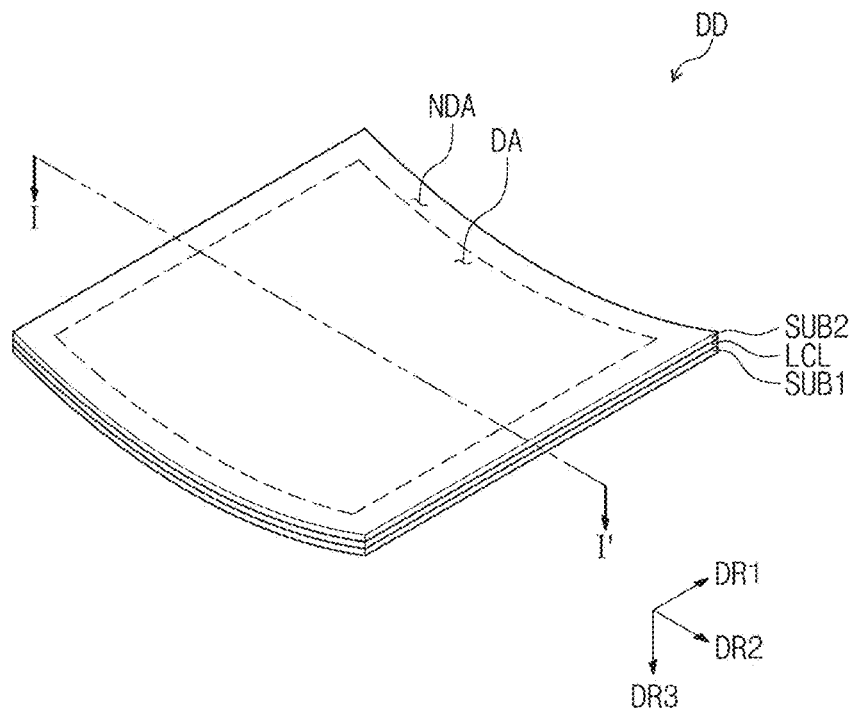
FIG. 2 is a perspective view of a curved liquid crystal display device according to an exemplary embodiment.
Figure 3:
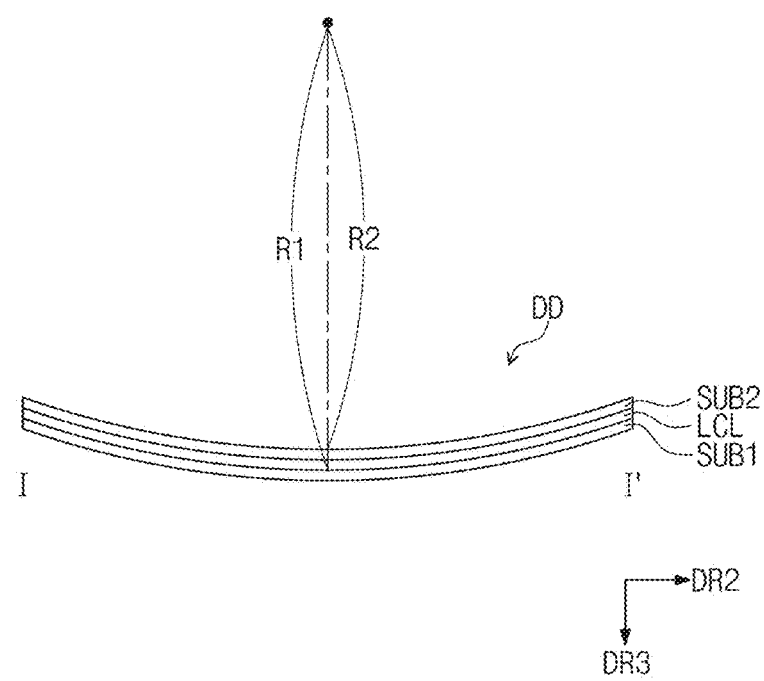
FIG. 3 is a cross-sectional view corresponding to sectional line I-I' in FIG. 2.

FIG. 2 is a perspective view of a curved liquid crystal display device according to an exemplary embodiment. FIG. 3 is a schematic cross-sectional view of a curved liquid crystal display device according to an exemplary embodiment. FIG. 3 may be a cross-sectional view corresponding to line I-I' in FIG. 2.

A curved liquid crystal display device DD according to an exemplary embodiment, shown in FIGS. 2 to 3 may include a first substrate SUB1, a second substrate SUB2, and a liquid crystal layer LCL. The liquid crystal layer LCL is disposed between the first substrate SUB1 and the second substrate SUB2.

The curved liquid crystal display device DD may include a display area DA displaying images and a non-display area NDA not displaying images. The non-display area NDA may be disposed at the periphery of the display area DA.

When viewed from a thickness direction DR3 of the curved liquid crystal display device DD, the display area DA may have an approximately rectangular shape, without limitation. The thickness direction DR3 may be a front direction of the curved liquid crystal display device DD from a user position.

The display area DA may include a plurality of pixel regions (not shown). The pixel regions (not shown) may be defined by, for example, a plurality of gate lines and a plurality of data lines. The pixel regions (not shown) may be disposed in a matrix shape. A pixel PX (see FIGS. 4A and 4B) may be disposed in each of the pixel regions (not shown).

When viewed from the thickness direction DR3 of the curved liquid crystal display device DD, the non-display area NDA may be disposed, for example, to surround the display area DA. The non-display area NDA may be adjacent to the display area DA in a first direction and a second direction DR2 which is perpendicular to the first direction DR1.

The curved liquid crystal display device DD may be bent to a certain curvature/radius of curvature. The curved liquid crystal display device DD may be flexible or rigid.

The curved liquid crystal display device DD may be dented when the curved liquid crystal display device DD is viewed by a user. When a user watches images displayed on a curved surface, the user may feel improved three-dimensional effect, level of immersion, and realism. The curved liquid crystal display device DD shown in FIGS. 2 and 3 may be dented when viewed from the third direction DR3. However, exemplary embodiments are not limited thereto and the curved liquid crystal display device DD may be convexly curved when viewed from the third direction DR3.

Referring to FIG. 3, the first substrate SUB1 may be flexible. The first substrate SUB1 may have a first radius of curvature R1. The second substrate SUB2 may be flexible.

The second substrate SUB2 may have a second radius of curvature R2. That is, in a curved liquid crystal display device DD according to an exemplary embodiment, the first substrate SUB1 and the second substrate SUB2 may be curved substrates. In an exemplary embodiment shown in FIGS. 2 and 3, the first radius of curvature R1 may be greater than or equal to the second radius of curvature R2.

Figure 4A:
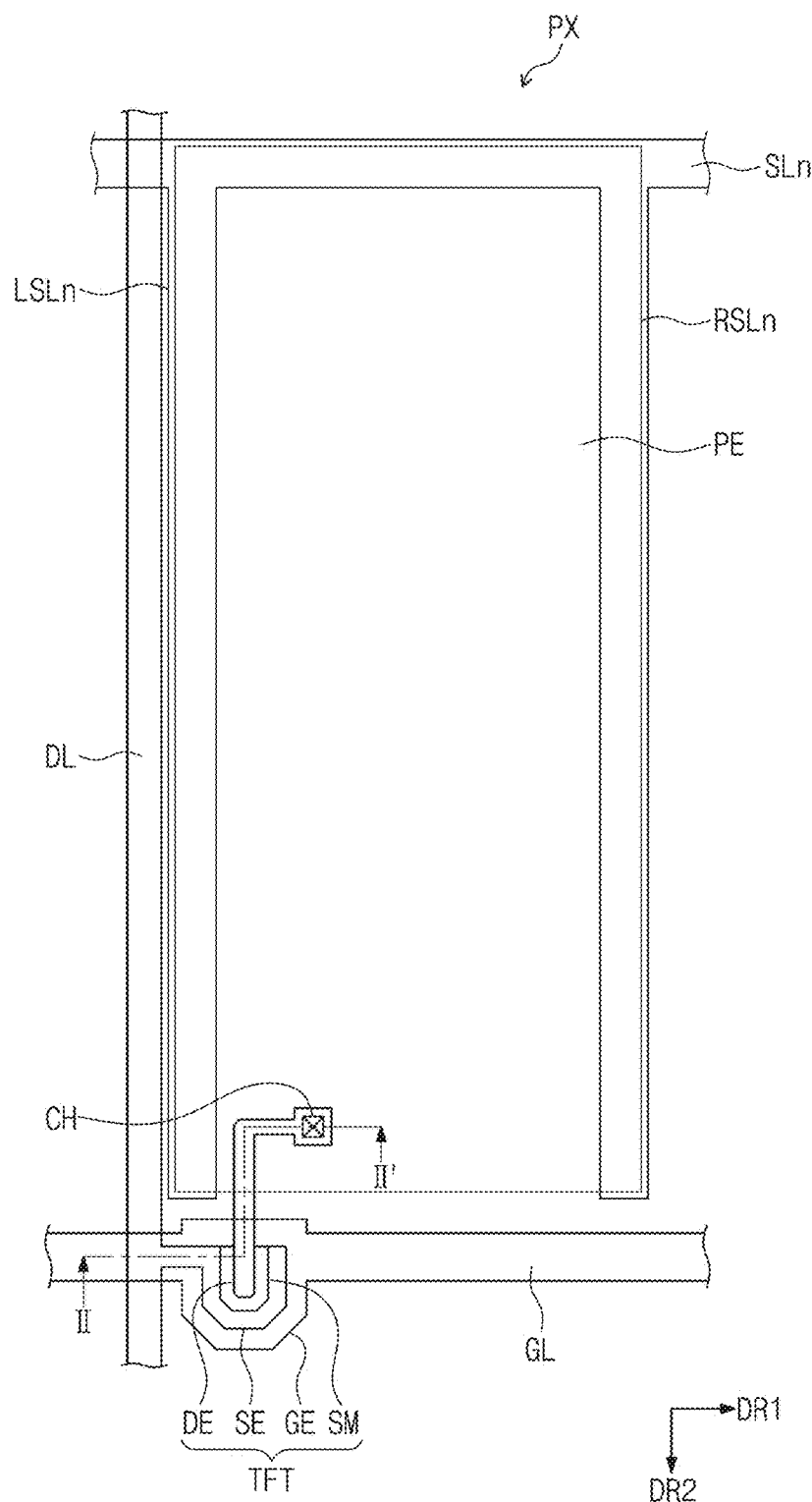
FIGS. 4A and 4B are plan views schematically illustrating one pixel among the pixels included in a curved liquid crystal display device according to an exemplary embodiment.
Figure 4B:
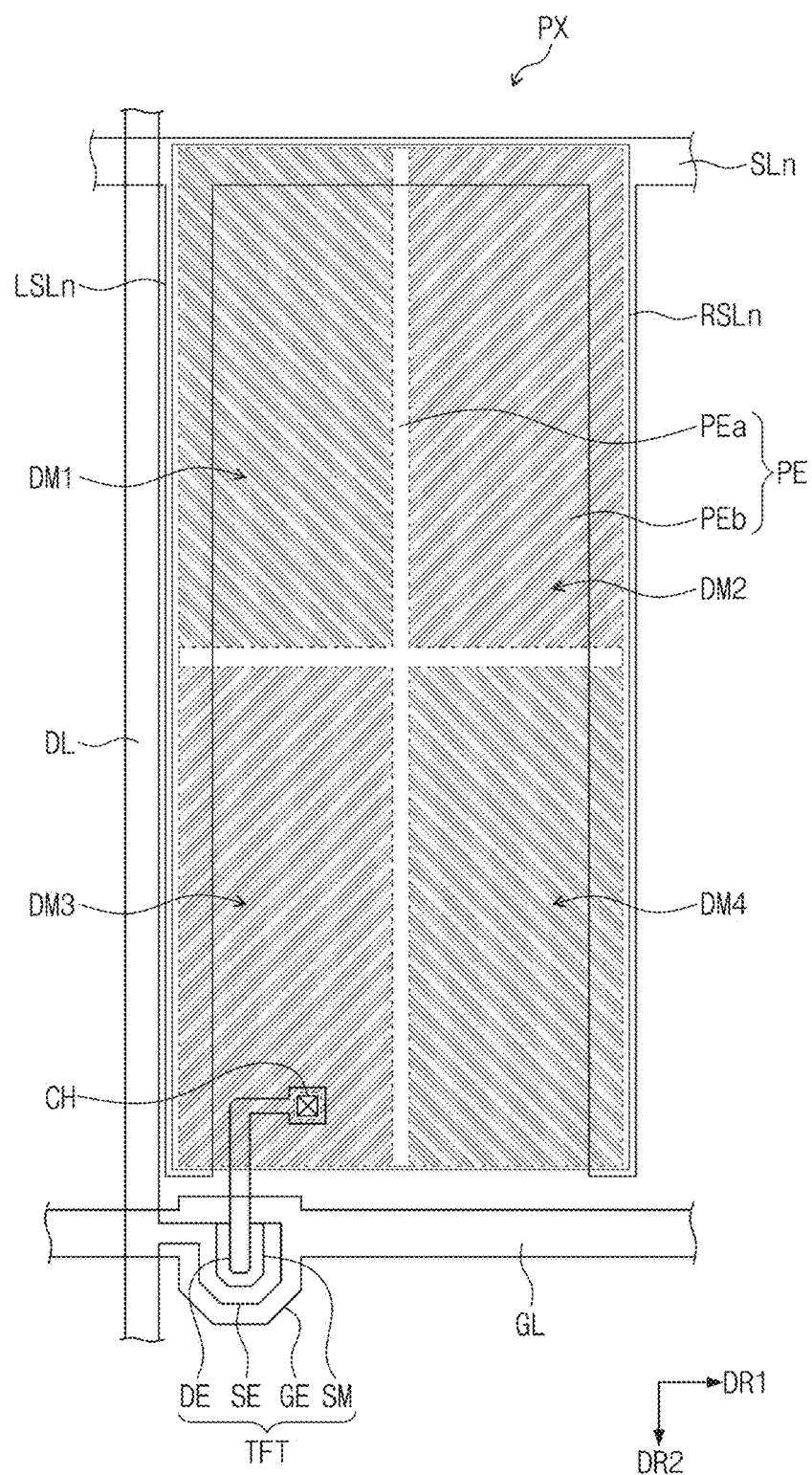

FIGS. 4A to 4B are plan views schematically illustrating one pixel, among pixels included in a curved liquid crystal display device DD, according to an exemplary embodiment.

Figure 5:
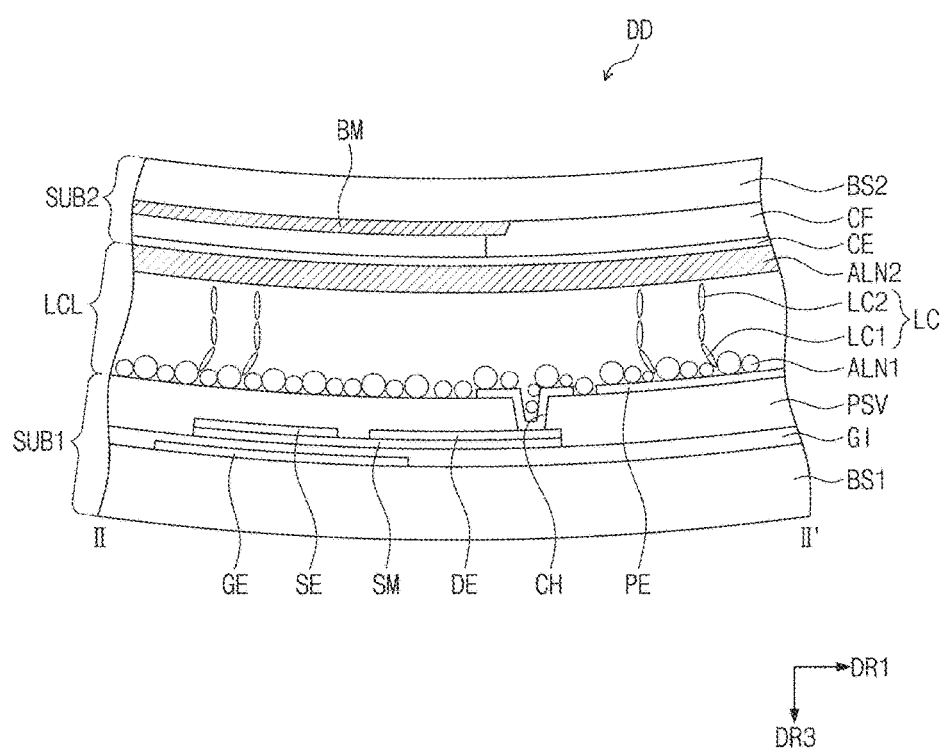
FIG. 5 is a cross-sectional view of a curved liquid crystal display device according to an exemplary embodiment.

One pixel is shown in FIGS. 4A and 4B, and the structure of the remaining pixels may be similar to the pixel shown in FIGS. 4A and 4B. FIG. 5 may be a cross-sectional view corresponding to line II-II' in FIG. 4A.

Referring to FIGS. 4A, 4B, and 5, a curved liquid crystal display device DD may include a first substrate SUB1, a second substrate SUB2, and a liquid crystal layer LCL provided between the first substrate SUB1 and the second substrate SUB2. The liquid crystal layer LCL may include liquid crystal molecules LC disposed adjacent to a first alignment inducing layer ALN1 which is disposed between the first substrate SUB1 and the second substrate SUB2. The liquid crystal layer LCL may include first liquid crystal molecules LC1 which are disposed adjacent to the first substrate SUB1 and second liquid crystal molecules LC2 which are disposed adjacent to the second substrate SUB2.

The curved liquid crystal display device DD according to an exemplary embodiment may include a first alignment inducing layer ALN1 which is provided on the first substrate SUB1, and a second alignment inducing layer ALN2 which is provided on the second substrate SUB2 opposing the first substrate SUB1.

For the convenience of explanation, one pixel PX connected with one gate line among gate lines GL and one data line among data lines DL is shown in FIGS. 4A, 4B, and 5. However, exemplary embodiments of the inventive concept is not limited thereto. For example, one gate line and one data line may be connected with a plurality of pixels, or a plurality of gate lines and a plurality of data lines may be connected with one pixel.

The first substrate SUB1 may include a first base substrate BS1 and a circuit layer formed on the first base substrate BS1. The first base substrate BS1 may be a polymer substrate, a plastic substrate, a glass substrate, a quartz substrate, etc. The first base substrate BS1 may be a transparent insulating substrate. The first base substrate BS1 may be flexible or rigid.

Referring to the drawings in FIGS. 4A, 4B, and 5, the gate lines GL are extended in a first direction D1. The gate lines GL may be formed on the first base substrate BS1. The data lines DL may be extended in a second direction DR2 which crosses the gate lines GL in the first direction DR1.

Each of the pixels PX includes a thin film transistor TFT, a pixel electrode PE connected with the thin film transistor TFT, and a storage electrode part. The thin film transistor TFT includes a gate electrode GE, a gate insulating layer GI, a semiconductor pattern SM, a source electrode SE, and a drain electrode DE. The storage electrode part may further include a storage line SLn extended in the first direction DR1, and a first branched electrode LSLn and a second branched electrode RSLn, which are branched from the storage line SLn and extended in the second direction DR2.

The gate electrode GE is protruded from the gate lines GL or provided in a partial region of the gate lines GL. The gate electrode GE may be formed using a metal. The gate electrode GE may be formed using nickel, chromium, molybdenum, aluminum, titanium, copper, tungsten, or an alloy including the same. The gate electrode GE may be formed as a single layer or a multilayer using a metal. For example, the gate electrode GE may be a triple layer obtained by laminating molybdenum, aluminum, and molybdenum one by one, a double layer obtained by laminating titanium and copper one by one, or a single layer formed using an alloy of titanium and copper.

The semiconductor pattern SM is provided on the gate insulating layer GI. The semiconductor pattern SM is provided on the gate electrode GE with the gate insulating layer GI disposed therebetween. The semiconductor pattern SM is partially overlapped with the gate electrode GE. The semiconductor pattern SM includes an active pattern (not shown) provided on the gate insulating layer GI and an ohmic contact layer (not shown) formed on the active pattern. The active pattern may be formed using an amorphous silicon thin film, and the ohmic contact layer may be formed using an n+ amorphous silicon thin film. The ohmic contact layer makes an ohmic contact between the active pattern, and the source electrode SE and the drain electrode DE, respectively.

The source electrode SE is branched from the data lines DL and provided. The source electrode SE is formed on the ohmic contact layer and is partially overlapped with the gate electrode GE.

The drain electrode DE is separated from the source electrode SE with the semiconductor pattern SM therebetween. The drain electrode DE is formed on the ohmic contact layer and is partially overlapped with the gate electrode GE.

The source electrode SE and the drain electrode DE may be formed using nickel, chromium, molybdenum, aluminum, titanium, copper, tungsten, or an alloy including the same. The source electrode SE and the drain electrode DE may be formed as a single layer or a multilayer using a metal. For example, the source electrode SE and the drain electrode DE may be a double layer obtained by laminating titanium and copper one by one, or a single layer formed using an alloy of titanium and copper.

Accordingly, the upper surface of the active pattern between the source electrode SE and the drain electrode DE is exposed and becomes a channel part forming a conductive channel between the source electrode SE and the drain electrode DE depending on whether a voltage is applied to the gate electrode GE or not. The source electrode SE and the drain electrode DE are partially overlapped with the semiconductor pattern SM in a region excluding the channel part separately formed between the source electrode SE and the drain electrode DE.

The pixel electrode PE is connected with the drain electrode DE with a passivation layer PSV therebetween. The pixel electrode PE is partially overlapped with the storage line SLn, a first branched electrode LSLn, and a second branched electrode RSLn to form a storage capacitor.

The passivation layer PSV covers the source electrode SE, the drain electrode DE, the channel part, and the gate insulating layer GI and has a contact hole CH exposing a portion of the drain electrode DE. The passivation layer PSV may include, for example, silicon nitride, or silicon oxide.

The pixel electrode PE is connected with the drain electrode DE via a contact hole CH formed in the passivation layer PSV. The pixel electrode PE is formed using a transparent conductive material. Particularly, the pixel electrode PE is formed using a transparent conductive oxide. The transparent conductive oxide may be indium tin oxide (ITO), indium zinc oxide (IZO), indium tin zinc oxide (ITZO), etc.

Meanwhile, the pixel electrode PE in FIG. 4B is divided into a plurality of domains DM1, DM2, DM3, and DM4, which is the only difference from FIG. 4A. In FIG. 4B, the pixel electrode PE includes a stem part PEa, and a plurality of branch parts PEb extruded radially and extended from the stem part PEa. The stem part PEa or a portion of the branch parts PEb are connected to the drain electrode DE via the contact hole CH.

The stem part PEa may be provided in various shapes, and may be provided as a cross shape as in an exemplary embodiment. The branch parts PEb are separated from each other so that adjacent branch parts PEb may not meet, and are extended in parallel to each other within the divided area by the stem part PEa. Adjacent branch parts PEb are separated by a micrometer unit to align liquid crystal molecules in the liquid crystal layer LCL with a certain angle.

Each of the pixels PX may be divided into a plurality of domains DM1, DM2, DM3, and DM4 by the stem part PEa. The branch parts PEb correspond to the domains DM1, DM2, DM3, and DM4, respectively, and each of the domains DM1, DM2, DM3, and DM4 may be extended to different directions from each other. In an exemplary embodiment, each of the pixels PX includes four domains. However, exemplary embodiments are not limited thereto. Each of the pixels PX may include various numbers of domains, for example, two, six, eight, etc. In addition, the divided shape of the domain is not limited to the shape shown in FIG. 4B. The stem part PEa may be arranged in parallel to the first direction DR1, or the stem part PEa may be arranged in parallel to the second direction DR2 so that a plurality of the domains may be divided.

In addition, the first alignment inducing layer ALN1 may be provided on the pixel electrode PE and the passivation layer PSV.

Meanwhile, the curved liquid crystal display device DD in FIG. 5 may include a first substrate SUB1, a second substrate SUB2 opposing the first substrate SUB1, and a liquid crystal layer LCL provided between the first substrate SUB1 and the second substrate SUB2. In an exemplary embodiment shown in FIG. 5, the first substrate SUB1 and the second substrate SUB2 may be curved substrates.

The first substrate SUB1 may include a first base substrate BS1 and a circuit layer formed on the first base substrate BS1. The first base substrate BS1 may be a polymer substrate, a plastic substrate, a glass substrate, a quartz substrate, etc. The first base substrate BS1 may be a transparent insulating substrate. The first base substrate BS1 may be flexible or rigid.

The circuit layer may include a gate insulating layer GI, a gate electrode GE, a semiconductor pattern SM, a source electrode SE, and a drain electrode DE. The gate insulating layer GI is provided on the whole surface of the first base substrate BS1, covers the gate lines GL and is disposed.

The second substrate SUB2 may include a second base substrate BS2, a color filter CF, a black matrix BM, and a common electrode CE. The second base substrate BS2 may be a polymer substrate, a plastic substrate, a glass substrate, a quartz substrate, etc. The second base substrate BS2 may be a transparent insulating substrate. The second base substrate BS2 may be flexible or rigid.

The color filter CF is provided on the second base substrate BS2 and provides colors. In an exemplary embodiment, the color filter CF is included in the second substrate SUB2. However, exemplary embodiments are not limited thereto, and the color filter CF may be included in the first substrate SUB1.

The black matrix BM is provided so as to correspond to a light shielding region of the first substrate SUB1. The light shielding region may be defined as a region in which data lines DL, a thin film transistor TFT, and gate lines GL are formed. The black matrix BM is formed in the light shielding region and shields light leakage. In an exemplary embodiment, the black matrix BM is included in the second substrate SUB2. However, exemplary embodiments are not limited thereto, and the black matrix BM may be included in the first substrate SUB1. Even though not shown, an insulating layer (not shown) may be formed on the color filter CF and the black matrix BM.

The common electrode CE is provided on the second base substrate BS2 and forms an electric field with the pixel electrode PE, thereby driving the liquid crystal layer LCL. In an exemplary embodiment, the common electrode CE is included in the second substrate SUB2. However, exemplary embodiments are not limited thereto, and the common electrode CE may be included in the first substrate SUB1. The common electrode CE may be formed using a transparent conductive material. The common electrode CE may be formed using a conductive metal oxide such as ITO, IZO, ITZO, etc. On the common electrode CE of the second base substrate BS2, a second alignment inducing layer ALN2 may be disposed.

A liquid crystal layer LCL including liquid crystal molecules LC is provided between the first substrate SUB1 and the second substrate SUB2. The liquid crystal layer LCL in which liquid crystal molecules having dielectric anisotropy are aligned may be provided. Commonly used liquid crystal molecules may be used in the liquid crystal layer, without specific limitation. For example, an alkenyl liquid crystal compound, or an alkoxy liquid crystal compound may be used. The liquid crystal compound LC used in an exemplary embodiment may have negative dielectric anisotropy, but may have positive dielectric anisotropy, without limitation.

In an exemplary embodiment shown in FIG. 5, the radius of curvature of the first substrate SUB1 may be greater than or equal to the radius of curvature of the second substrate SUB2. A first alignment inducing layer ALN1, including a polymerized reactive mesogen, may be on the first substrate SUB1. A second alignment inducing layer ALN2 including a polyimide, may be formed on the second substrate SUB2.

The liquid crystal layer LCL may include a plurality of liquid crystal molecules LC. The liquid crystal layer LCL may include first liquid crystal molecules LC1 which are disposed adjacent to the first alignment inducing layer ALN1 and second liquid crystal molecules LC2 which are disposed adjacent to the second alignment inducing layer ALN2.

The first liquid crystal molecules LC1 may have a first pretilt angle AN1 with respect to the first alignment inducing layer ALN1. The second liquid crystal molecules LC2 may have a second pretilt angle AN2 with respect to the second alignment inducing layer ALN2. The pretilt angle of the first liquid crystal molecules LC1 may be less than or equal to the pretilt angle of the second liquid crystal molecules LC2. The pretilt angle of the liquid crystal molecules LC may be an alignment angle exhibiting an alignment state of the liquid crystal molecules LC with respect to the alignment inducing layers ALN1 and ALN2.

Figure 6A:
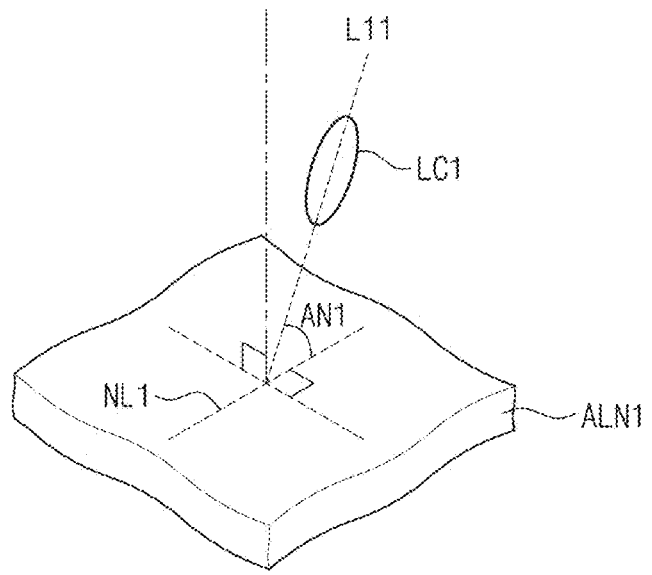
FIG. 6A is a perspective view schematically illustrating a first pretilt angle of a first liquid crystal molecule.
Figure 6B:
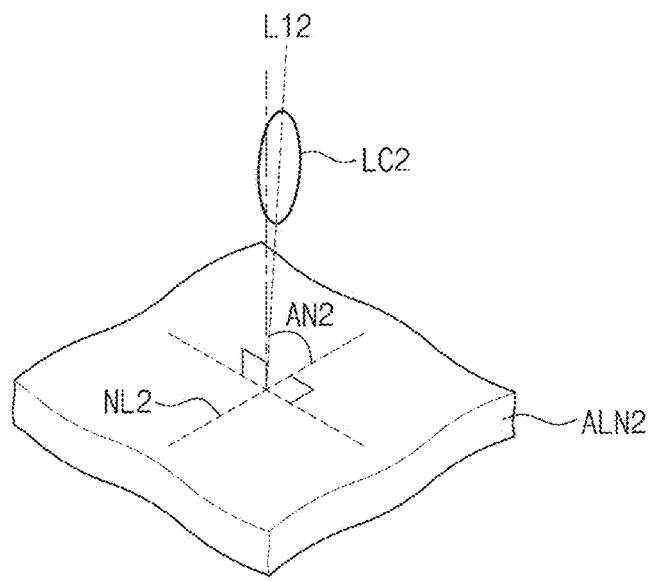
FIG. 6B is a perspective view schematically illustrating a second pretilt angle of a second liquid crystal molecule.

FIGS. 6A and 6B are illustrated for explaining the pretilt angle of the first liquid crystal molecules LC1 and the pretilt angle of the second liquid crystal molecules LC2.

Referring to FIG. 6A, an angle formed by a first straight line NL1 included on one side of a first alignment inducing layer ALN1 and a longitudinal axis L11 of a first liquid crystal molecule LC1 may be defined as a first pretilt angle AN1. The first pretilt angle may be, for example, an average value, a representative value, etc. of the pretilt angles of a plurality of first liquid crystal molecules LC1. The first pretilt angle AN1 may be from about 80 to about 90 degrees. The first pretilt angle AN1 may be from about 80 to about 89 degrees. For example, the first pretilt angle AN1 may be from about 88 to about 89 degrees.

Referring to FIG. 6B, a second liquid crystal molecule LC2 may have a second pretilt angle AN2 with respect to a second alignment inducing layer ALN2. In FIG. 6B, an angle formed by a second straight line NL2 included on one side of the second alignment inducing layer ALN2 and a longitudinal axis L12 of the second liquid crystal molecule LC2 may be defined as the second pretilt angle AN2. The second pretilt angle AN2 may be about 90 degrees. For example, the second pretilt angle AN2 may be from about 89 to about 90 degrees.

In the curved liquid crystal display device DD shown in FIG. 5 according to an exemplary embodiment, the pretilt angle of the first liquid crystal molecules LC1 adjacent to the first substrate SUB1 may be less than the pretilt angle of the second liquid crystal molecules LC2 adjacent to the second substrate SUB2.

Put another way, an average value of the first pretilt angle may be less than or equal to the average value of the second pretilt angle. Particularly, the first pretilt angle may be from about 88 to about 89 degrees. In addition, the second pretilt angle may be from about 89 to about 90 degrees.

In addition, the display quality of the curved liquid crystal display device in an exemplary embodiment shown in FIG. 5 may be improved by making the pretilt angle of the first liquid crystal molecules LC1 and the pretilt angle of the second liquid crystal molecules LC2 different by forming the first alignment inducing layer ALN1 including the polymerized reactive mesogen and by forming the second alignment inducing layer ALN2 including the polyimide. By using different alignment inducing layers ALN1 and ALN2, the texture defects of the curved liquid crystal display device DD of an exemplary embodiment may be improved by making the pretilt angles between the liquid crystal molecules LC adjacent to each alignment inducing layer.

Figure 7A:
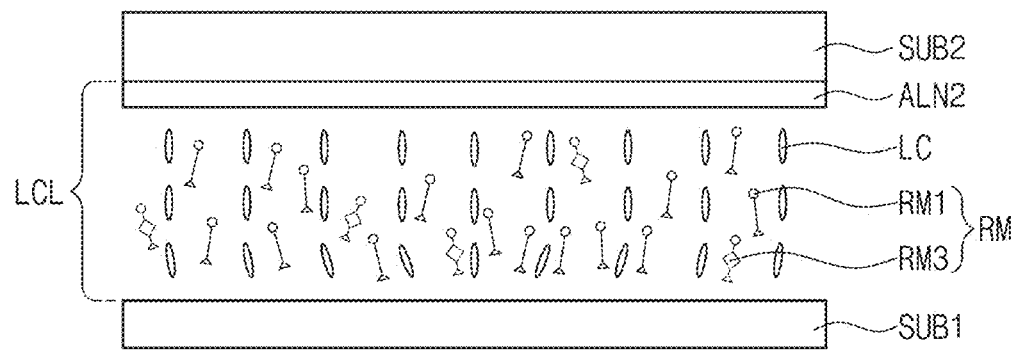
FIGS. 7A, 7B, and 7C are diagrams briefly illustrating manufacturing steps of a curved liquid crystal display device shown in FIG. 5 according to an exemplary embodiment.
Figure 7B:
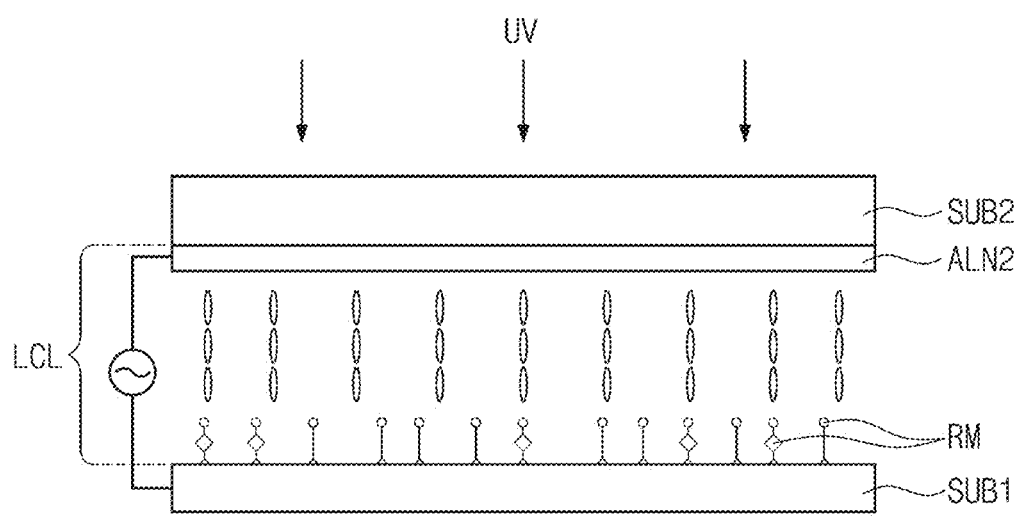
Figure 7C:
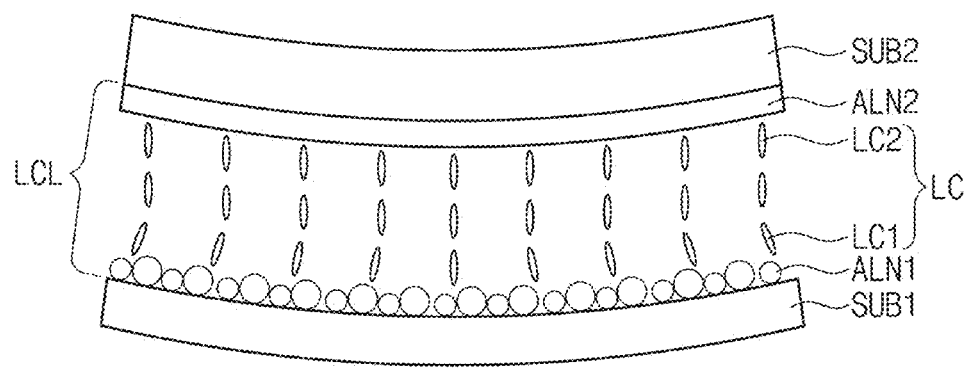

FIGS. 7A, 7B, and 7C are diagrams briefly illustrating manufacturing steps of the curved liquid crystal display device DD shown in FIG. 5 according to an exemplary embodiment. FIG. 7A illustrates a step of providing a liquid crystal compound containing liquid crystal molecules LC and a reactive mesogen RM between the first substrate SUB1 and the second substrate SUB2.

In FIG. 7A, the curved liquid crystal display device includes a first substrate SUB1 and an opposing second substrate SUB2. The curved liquid crystal display device may include a second alignment inducing layer ALN2 on the second substrate SUB2. The second alignment inducing layer ALN2 may be a polyimide alignment layer formed by providing an alignment solution.

In FIGS. 5 and 7A, the second alignment inducing layer ALN2 may be an alignment layer formed from a polyimide alignment solution obtained by including at least one dianhydride compound and at least one diamine compound.

In FIG. 7A, the second alignment inducing layer ALN2 may be formed in the step of disposing a polyimide alignment layer (S110) in the method of manufacturing a curved liquid crystal display device according to an exemplary embodiment illustrated in FIG. 1. That is, the second alignment inducing layer ALN2, which is a polyimide alignment layer, may be formed by disposing an alignment solution on the second substrate SUB2.

The alignment solution provided on the second substrate SUB2 may include at least one dianhydride selected from the following Compound Group 1 and at least one diamine compound selected from the following Compound Group 2.

[Compound Group 1]

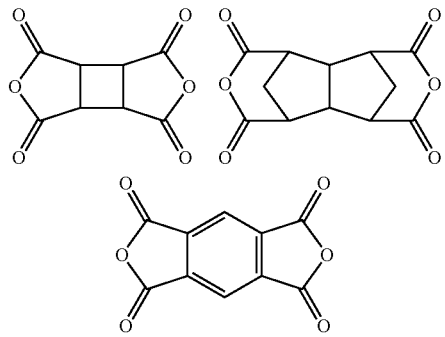

[Compound Group 2]

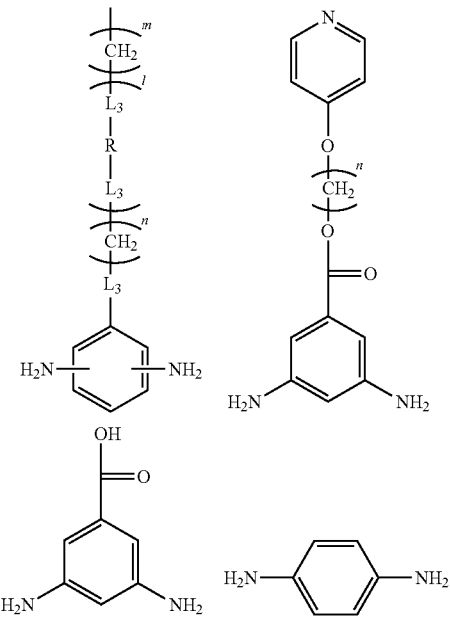

In Compound Group 2, n and m may be each independently an integer of 1 to 12, and l may be an integer of 0 to 2. R may be a substituted or unsubstituted, divalent hydrocarbon ring, or a substituted or unsubstituted, divalent heterocycle, and $L_3$ may be a spacer group.

For example, $L_3$ may be an alkyl having 1 to 12 carbon atoms, or an alkoxy having 1 to 12 carbon atoms. However, exemplary embodiments are not limited thereto. For example, the spacer group may be $-(CH_2)_{i1}-$, $-(CH_2CH_2O)_{i1}-CH_2CH_2-$, $-CH_2CH_2-S-CH_2CH_2-$, $-CH_2CH_2-NH-CH_2CH_2-$, or $-(SiR^2R^3-O)_{i1}-$. In this case, $R^2$ and $R^3$ may be each independently a hydrogen atom or an alkyl having 1 to 12 carbon atoms. i1 may be an integer of 1 to 12.

For example, the second alignment inducing layer ALN2 may be a polyimide alignment layer having a structure of the following PL1 or PL2.

[PL1]

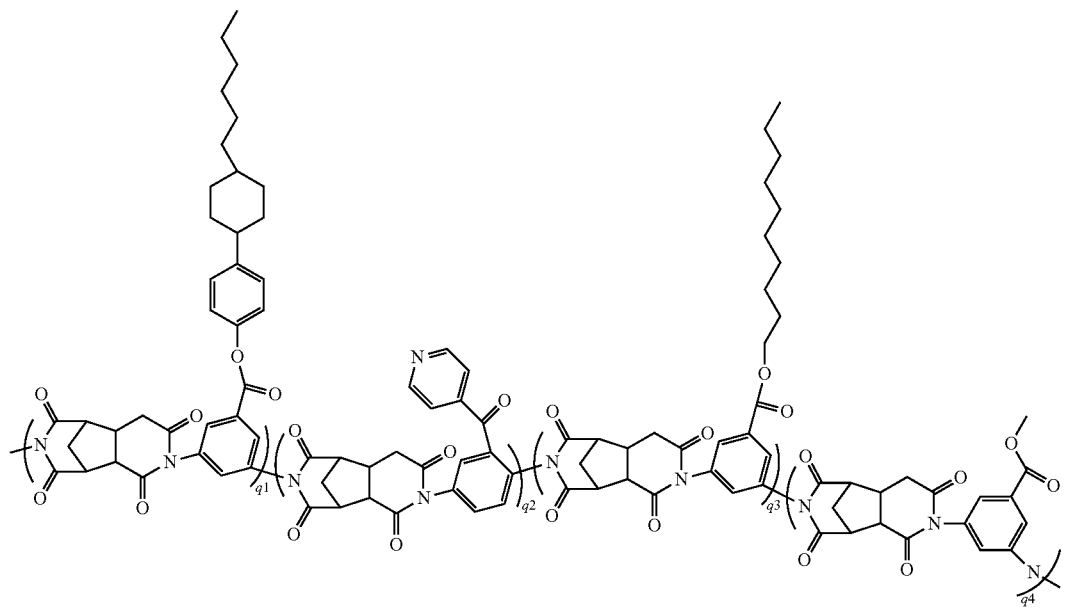

[PL2]

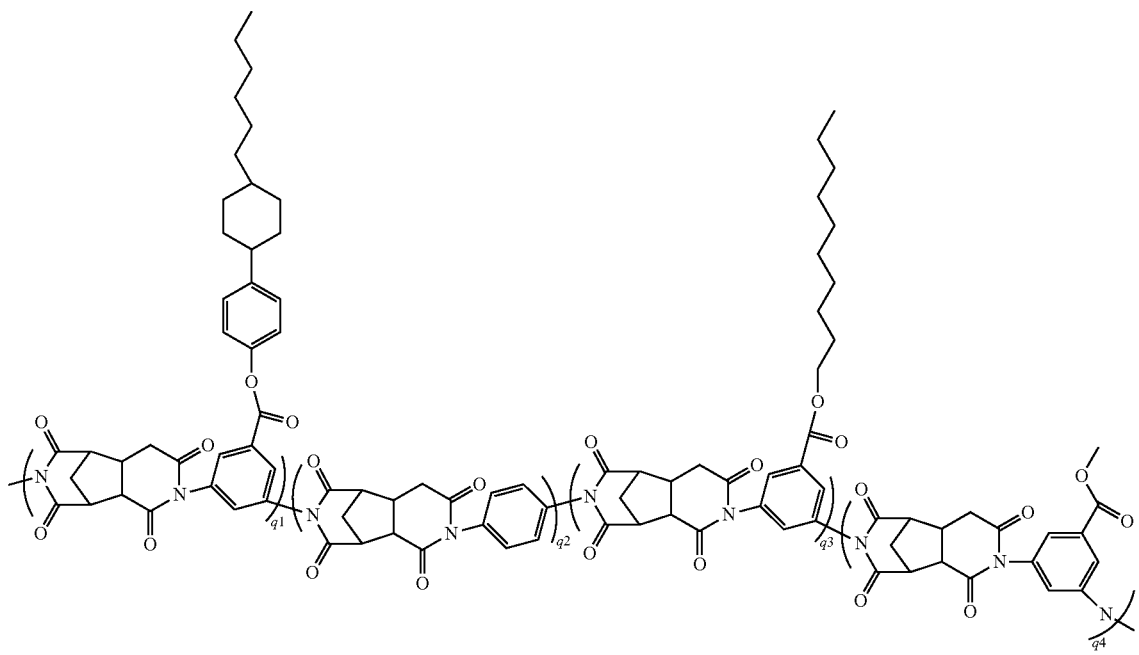

PL1 and PL2 show the compound configuration of a polyimide alignment layer according to an exemplary embodiment. However, exemplary embodiments are not limited thereto. In PL1 and PL2, q1 to q4 may be each independently an integer of 0 to 2.

FIG. 7A may illustrate disposing a reactive mesogen between a first substrate and a second substrate (S130) and disposing a liquid crystal compound between a first substrate and a second substrate (S150) in the method of manufacturing a curved liquid crystal display device shown in FIG. 1 according to an exemplary embodiment.

The reactive mesogen RM provided between the first substrate SUB1 and the second substrate SUB2 in FIG. 7A may include at least one of a first reactive mesogen represented by the following Formula 1 and a second reactive mesogen represented by the following Formula 2. In addition, in the reactive mesogen provided in FIG. 7A, a third reactive mesogen represented by the following Formula 3 may be further included.

That is, in the manufacture of the curved liquid crystal display device DD shown in FIG. 5 according to an exemplary embodiment, wherein the radius of curvature of the first substrate SUB1 is greater than the radius of curvature of the second substrate SUB2, a reactive mesogen including all of the first reactive mesogen represented by Formula 1, the second reactive mesogen represented by Formula 2, and the third reactive mesogen represented by Formula 3 may be provided on the first substrate SUB1.

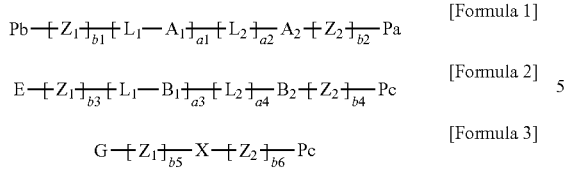

[Formula 1]

[Formula 2]

[Formula 3]

In Formulas 1 and 2, $A_1$, $A_2$, $B_1$ and $B_2$ may be each independently a substituted or unsubstituted divalent hydrocarbon ring, or a substituted or unsubstituted divalent heterocycle. In addition, in Formulas 1 and 2, a1, a3, b1, b2, b3 and b4 may be each independently an integer of 0 to 6, and a2 and a4 may be each independently 0 or 1. In Formula 3, b5 and b6 may be each independently an integer of 0 to 6.

The same explanation on the method of manufacturing a curved liquid crystal display device of FIG. 1 according to an exemplary embodiment may be applied to that of the first reactive mesogen and the second reactive mesogen of Formulas 1 and 2. In addition, the same explanation on Formula 3 described on the method of manufacturing a curved liquid crystal display device of according to an exemplary embodiment may be applied to that of the third reactive mesogen represented by Formula 3.

For example, in the first reactive mesogen represented by Formula 1, each of A1 and A2 may be independently selected from the substituted or unsubstituted ring compounds of the following A-1 to A-35.

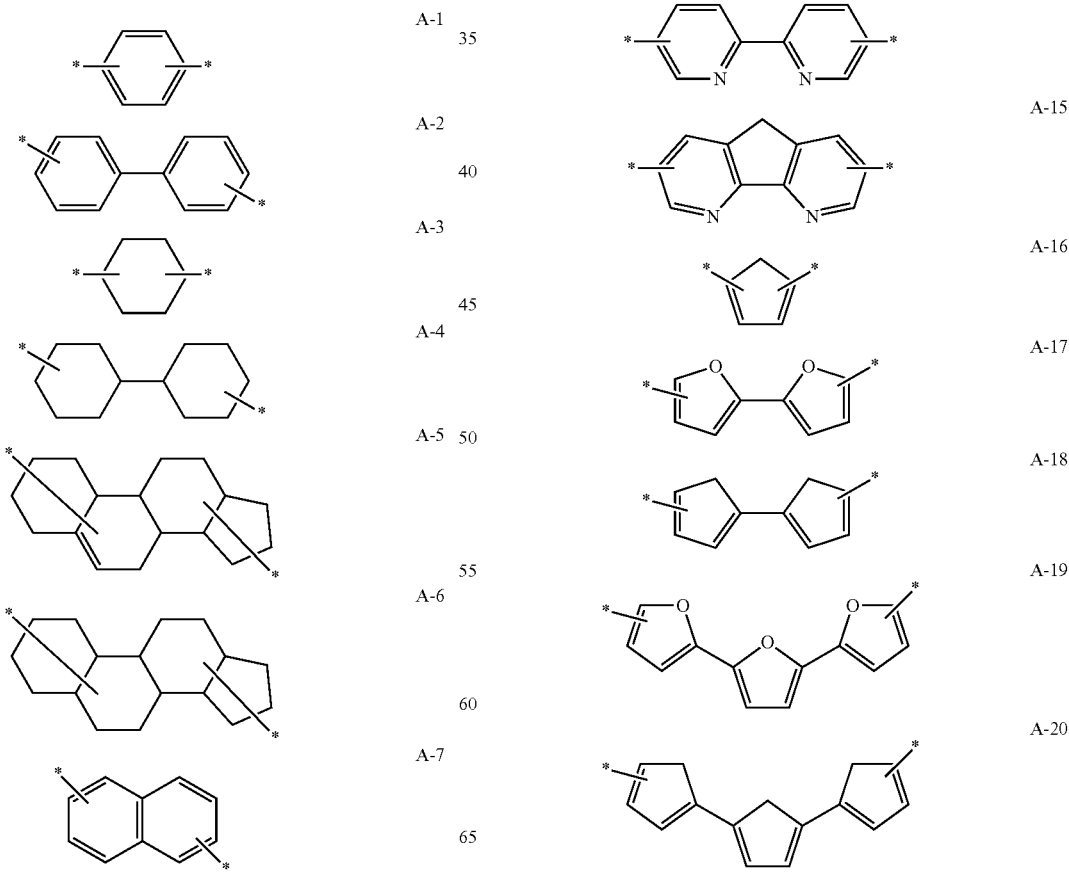

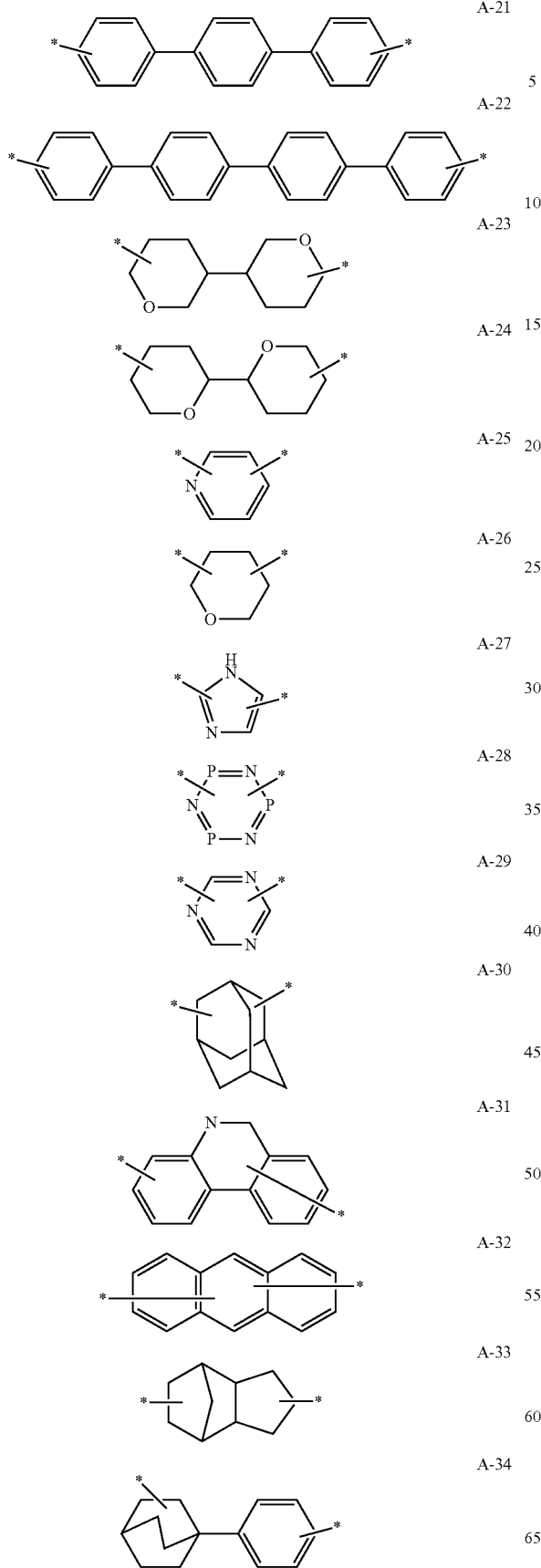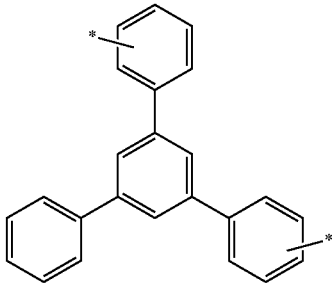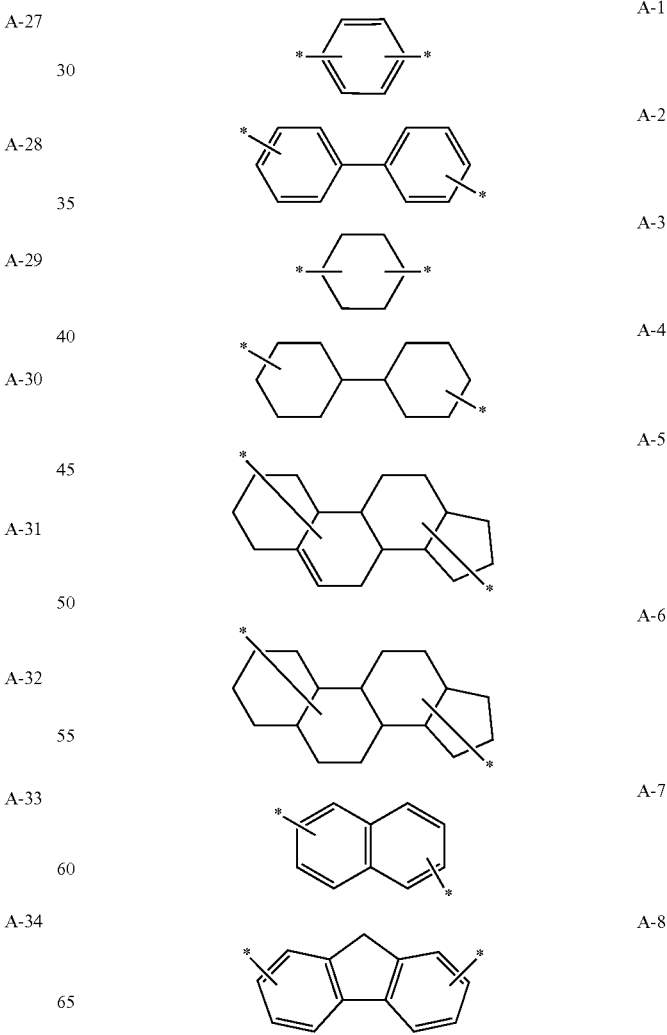

$A_1$ and $A_2$ may be each independently substituted with at least one of a deuterium atom, a halogen atom, —OH, —NH$_2$, —CN, —CF$_3$, —B(OH)$_2$, or —R$^0$(CH$_2$)$_r$R$^0$. Here, R$^0$ is one of —O—, —NH—, —S—, —C=O, or —O—C=O, R$^1$ is one of —OH, —NH$_2$, —CN, —CF$_3$, —B(OH)$_2$, —SH, and —CH$_3$, and r is an integer of 1 to 12.

In the second reactive mesogen represented by Formula 2, $B_1$ and $B_2$ may be each independently selected from the substituted or unsubstituted ring compounds of A-1 to A-22.

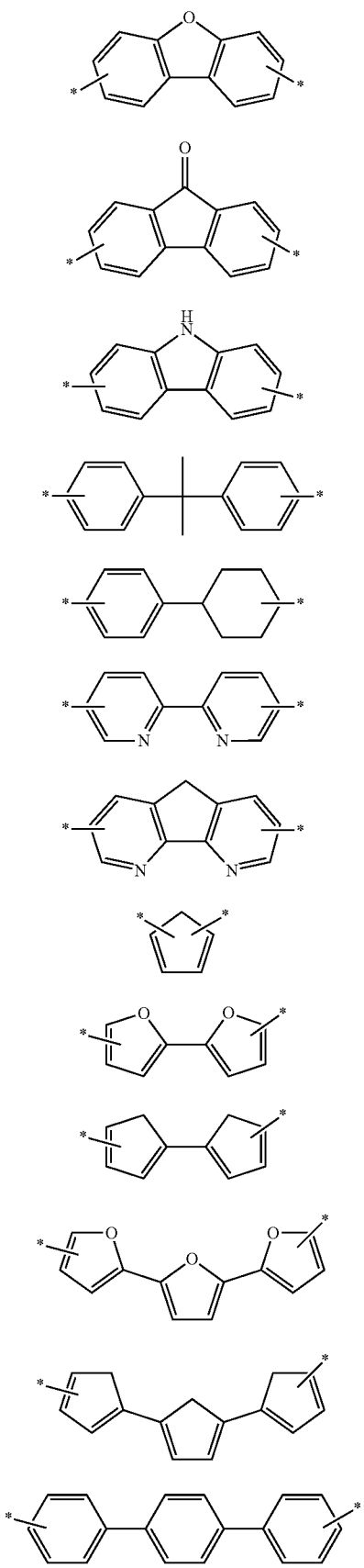

A-9
A-10
A-11
A-12
A-13
A-14
A-15
A-16
A-17
A-18
A-19
A-20
A-21

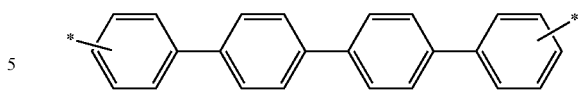

A-22

In Formulas 1 and 2, $L_1$ and $L_2$ may be each independently a direct linkage, —O—, —S—, —CO—, —COO—, —OCOO—, —O(CH$_2$)$_{k1}$—, —S(CH$_2$)$_{k1}$—, —O(CF$_2$)$_{k1}$—, —S(CF$_2$)$_{k1}$—, —(CH$_2$)$_{k1}$—, —CF$_2$CH$_2$—, —(CF$_2$)$_{k1}$, —CH=CH—, —CF=CF—, —C≡C—, —CH=CH—COO—, or —(CH$_2$)$_{k1}$—COO—(CH$_2$)$_{k2}$—O—. Here, k1 and k2 may be each independently an integer of 0 to 4.

$Z_1$ and $Z_2$ may be each independently a direct linkage, —O—, —S—, —CO—, —COO—, —OCOO—, —O(CH$_2$)$_{m1}$—, —S(CH$_2$)$_{m1}$—, —O(CF$_2$)$_{m1}$—, —S(CF$_2$)$_{m1}$—, —(CH$_2$)$_{m1}$—, —CF$_2$CH$_2$—, —(CF$_2$)$_{m1}$—, —CH=CH—, —CF=CF—, —C≡C—, —CH=CH—COO—, —(CH$_2$)$_{m1}$—COO—, —(CH$_2$)$_{m1}$—COO—(CH$_2$)$_{m2}$—O—, —CH—(S$_p$—Pa)—, —CH$_2$CH—(S$_p$—Pa)—, or —(CH—(S$_p$—Pa)—CH—(S$_p$—Pa))—. In this case, m1 and m2 may be each independently an integer of 0 to 4. $S_p$ may be a direct linkage or a spacer group, and Pa may be a polymerizable group.

The spacer group may be a connecting group between a core group (for example, $A_2$) and a polymerizable group, or a core group and an anchoring group. For example, the spacer group may be alkyl having 1 to 12 carbon atoms, or alkoxy having 1 to 12 carbon atoms. However, exemplary embodiments are not limited thereto, and the spacer group may be, for example, —(CH$_2$)$_{i1}$—, —(CH$_2$CH$_2$O)$_{i1}$—CH$_2$CH$_2$—, —CH$_2$CH$_2$—S—CH$_2$CH$_2$—, —CH$_2$CH$_2$—NH—CH$_2$CH$_2$—, or —(SiR$^1$R$^2$—O)$_{i1}$—. In this case, $R^1$ and $R^2$ may be each independently a hydrogen atom, or alkyl having 1 to 12 carbon atoms, and i1 may be an integer of 1 to 12.

In Formula 1, Pa and Pb may be each independently one group among P-1 to P-10. In P-10, p may be an integer of 1 to 20. However, a case where both Pa and Pb are P-10 is excluded. That is, in the case where Pa is P-10, Pb may be any one selected from P-1 to P-9, and in the case where Pb is P-10, Pa may be any one selected from P-1 to P-9.

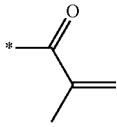

P-1

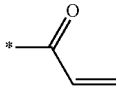

P-2

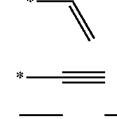

P-3

P-4

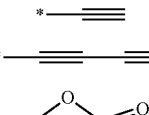

P-5

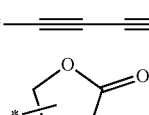

P-6

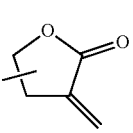

-continued

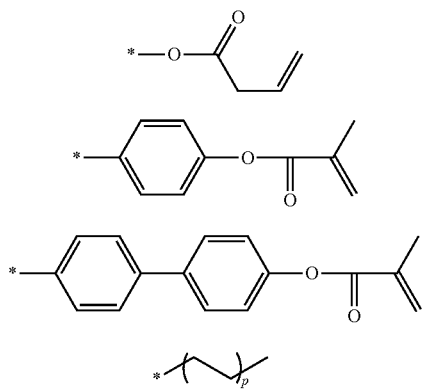

Meanwhile, E may be an anchoring group in Formula 2. E may be a hydrogen bonding functional group including at least one of nitrogen or oxygen. That is, E includes at least one of a nitrogen atom or an oxygen atom and may function as a functional group forming a hydrogen bond.

In the second reactive mesogen represented by Formula 2, Pc may be a polymerizable reactive group. For example, Pc may be a reactive group for a chain polymerization. Particularly, Pc may be a reactive group containing a —C=C— double bond or a —C≡C— triple bond.

Pc may be any one selected from P-1 to P-9.

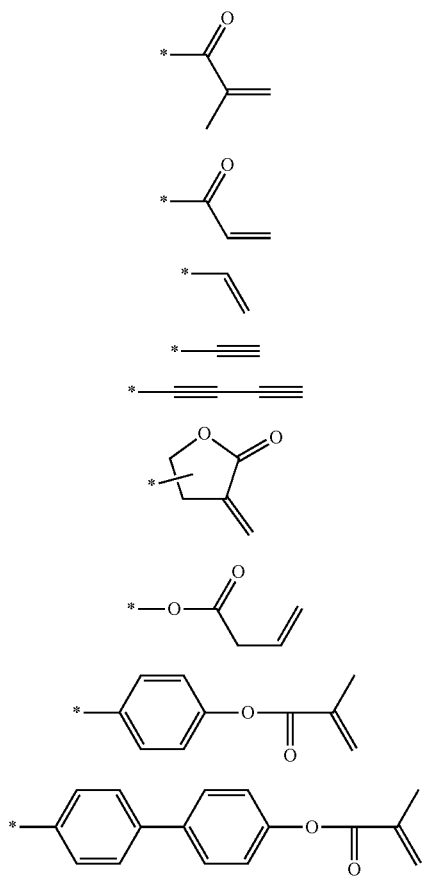

In the third reactive mesogen represented by Formula 3, X may be any one of X-1 to X-17.

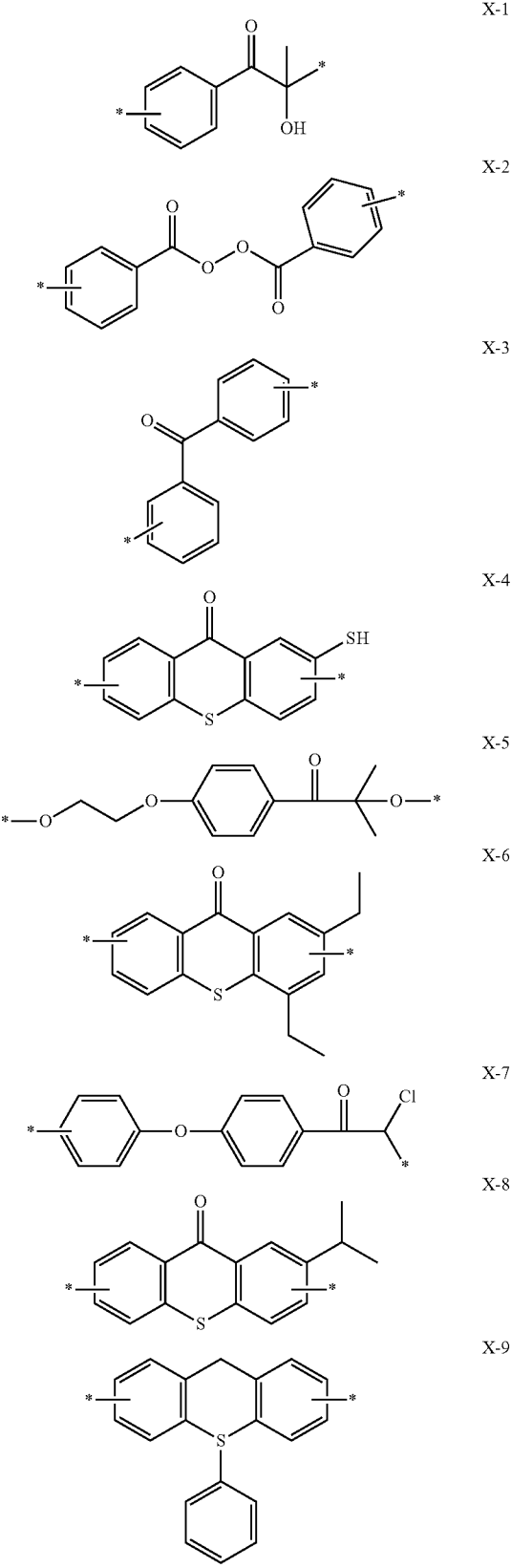

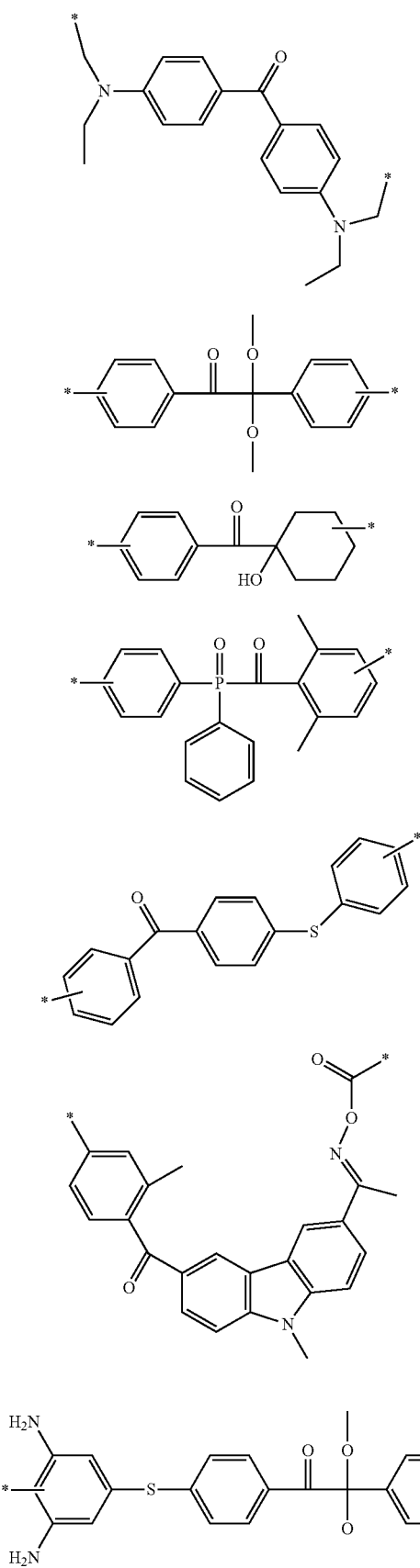

In the third reactive mesogen represented by Formula 3, $Z_1$, $Z_2$, and Pc are the same as defined in Formulas 1 and 2. In Formula 3, the same explanation on $Z_1$ to $Z_2$, and Pc in Formulas 1 and 2 may be applied to that of $Z_1$ to $Z_2$, and Pc. In addition, b5 and b6 are each independently an integer of 0 to 6.

In Formula 3, G may be one substituted with at least one of a deuterium atom, a halogen atom, —OH, —SH, —NH$_2$, —CN, —CF$_3$, —B(OH)$_2$, or —R$^{\circ}$(CH$_2$)$_n$R. Here, R$^{\circ}$ may be one of —O, —NH, —S, —C=O, and —O—C=O, R$^{\circ\circ}$ may be one of —OH, —NH$_2$, —CN, —CF$_3$, —B(OH)$_2$, —SH, and —CH$_3$, and n may be an integer of 1 to 12.

In the third reactive mesogen represented by Formula 3, a core part X may include a carbonyl group, and thus, may produce radicals and play the role of an initiator which causes a polymerization reaction of a reactive mesogen.

In the step of disposing a reactive mesogen and a liquid crystal compound shown in FIG. 7A, the reactive mesogen RM may include a first reactive mesogen RM1 and a third reactive mesogen RM3. Meanwhile, the reactive mesogen RM may include all the first, second, and third reactive mesogens. Although not shown in FIG. 7A, the reactive mesogen may include the second reactive mesogen and the third reactive mesogen without the first reactive mesogen.

At least one reactive mesogen RM among the first reactive mesogen and the second reactive mesogen may be included in an amount of from about 0.05 to about 0.9 parts by weight on the basis of about 100 parts by weight of a liquid crystal compound provided between the first substrate SUB1 and the second substrate SUB2. The liquid crystal compound may be a compound including a plurality of liquid crystal molecules and provided between the first substrate SUB1 and the second substrate SUB2.

In the case where the amount included of at least one reactive mesogen, among the first reactive mesogen and the second reactive mesogen, is less than about 0.05 parts by weight, the formation of an alignment layer capable of aligning liquid crystal molecules may not be favorable. In addition, in the case where the amount included of at least one reactive mesogen, among the first reactive mesogen and the second reactive mesogen, is greater than about 0.9 parts by weight, the solubility of the reactive mesogen with respect to a liquid crystal compound may deteriorate.

In addition, the third reactive mesogen may be provided in an amount of about 0.001 to about 0.6 parts by weight on the basis of 100 parts by weight of the liquid crystal compound. In the case where the amount of the third reactive mesogen is less than about 0.001 parts by weight, a radical generating part which may function as an initiator may be insufficient, and the polymerization rate of the reactive mesogen may not be improved. In addition, in the case where the amount of the third reactive mesogen is greater than about 0.6 parts by weight, an excessive polymerization reaction of the reactive mesogen may not arise. In this case, due to the excessive progress of the polymerization reaction, the first alignment inducing layer ALN1 may not satisfy physical properties required for aligning liquid crystal molecules in the curved liquid crystal display device according to an exemplary embodiment. For example, in the case where the amount of the third reactive mesogen is greater than about 0.6 parts by weight, the pretilt angle of liquid crystal molecules aligned on the first alignment inducing layer ALN1 may be deviated from desired conditions.

FIG. 7B may show a state after disposing the liquid crystal compound and the reactive mesogen in FIG. 7A. FIG. 7B illustrates forming an electric field between a first curved substrate SUB1 and a second substrate SUB2 and irradiating first ultraviolet rays. FIG. 7B may illustrate forming an electric field between a first substrate and a second substrate (S170) and irradiating first ultraviolet rays at a reactive mesogen (S180) in the method of manufacturing a curved liquid crystal display device according to an exemplary embodiment in FIG. 1.

Referring to FIG. 7B, the reactive mesogen RM may move not on the second alignment inducing layer ALN2 formed as a polyimide alignment layer but on the first substrate SUB1 so as to be adsorbed onto the substrate. Although not shown in the drawing, the first substrate SUB1 may include a transparent electrode layer. For example, the reactive mesogen RM may move so as to be adsorbed onto the transparent electrode layer (not shown).

The reactive mesogen RM may polymerize via a polymerization reaction by the first ultraviolet rays. In addition, due to the electric field formed between the first substrate SUB1 and the second substrate SUB2, liquid crystal molecules LC may be aligned at a predetermined pretilt angle.

FIG. 7C illustrates a state of a first alignment inducing layer ALN1 formed by a polymerized reactive mesogen via the first ultraviolet rays. For example, FIG. 7C may be a final state of a curved liquid crystal display device thus manufactured. FIG. 7C may illustrate a state after the first substrate SUB1 and the second substrate SUB2 are bent.

As shown in FIG. 7C, the first alignment inducing layer ALN1 formed by the polymerized reactive mesogen may be formed using spherical or elliptical particles having a random size. The spherical or elliptical particles having a random size may be particles obtained by the polymerization reaction of a reactive mesogen. For example, the first alignment including layer ALN1 may be a layer formed by laminating the particles which have a random size and are formed by the reactive mesogen.

Referring to FIGS. 5 and 7C, the pretilt angle of the first liquid crystal molecules LC1 disposed adjacent to the first alignment inducing layer ALN1 formed using a reactive mesogen, and the pretilt angle of the second liquid crystal molecules LC2 disposed adjacent to the second alignment inducing layer ALN2 formed as a polyimide alignment layer may be different from each other.

In the curved liquid crystal display device shown in FIGS. 5 and 7C according to an exemplary embodiment, display quality may be improved by controlling the pretilt angle of the first liquid crystal molecules LC1 less than the pretilt angle of the second liquid crystal molecules LC2.

Figure 8:
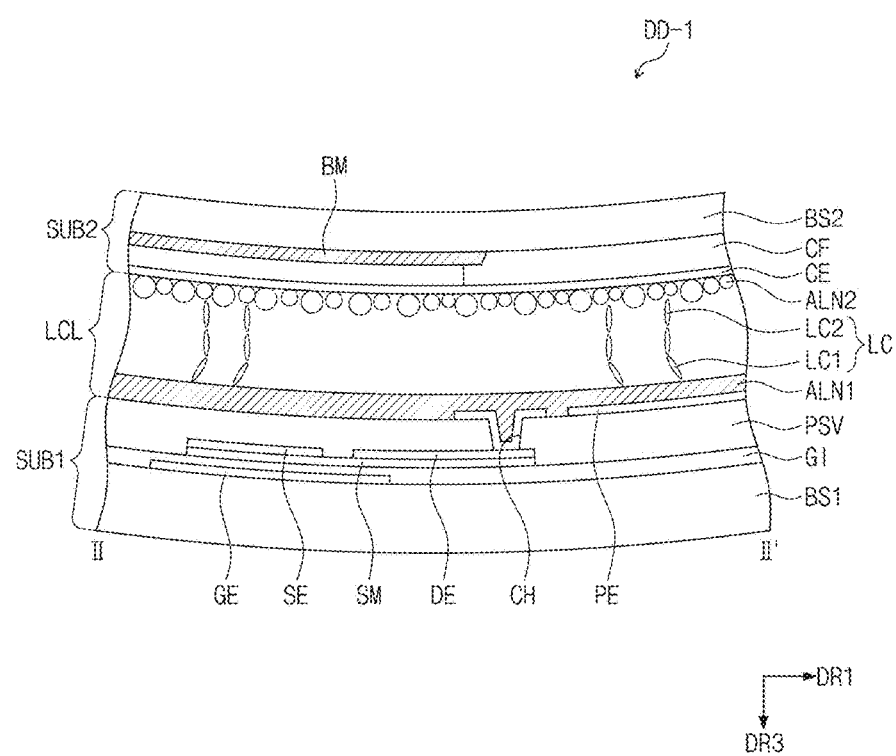
FIG. 8 is a cross-sectional view of a curved liquid crystal display device according to an exemplary embodiment.
Figure 9A:
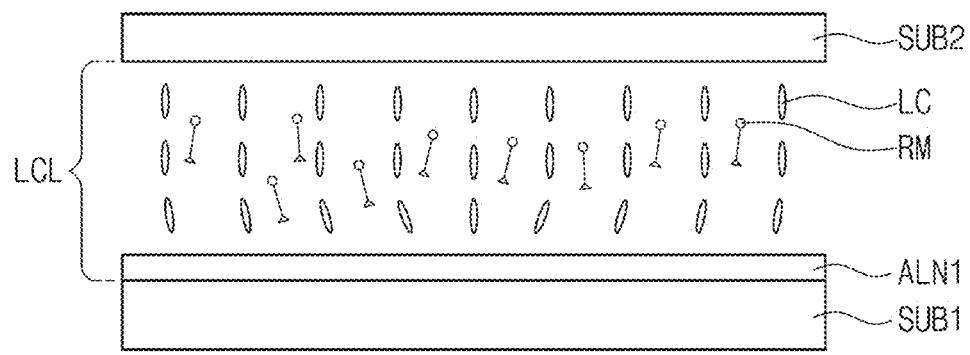
FIGS. 9A, 9B, and 9C are diagrams briefly illustrating manufacturing steps of a curved liquid crystal display device shown in FIG. 8 according to an exemplary embodiment.
Figure 9B:
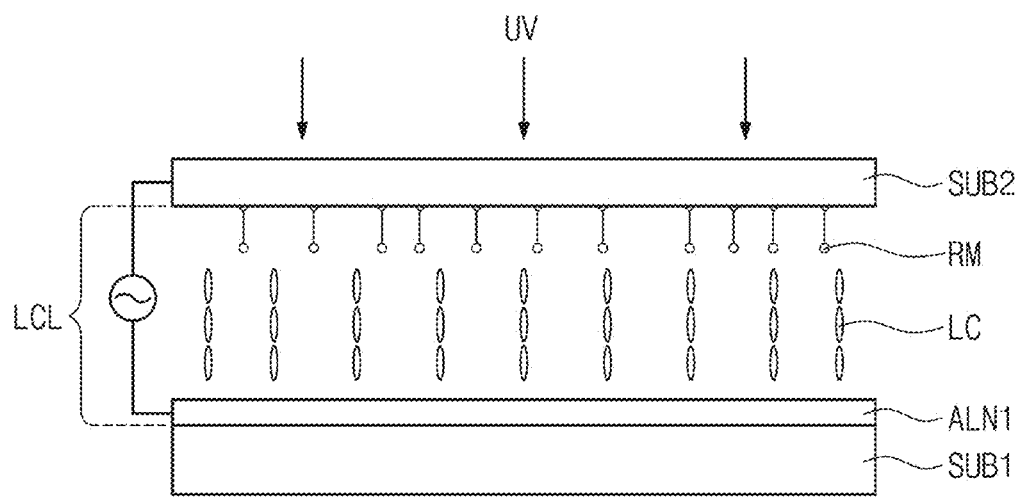
Figure 9C:
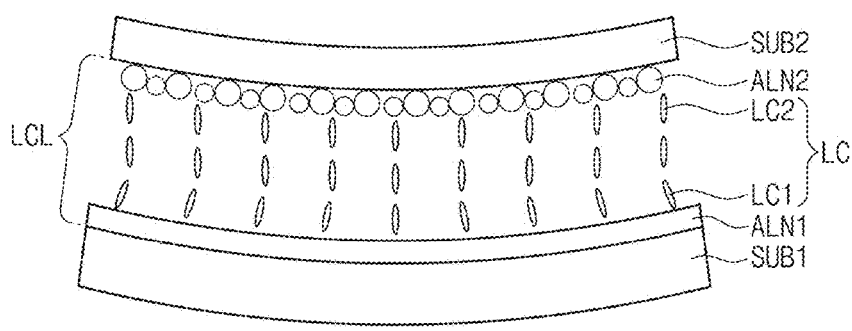

FIG. 8 is a cross-sectional view of a curved liquid crystal display device DD-1 according to an exemplary embodiment. FIGS. 9A, 9B, and 9C are diagrams briefly illustrating manufacturing steps of a curved liquid crystal display device shown in FIG. 8 according to an exemplary embodiment.

In the following explanation of the exemplary embodiment with respect to FIG. 8, the features similar to the curved liquid display device DD shown in FIG. 5 will be omitted. Instead, the following explanation will focus features of the curved liquid display device DD-1 of FIG. 8 that are different from the curved liquid crystal display device DD-1 of FIG. 5. In addition, merely the difference between FIGS. 9A, 9B, and 9C and FIGS. 7A, 7B, and 7C will be explained for brevity.

The curved liquid crystal display device DD-1 shown in FIG. 8 according to an exemplary embodiment includes a bent first substrate SUB1, a bent second substrate SUB2 opposing the first substrate SUB1, and a liquid crystal layer LCL provided between the first substrate SUB1 and the second substrate SUB2.

In the curved liquid crystal display device DD-1 shown in FIG. 8 according to an exemplary embodiment, the radius of curvature of the first substrate SUB1 may be greater than or equal to the radius of curvature of the second substrate SUB2. For example, the radius of curvature of the first substrate SUB1 may be greater than the radius of curvature of the second substrate SUB2. That is, the first substrate SUB1 and the second substrate SUB2 may be curved substrates.

In the curved liquid crystal display device DD-1 shown in FIG. 8 according to an exemplary embodiment, a first alignment inducing layer ALN1 disposed on the first substrate SUB1 may be formed as a polyimide alignment layer. In addition, a second alignment inducing layer ALN2 disposed on the second substrate SUB2 may be an alignment layer formed using a polymerized reactive mesogen.

In the curved liquid crystal display device DD-1 shown in FIG. 8 according to an exemplary embodiment, the pretilt angle of first liquid crystal molecules LC1 adjacent to the first substrate SUB1 which corresponds to a lower substrate may be less than the pretilt angle of second liquid crystal molecules LC2 adjacent to the second substrate SUB2.

An average value of the first pretilt angle may be less than or equal to an average value of the second pretilt angle. The first pretilt angle may be from about 80 to about 90 degrees. The first pretilt angle may be from about 80 to about 89 degrees. For example, the first pretilt angle may be from about 88 to about 89 degrees. In addition, the second pretilt angle may be from about 89 to about 90 degrees.

In addition, in an exemplary embodiment shown in FIG. 8, the first alignment inducing layer ALN1 may be formed to include polyimide, and the second alignment inducing layer ALN2 may be formed to include a polymerized reactive mesogen, so that the pretilt angle of the first liquid crystal molecules LC1 and the pretilt angle of the second liquid crystal molecules LC2 may be formed different and display quality of the curved liquid crystal display device may be improved.

In a curved liquid crystal display device according to an exemplary embodiment, at least one of the first alignment inducing layer or the second alignment inducing layer is formed as a polyimide alignment layer, and the remaining one is formed as an alignment layer including a polymerized reactive mesogen, to control the pretilt angles between liquid crystal molecules adjacent to each alignment inducing layer and to improve texture defects.

FIG. 9A illustrates a step of providing a liquid crystal compound including liquid crystal molecules LC and a reactive mesogen RM between a first substrate SUB1 and a second substrate SUB2.

The curved liquid crystal display device shown in FIG. 9A may include a first substrate SUB1, an opposing second substrate SUB2, and a first alignment inducing layer ALN1 on the first substrate SUB1. The first alignment inducing layer ALN1 may be a polyimide alignment layer formed by providing an alignment solution.

In FIGS. 8 and 9A, the first alignment inducing layer ALN1 may be an alignment layer formed from a polyimide alignment solution including at least one dianhydride compound and at least one diamine compound.

In FIG. 9A, the first alignment inducing layer ALN1 may be formed when disposing a polyimide alignment layer (S110) in the method of manufacturing a curved liquid crystal display device shown in FIG. 1 according to an exemplary embodiment. In other words, the first alignment inducing layer ALN1, which is a polyimide alignment layer, may be formed by disposing an alignment solution on the first substrate SUB1.

The alignment solution disposed on the first substrate SUB1 may include at least one dianhydride compound selected from AH-1 to AH-3 in the following Compound Group 3, and a diamine compound of AM-1 and at least one diamine compound selected from AM-2 to AM-4 in the following Compound Group 4. In other words, the alignment solution disposed on the first substrate SUB1 includes at least one dianhydride compound selected from AH-1 to AH-3 in the following Compound Group 3 and a diamine compound essentially including AM-1 and including at least one selected from AM-2 to AM-4.

[Compound Group 3]

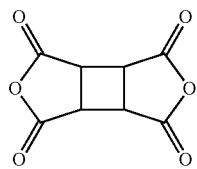

AH-1

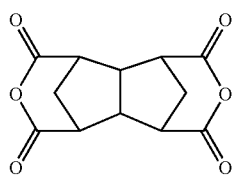

AH-2

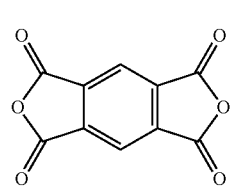

AH-3

[Compound Group 4]

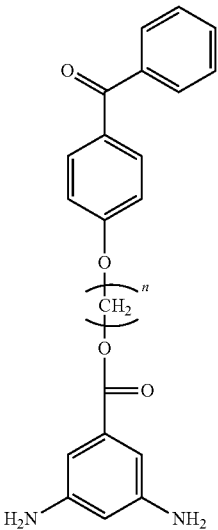

AM-1

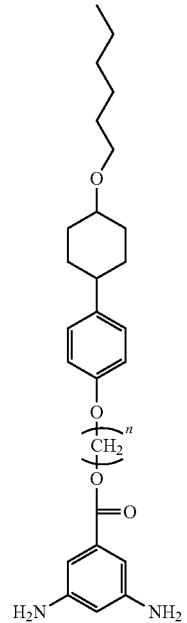

AM-2

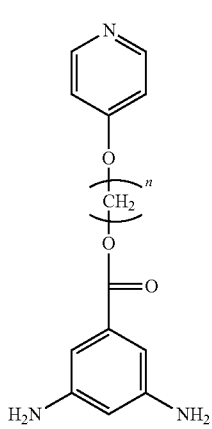

AM-3

AM-4
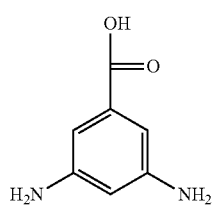
AM-5
In Compound Group 4, n may be an integer of 1 to 12.
For example, in the curved liquid crystal display device DD-1 shown in FIG. 8 according to an exemplary embodiment, the first alignment inducing layer ALN1 may be a polyimide alignment layer having a structure of the following PL3 or PL4.
[PL3]
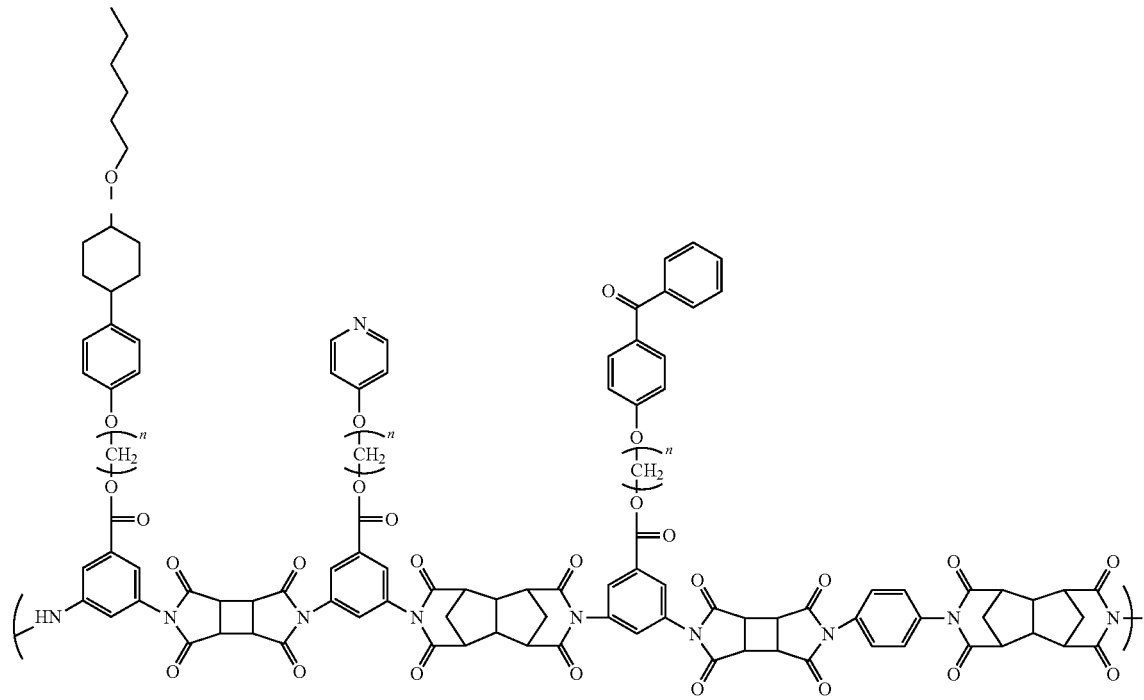
[PL4]
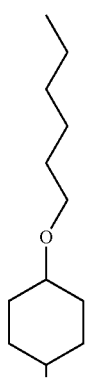

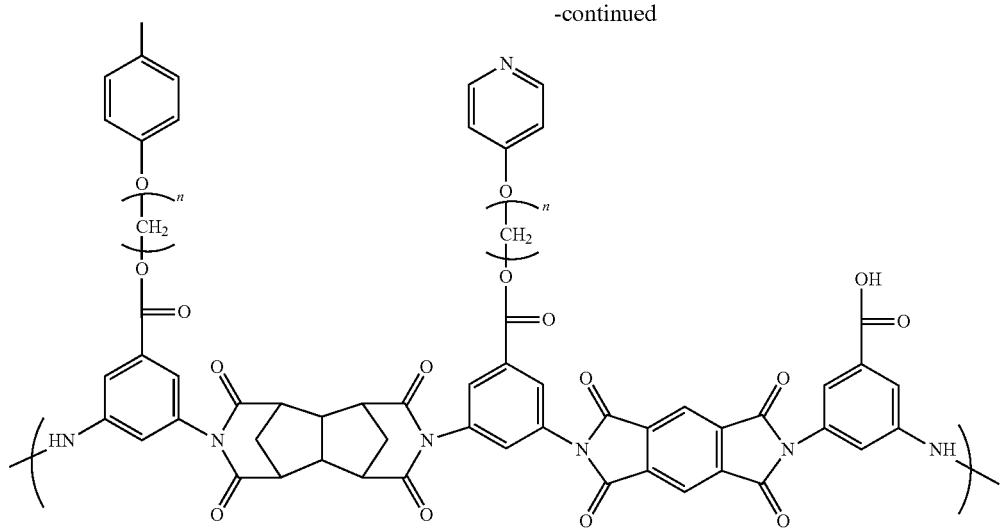

PL3 or PL4 is an example of the polyimide compound. However, exemplary embodiments of the inventive concept are not limited thereto. The first alignment inducing layer ALN1 may use various polyimide compounds which may be formed from the combination of Compound Group 3 and Compound Group 4.

In addition, in an exemplary embodiment shown in FIGS. 8 and 9A, the alignment solution provided on to the first substrate SUB1 may further include a photoinitiator.

The photoinitiator may use benzyl dimethyl ketal, α-hydroxyketone, methyl benzoylformate, acrylophosphine oxide, titanocene, α-aminoketone, α-aminoacetophenone, oxime ester, benzophenone, phenyletone, α-dichloro, acetophenone, α-chloro, thioxanthone, benzoinalkyl ether, etc.

Meanwhile, the alignment solution may further include a vertical alignment group. In addition, the alignment solution may further include an additive such as an antioxidant.

FIG. 9A may illustrate disposing a reactive mesogen between a first substrate and a second substrate (S130), and disposing a liquid crystal compound between a first substrate and a second substrate (S150) in the method of manufacturing a curved liquid crystal display device shown in FIG. 1 according to an exemplary embodiment.

In FIG. 9A which illustrates a manufacturing step of the curved liquid crystal display device DD shown in FIG. 8 according to an exemplary embodiment, the reactive mesogen RM provided may include at least one of a first reactive mesogen represented by the following Formula 1 or a second reactive mesogen represented by the following Formula 2.

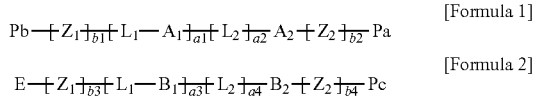

[Formula 1]

[Formula 2]

In Formulas 1 and 2, $A_1$, $A_2$, $B_1$ and $B_2$ may be each independently a substituted or unsubstituted divalent hydrocarbon ring, or a substituted or unsubstituted divalent heterocycle. In addition, in Formulas 1 and 2, a1, a3, b1, b2, b3 and b4 may be each independently an integer of 0 to 6, and a2 and a4 may be each independently 0 or 1.

The explanation on the method of manufacturing the curved liquid crystal display device shown in FIG. 1 according to an exemplary embodiment may be applied to that of the first reactive mesogen and the second reactive mesogen respectively represented by Formula 1 and Formula 2.

FIG. 9B may illustrate a state obtained after providing a liquid crystal compound and a reactive mesogen in FIG. 9A. FIG. 9B illustrates forming an electric field between a first curved substrate SUB1 and a second substrate SUB2 and irradiating first ultraviolet rays. FIG. 9B may illustrate forming an electric field between a first substrate and a second substrate and irradiating first ultraviolet rays at a reactive mesogen in the method of manufacturing a curved liquid crystal display device in FIG. 1 according to an exemplary embodiment.

Referring to FIG. 9B, the reactive mesogen RM may move and adsorb onto the second substrate SUB2 without absorbing onto the first alignment inducing layer ALN1 formed as a polyimide alignment layer. Although not shown, the second substrate SUB2 may include a transparent electrode layer. For example, the transparent electrode (not shown) may be a common electrode layer, and the reactive mesogen RM may move to be adsorbed onto the transparent electrode layer (not shown).

The reactive mesogen RM may undergo a polarization reaction in the presence of first ultraviolet rays. In addition, liquid crystal molecules LC may be aligned with a predetermined pretilt angle due to the electric field formed between the first substrate SUB1 and the second substrate SUB2.

FIG. 9C may illustrate a state of forming a second alignment inducing layer ALN2 by a polymerizing reactive mesogen by first ultraviolet rays. As shown in FIG. 9C, the second alignment inducing layer ALN2 formed by a polymerized reactive mesogen as shown in FIG. 9C may be formed using spherical or elliptical particles having a random size. The spherical or elliptical particles having a random size may be particles obtained by the polymerization reaction of a reactive mesogen. For example, the second alignment inducing layer ALN2 may be a layer formed by laminating the particles which have a random size and are formed by the reactive mesogen.

FIG. 9C may illustrate a final state in the manufacturing of a curved liquid crystal display device. FIG. 9C may illustrate a state after bending the first substrate SUB1 and the second substrate SUB2.

Referring to FIGS. 8 and 9C, the pretilt angle of the second liquid crystal molecules LC2 disposed adjacent to the second alignment inducing layer ALN2 (formed using a reactive mesogen), and the pretilt angle of the first liquid crystal molecules LC1 disposed adjacent to the first alignment inducing layer ALN1 (formed as a polyimide alignment layer) may be different from each other.

That is, in the curved liquid crystal display device shown in FIGS. 8 and 9C according to an exemplary embodiment, display quality may be improved by controlling the 10o pretilt angle of the first liquid crystal molecules LC1 to be less than the pretilt angle of the second liquid crystal molecules LC2.

The curved liquid crystal display device shown in FIGS. 5 and 8 according to an exemplary embodiment is a super vertical alignment (SVA) mode liquid crystal display device. However, exemplary are not limited thereto, and a vertical alignment mode or a parallel mode liquid crystal display device having another type may be used.

The configuration of a curved liquid crystal display device in which one of the first alignment inducing layer and a second alignment inducing layer is formed as a polyimide alignment layer, and the remaining alignment inducing layer is formed using a polymerized reactive mesogen, may be attained as a liquid crystal display device having various shapes, which require a liquid crystal alignment inducing layer different from that in the above-described embodiments of FIG. 5 and FIG. 8.

For example, the curved liquid crystal display device according to an exemplary embodiment may be a photoluminescent liquid crystal display (PL-LCD). The PL-LCD may be a liquid crystal display device including a color conversion member formed including a fluorescent material or quantum dots.

Figure 10:
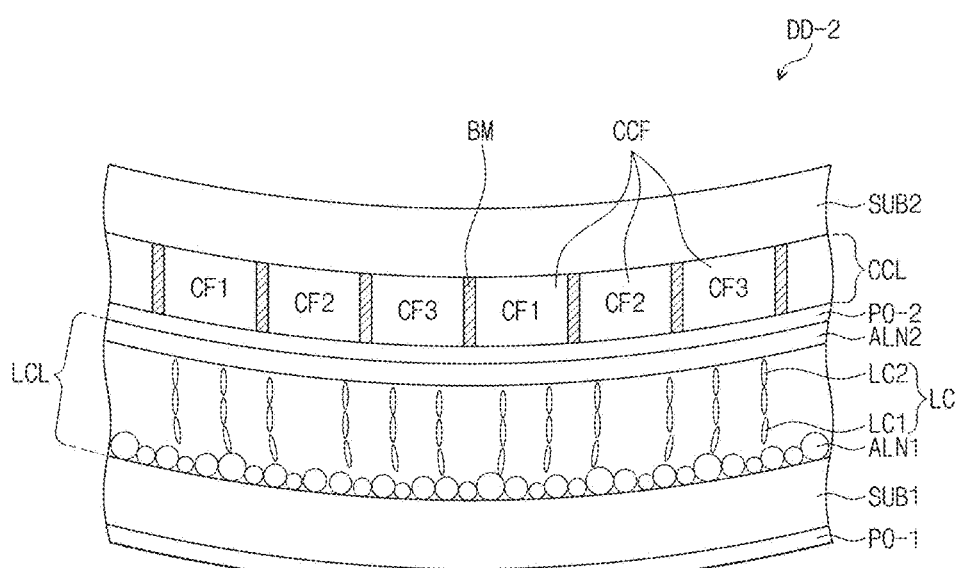
FIG. 10 is a cross-sectional view of a curved liquid crystal display device according to an exemplary embodiment.

FIG. 10 is a cross-sectional view of a PL-LCD according to an exemplary embodiment. The PL-LCD shown in FIG. 10 may be an exemplary embodiment of a curved liquid crystal display device. The curved liquid crystal display device DD-2 shown in FIG. 10 according to an exemplary embodiment may include a first substrate SUB1, a second substrate SUB2 opposing to the first substrate SUB1, a liquid crystal layer LCL disposed between the first substrate SUB1 and the second substrate SUB2, and a color conversion member CCL.

In an exemplary embodiment shown in FIG. 10, the first alignment inducing layer ALN1 is an alignment layer formed using a polymerized reactive mesogen, and the second alignment inducing layer ALN2 may be an alignment layer formed as a polyimide alignment layer.

The liquid crystal layer LCL may include a first alignment inducing layer ALN1, a second alignment inducing layer ALN2, and liquid crystal molecules LC aligned between the alignment inducing layers ALN1 and ALN2. The liquid crystal molecules LC between the alignment inducing layers ALN1 and ALN2 may be vertically aligned or pretilted with a predetermined angle with respect to curved substrates SUB1 and SUB2. For example, first liquid crystal molecules LC1 may be aligned so as to have a less pretilt angle than second liquid crystal molecules LC2 in an exemplary embodiment shown in FIG. 10.

Meanwhile, the same explanation on the first alignment inducing layer ALN1, the second alignment inducing layer ALN2 and the liquid crystal molecules LC in FIG. 5 may be applied to that of the alignment inducing layers ALN1 and ALN2 and the liquid crystal molecules LC shown in FIG. 10.

In addition, in an exemplary embodiment of the PL-LCD, different from FIG. 10, the first alignment inducing layer ALN1 may be formed as a polyimide alignment layer, and the second alignment inducing layer ALN2 may be formed using a polymerized reactive mesogen. For an exemplary embodiment of forming the first alignment layer ALN1 as a polyimide alignment layer, and the second alignment inducing layer ALN2 using the polymerized reactive mesogen, the same explanation on the first alignment inducing layer ALN1, the second alignment inducing layer ALN2, and the liquid crystal molecules of FIG. 8 may be applied.

Although not shown in FIG. 10, the first substrate SUB1 may include a base substrate and a first electrode layer formed on the base substrate. For example, the first electrode layer formed on the base substrate may be a pixel electrode layer. The second substrate SUB2 may include a base substrate and a second electrode layer formed on the base substrate. For example, the second electrode layer formed on the base substrate in the second substrate SUB2 may be a common electrode layer.

The base substrate may be a polymer substrate, a plastic substrate, a glass substrate, a quartz substrate, etc. In the first substrate SUB1 and the second substrate SUB2, the base substrate may be a transparent insulating substrate. The base substrate may be flexible or rigid.

Under the first substrate SUB1, a first polarization member PO-1 may be disposed. The first polarization member PO-1 may have various exemplary embodiments. For example, the first polarization member PO-1 may be provided as a film type and disposed under the first substrate SUB1 or attached by a separately provided attaching member. Alternatively, the first polarization member PO-1 may be provided as a liquid phase and may be formed via direct coating or deposition onto the first substrate SUB1. Different from the drawing, the first polarization member PO-1 may be disposed between the first substrate SUB1 and the first alignment inducing layer ALN1.

A second polarization member PO-2 may be disposed between the liquid crystal layer LCL and the color conversion member CCL. The second polarization member PO-2 may be formed using a material having a light transmittance. Accordingly, lights provided via the liquid crystal layer LCL may be provided to the color conversion member CCL via the second polarization member PO-2.

The second polarization member PO-2 may polarize, and may selectively reflect or transmit incident lights. For example, the second polarization member PO-2 may be a 10o polarization layer formed adjacent to the liquid crystal layer LCL, and may function as a polarization layer opposite to the first polarization member PO-1. Accordingly, the second polarization member PO-2 may polarize lights incident to the second polarization member PO-2 in an orthogonal direction to a polarization direction by the first polarization member PO-1.

The second polarization member PO-2 may be a coating type polarization layer or a polarization layer formed by deposition. For example, the second polarization member PO-2 may be an in-cell polarizer. As another example, the second polarization member PO-2 may be a wire grid polarizer. However, exemplary embodiments of are not limited thereto. Meanwhile, the disposition of the second polarization member PO-2 is not limited to FIG. 10, and may be disposed on the second substrate SUB2.

Lights penetrated through the second polarization member PO-2 may be provided to the color conversion member CCL. The color conversion member CCL may include a color conversion part CCF and a black matrix BM. The color conversion part CCF may change color according to the energy of light incident via the second polarization member PO-2 or may transmit as it is. Each of filters CF1, CF2, and CF3 of the color conversion part CCF may include at least one optical conversion particle. For example, the color conversion member CCL may be disposed between the second substrate SUB2 and the second polarization member PO-2.

The optical conversion particle may absorb at least a portion of incident lights and emits lights with a certain color or transmits as it is. For example, the photo conversion particle may be a fluorescent material or quantum dots (QD).

Particularly, in an exemplary embodiment shown in FIG. 10, each of the first filter CF1, the second filter CF2, and the third filter CF3 may produce red, green and blue lights, respectively. However, exemplary embodiments are not limited thereto. For example, in the case where a backlight unit (not shown) disposed under the first polarization member PO-1 and providing light to the liquid crystal layer LCL provides blue light, the first filter CF1 and the second filter CF2 respectively produces red and green lights, and the third filter CF3 may not include an optical conversion particle but may penetrate the blue light provided from the backlight unit and transmit as it is.

In an exemplary embodiment shown in FIG. 10, the color conversion member CCL is disposed under the second substrate SUB2. However an exemplary embodiment of the inventive concept is not limited thereto. The color conversion member CCL may be disposed on the second substrate SUB2.

Figure 11A:
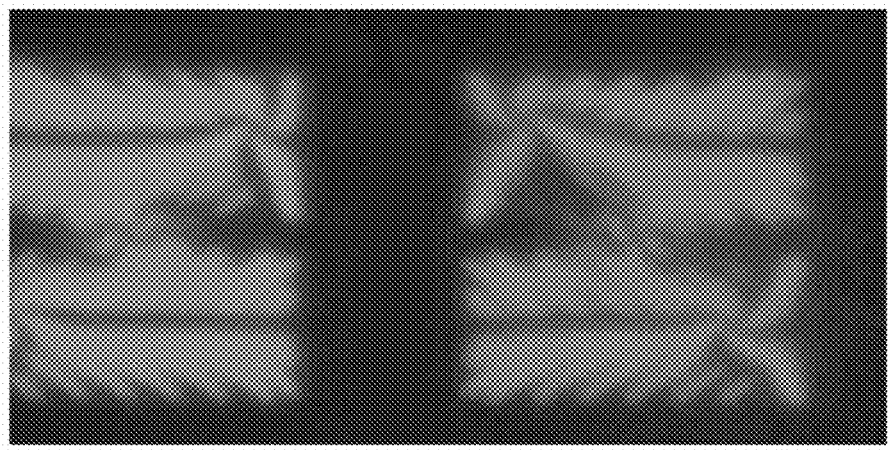
FIG. 11A is an image illustrating display quality of a common curved liquid crystal display device.
Figure 11B:
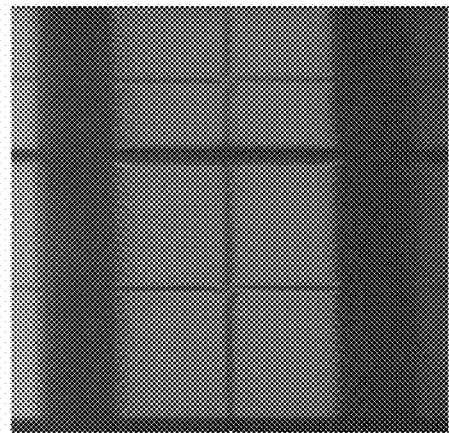
FIG. 11B is an image illustrating display quality of a curved liquid crystal display device according to an exemplary embodiment.

FIG. 11A is an image illustrating display quality of a curved liquid crystal display device, in which alignment inducing layers of an upper substrate and a lower substrate are the same. FIG. 11B is an image illustrating display quality of a curved liquid crystal display device manufactured by a method of manufacturing a curved liquid crystal display device according to an exemplary embodiment.

In a common curved liquid crystal display device, texture defects may arise as in FIG. 11A, because the pretilt angles of liquid crystal molecules adjacent to an upper substrate and a lower substrate are not controlled to be different. In comparison, in the curved liquid crystal display device manufactured using the method of manufacturing a curved liquid crystal display device according to an exemplary embodiment, the pretilt angles of the liquid crystal molecules adjacent to the upper substrate and the lower substrate are controlled to be different, and texture defect may be improved and good display quality as in FIG. 11B may be attained.

In addition, in the method of manufacturing a curved liquid crystal display device according to an exemplary embodiment, a polyimide alignment layer may be formed only on one substrate among the first substrate and the second substrate, and an alignment layer of a polymerized reactive mesogen may be formed on the remaining curved substrate. Accordingly, the manufacturing process may be simplified when compared to a case where polyimide alignment layers are provided to both of them.

For example, in order to improve texture defects in a curved liquid crystal display device, different kinds of polyimide alignment layers are respectively formed on a first substrate and a second substrate to form an alignment inducing layer in a first substrate and an alignment inducing layer in a second substrate different in the conventional curved liquid crystal display device. In comparison, in a method of manufacturing a curved liquid crystal display device according to an exemplary embodiment, a polyimide alignment layer is formed only on one curved substrate. On the remaining curved substrate, an alignment layer is formed using a reactive mesogen provided together with a liquid crystal compound or provided together with an alignment solution to simplify the forming process of an alignment inducing layer for aligning liquid crystal.

In addition, in a curved liquid crystal display device according to an exemplary embodiment, different alignment inducing layers provided on the first substrate and the second substrate are formed, and the pretilt angles of liquid crystal molecules adjacent to the first substrate and the pretilt angle of liquid crystal molecules adjacent to the second substrate may become different, thereby attaining improved display quality.

The method of manufacturing a curved liquid crystal display device according to an exemplary embodiment includes different alignment forming layers on an upper substrate and a lower substrate, and pretilt angles of liquid crystal compounds may be formed different.

In a curved liquid crystal display device according to an exemplary embodiment, the pretilt angle of a liquid crystal compound adjacent to an upper substrate and the pretilt angle of a liquid crystal compound adjacent to a lower substrate may be different, thereby improving display quality.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A method of manufacturing a curved liquid crystal display device, the method comprising:
   forming a polyimide alignment layer by disposing an alignment solution on one of a first substrate and a second substrate opposing to each other;
   disposing a reactive mesogen between the first substrate and the second substrate;
   disposing a liquid crystal compound between the first substrate and the second substrate;
   forming an electric field between the first substrate and the second substrate;
   irradiating first ultraviolet rays at the reactive mesogen; and
   forming an alignment layer comprising the reactive mesogen polymerized by the first ultraviolet rays on one of the first substrate and the second substrate, on which the polyimide alignment layer is not formed.

2. The method of manufacturing a curved liquid crystal display device of claim 1, wherein the reactive mesogen comprises at least one of a first reactive mesogen represented by the following Formula 1 and a second reactive mesogen represented by the following Formula 2:

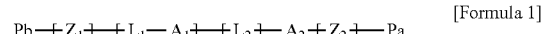

[Formula 1]

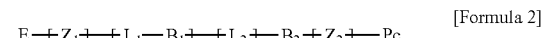

[Formula 2]

where $A_1$, $A_2$, $B_1$, and $B_2$ are each independently a substituted or unsubstituted divalent hydrocarbon ring, or a substituted or unsubstituted divalent heterocycle, a1, a3, b1, b2, b3, and b4 are each independently an integer of 0 to 6, a2 and a4 are each independently 0 or 1, $L_1$ and $L_2$ are each independently a direct linkage, —O—, —S—, —CO—, —COO—, —OCOO—, —O(CH$_2$)$_{k1}$—, —S(CH$_2$)$_{k1}$—, —O(CF$_2$)$_{k1}$—, —S(CF$_2$)$_{k1}$—, —(CH$_2$)$_{k1}$—, —CF$_2$CH$_2$—, —(CF$_2$)$_{k1}$—, —CH=CH—, —CF=CF—, —C≡C—, —CH=CH—COO—, or —(CH$_2$)$_{k1}$—COO—(CH$_2$)$_{k2}$—O—, $k_1$ and $k_2$ are each independently an integer of 0 to 4, $Z_1$ and $Z_2$ are each independently a direct linkage, —O—, —S—, —CO—, —COO—, —OCOO—, —O(CH$_2$)$_{m1}$—, —S(CH$_2$)$_{m1}$—, —O(CF$_2$)$_{m1}$—, —S(CF$_2$)$_{m1}$—, —(CH$_2$)$_{m1}$—, —CF$_2$CH$_2$—, —(CF$_2$)$_{m1}$—, —CH=CH—, —CF=CF—, —C≡C—, —CH=CH—COO—, —(CH$_2$)$_{m1}$—COO—, —(CH$_2$)$_{m1}$—COO—(CH$_2$)$_{m2}$—O—, —CH-(Sp-Pa)—, —CH$_2$CH-(Sp-Pa)—, or —(CH-(Sp-Pa)—CH-(Sp-Pa))—, m1 and m2 are each independently an integer of 0 to 4, Sp is a direct linkage or a spacer group, Pa, Pb and Pc are a polymerizable group, and E is a hydrogen bond functional group comprising at least one of a nitrogen atom or an oxygen atom.

3. The method of manufacturing a curved liquid crystal display device of claim 2, wherein $A_1$ and $A_2$ are each independently selected from substituted or unsubstituted ring compounds of the following A-1 to A-35:

A-1

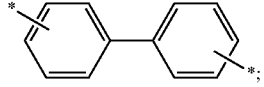
A-2

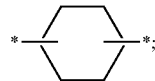
A-3

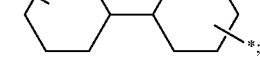
A-4

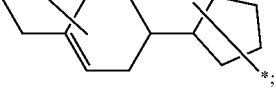
A-5

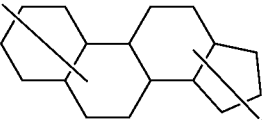
A-6

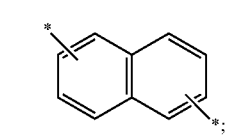
A-7

-continued

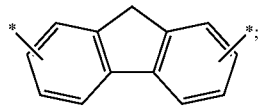
A-8

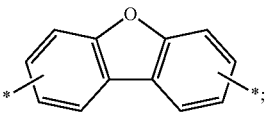
A-9

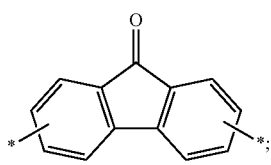
A-10

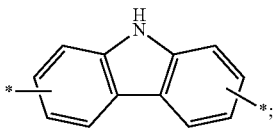
A-11

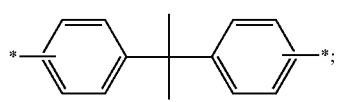
A-12

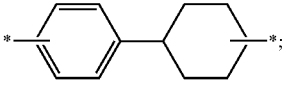
A-13

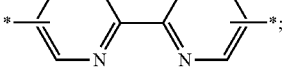
A-14

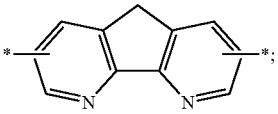
A-15

A-16

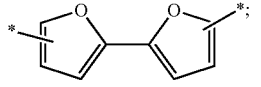
A-17

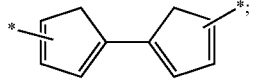
A-18

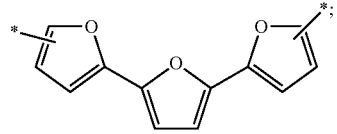
A-19

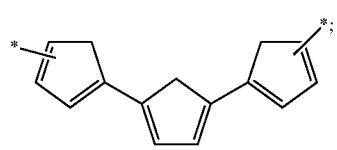
A-20

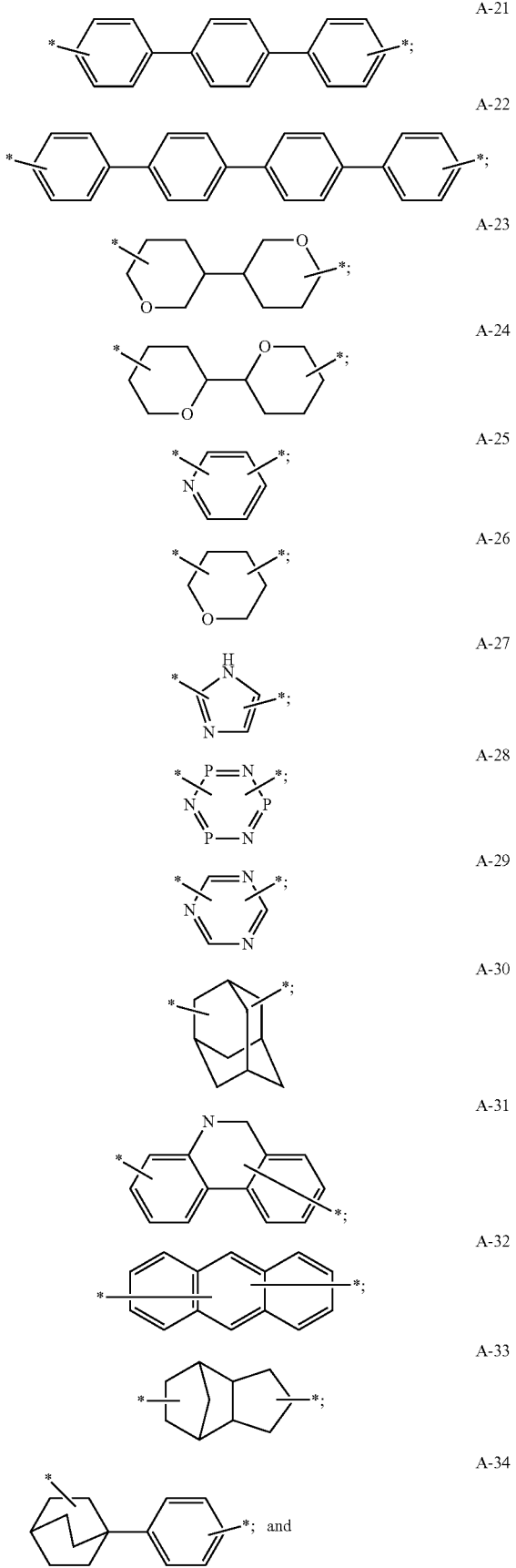

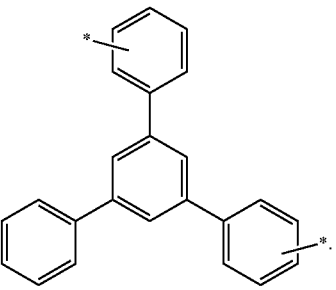

4. The method of manufacturing a curved liquid crystal display device of claim 3, wherein:

$A_1$ and $A_2$ are each independently substituted with at least one of a deuterium atom, a halogen atom, —OH, —$NH_2$, —CN, —$CF_3$, —$B(OH)_2$, and —$R^0(CH_2)_rR^1$, $R^0$ is O, NH, S, C=O, or —O—C=O, $R^1$ is OH, $NH_2$, CN, $CF_3$, $B(OH)_2$, SH, or $CH_3$, and r is an integer of 1 to 12.

5. The method of manufacturing a curved liquid crystal display device of claim 2, wherein $B_1$ and $B_2$ are each independently selected from substituted or unsubstituted ring compounds of the following A-1 to A-22:

A-1

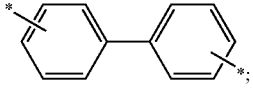

A-2

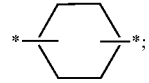

A-3

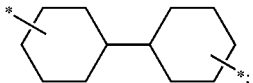

A-4

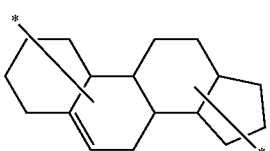

A-5

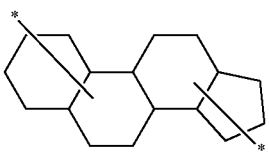

A-6

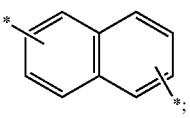

A-7

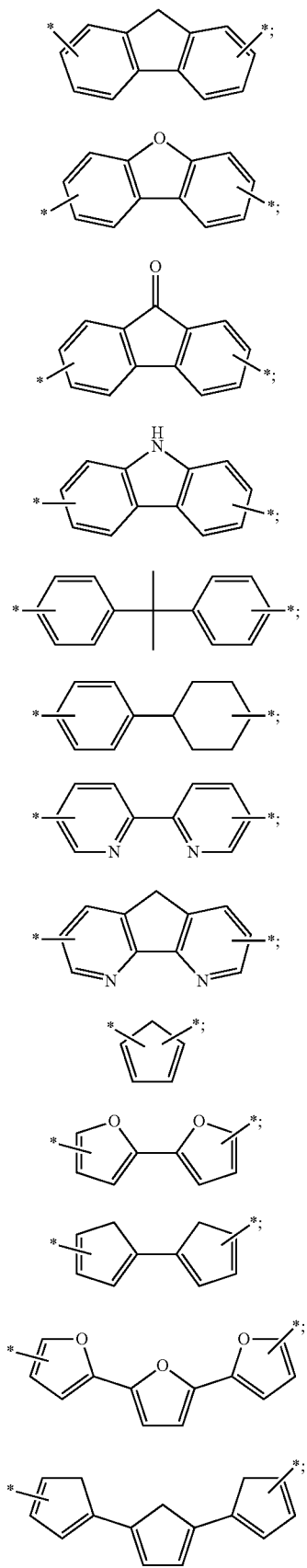
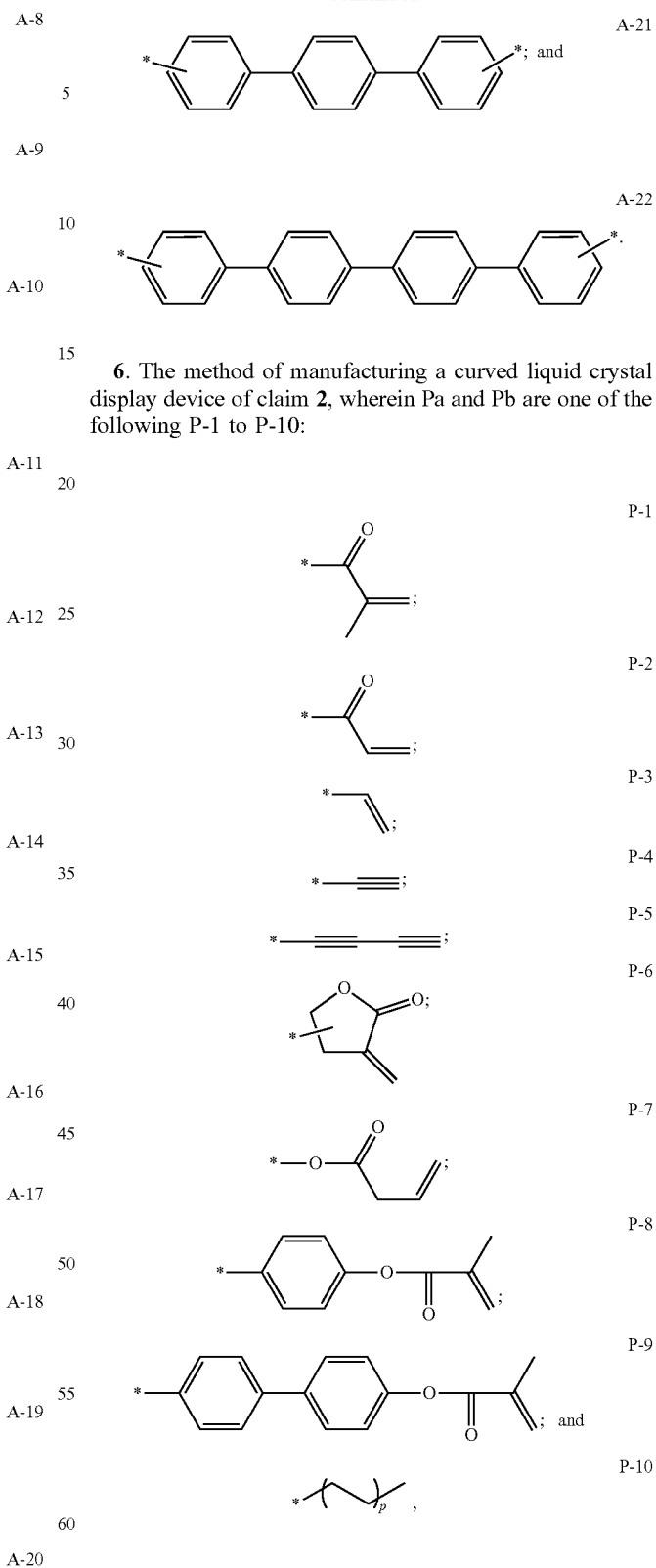
6. The method of manufacturing a curved liquid crystal display device of claim 2, wherein Pa and Pb are one of the following P-1 to P-10:
and
wherein Pa and Pb are not both P-10.
7. The method of manufacturing a curved liquid crystal display device of claim 2, wherein Pc is one of the following P-1 to P-9:

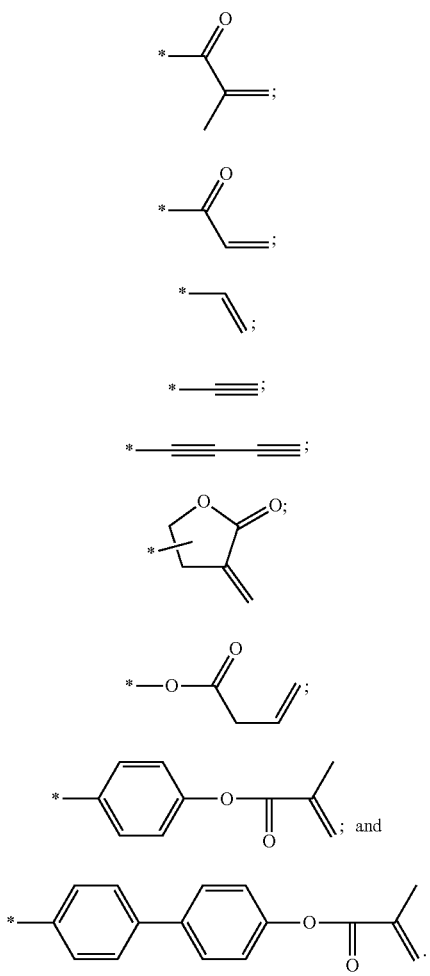

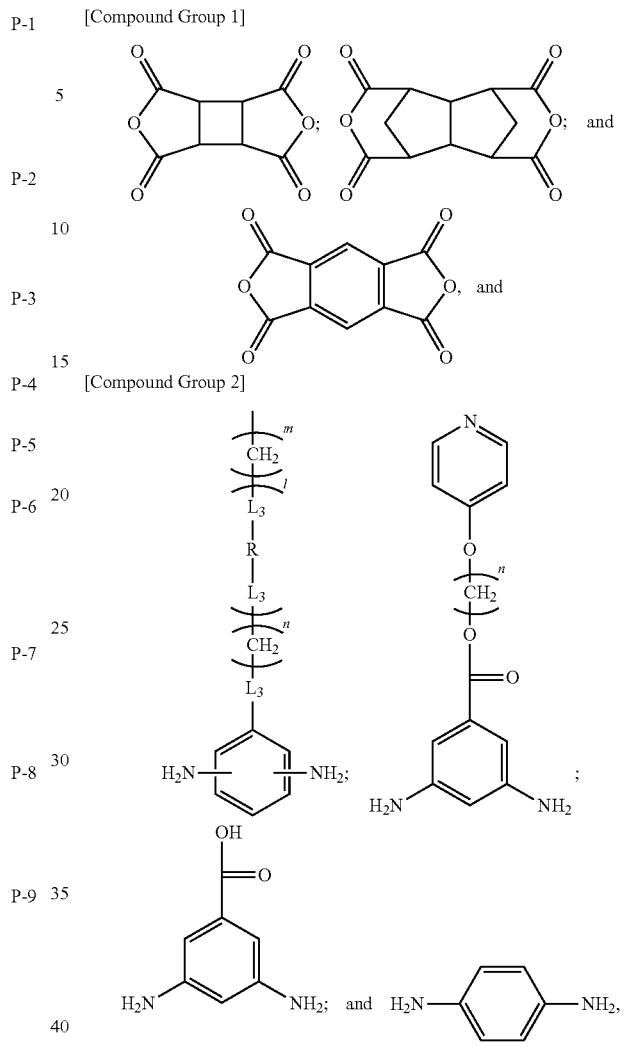

8. The method of manufacturing a curved liquid crystal display device of claim 2, wherein the reactive mesogen is provided in an amount of about 0.05 to about 0.9 parts by weight on the basis of about 100 parts by weight of the liquid crystal compound.

9. The method of manufacturing a curved liquid crystal display device of claim 2, further comprising bending the first substrate and the second substrate so that the first substrate has a first radius of curvature and the second substrate has a second radius of curvature, the second radius of curvature being less than or equal to the first radius of curvature.

10. The method of manufacturing a curved liquid crystal display device of claim 9, wherein the forming of the polyimide alignment layer comprises disposing the alignment solution on the second substrate and forming the polyimide alignment layer.

11. The method of manufacturing a curved liquid crystal display device of claim 10, wherein the alignment solution comprises at least one dianhydride compound selected from compounds in the following Compound Group 1 and at least one diamine compound selected from compounds in the following Compound Group 2:

wherein:

in Compound Group 2, n and m are each independently an integer of 1 to 12, l is an integer of 0 to 2, R is a substituted or unsubstituted divalent hydrocarbon ring or a substituted or unsubstituted divalent heterocycle, and $L_3$ is a spacer group.

12. The method of manufacturing a curved liquid crystal display device of claim 10, wherein the alignment layer comprising the polymerized reactive mesogen is formed on the first substrate.

13. The method of manufacturing a curved liquid crystal display device of claim 12, wherein the reactive mesogen further comprises a third reactive mesogen represented by the following Formula 3:

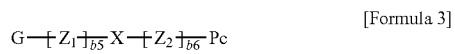

[Formula 3]

where X is one of the following X-1 to X-17:
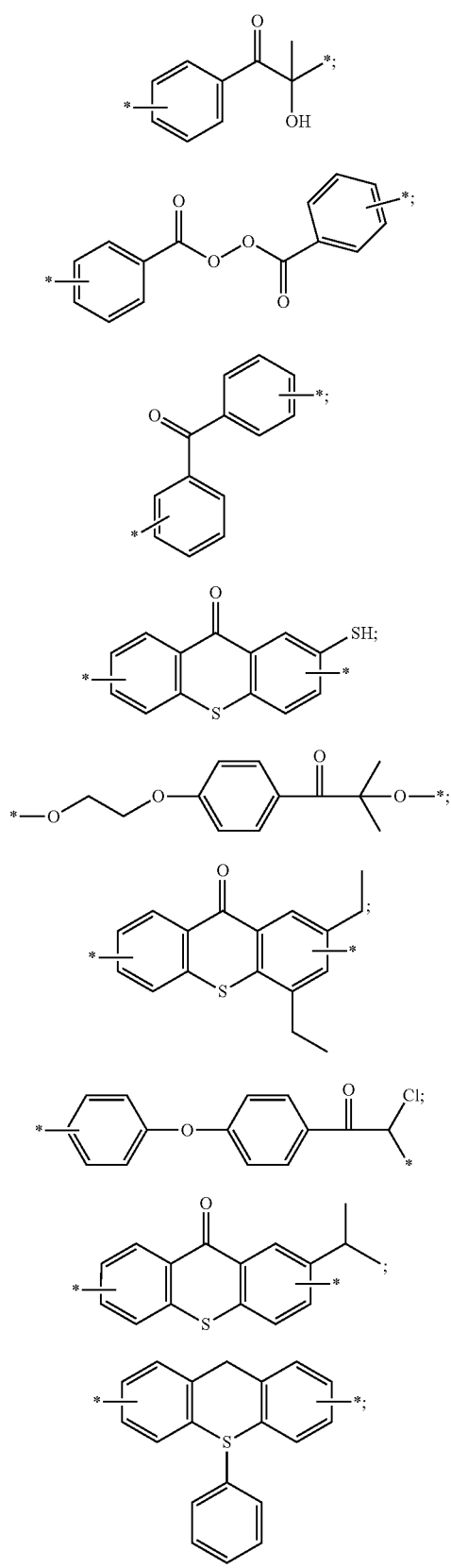
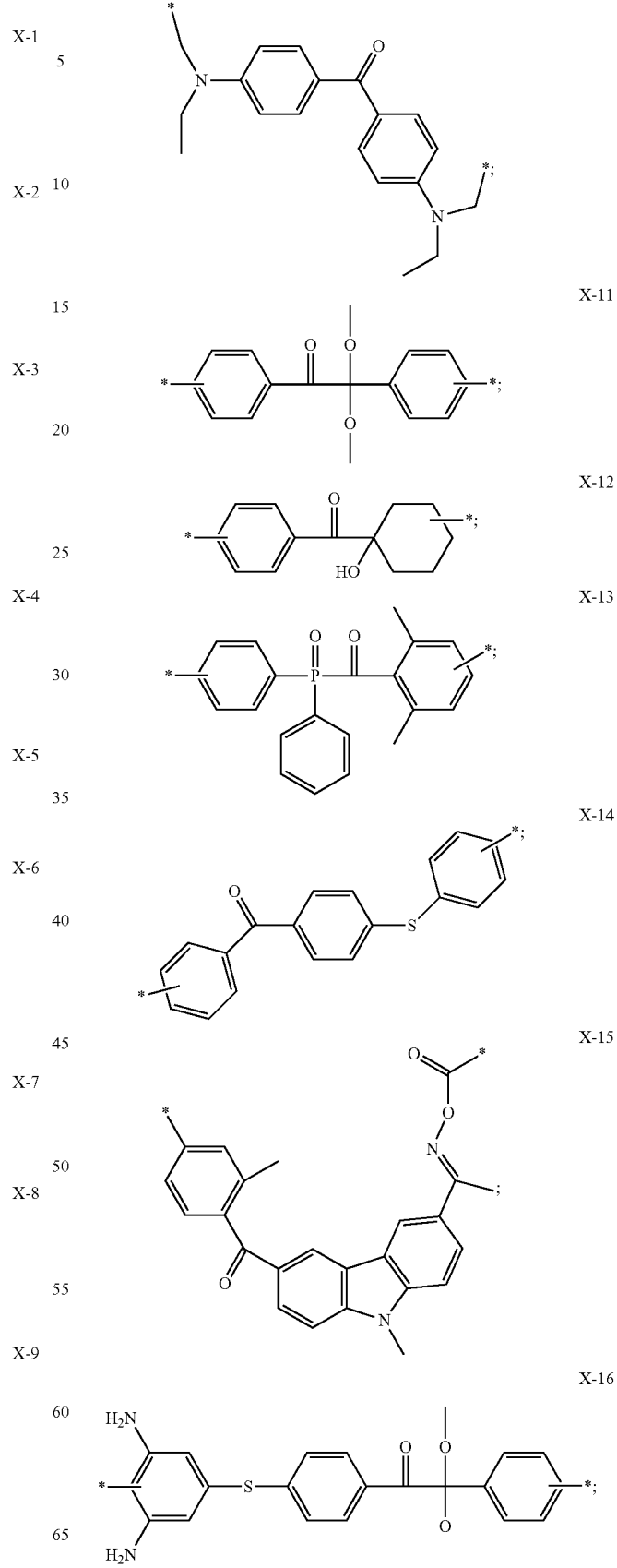

-continued and

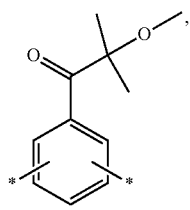
X-17 wherein:
G is a deuterium atom, a halogen atom, —OH, —NH$_2$, —CN, —CF$_3$, —B(OH)$_2$, or —R$^0$(CH$_2$)$_r$R$^1$,
R$^0$ is —O—, —NH—, —S—, —C=O, or —O—C=O,
R$^1$ is —OH, —NH$_2$, —CN, —CF$_3$, —B(OH)$_2$, —SH or —CH$_3$,
r is an integer of 1 to 12,
b5 and b6 are each independently an integer of 0 to 6, and
Z$_1$, Z$_2$ and Pc are the same as defined in claim 2.

14. The method of manufacturing a curved liquid crystal display device of claim 13, wherein the third reactive mesogen is provided in an amount of about 0.001 to about 0.6 parts by weight on the basis of about 100 parts by weight of the liquid crystal compound.

15. The method of manufacturing a curved liquid crystal display device of claim 9, wherein the forming of the polyimide alignment layer comprises disposing the alignment solution and a photoinitiator on the first substrate to form the polyimide alignment layer.

16. The method of manufacturing a curved liquid crystal display device of claim 15, wherein the alignment solution comprises:
at least one dianhydride compound selected from AH-1 to AH-3 in the following Compound Group 3,
and at least one diamine compound selected from AM-1 to AM-4 in the following Compound Group 4:

[Compound Group 3]

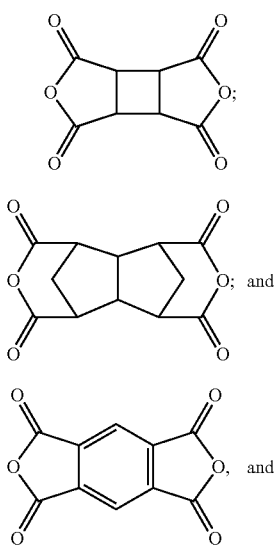

[Compound Group 4]

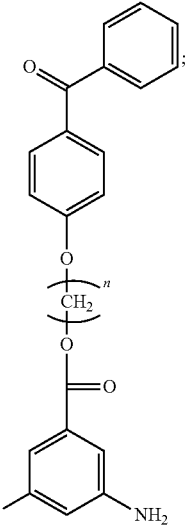
AM-1

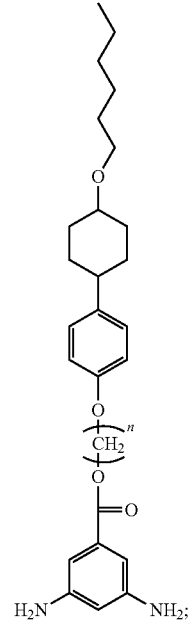
AM-2

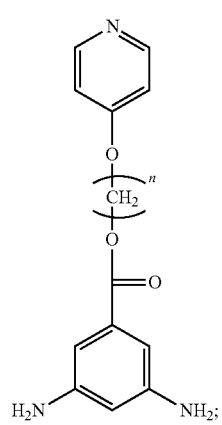
AM-3

-continued

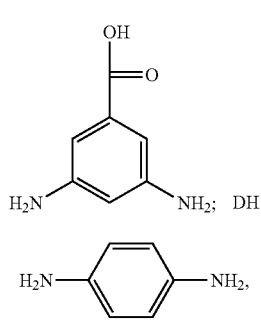

wherein:
in Compound Group 4, n is an integer of 1 to 12.

17. The method of manufacturing a curved liquid crystal display device of claim 15, wherein the alignment layer comprising the polymerized reactive mesogen is formed on the second substrate.

18. The method of manufacturing a curved liquid crystal display device of claim 1, wherein the alignment solution comprises a vertical alignment group.

19. The method of manufacturing a curved liquid crystal display device of claim 1, wherein the reactive mesogen comprises a vertical alignment group.

20. The method of manufacturing a curved liquid crystal display device of claim 1, wherein the forming of the electric field between the first substrate and the second substrate and irradiating the first ultraviolet rays at the reactive mesogen are performed in one step.

21. The method of manufacturing a curved liquid crystal display device of claim 1, wherein the disposing the reactive mesogen and disposing the liquid crystal compound are performed in one step.

22. The method of manufacturing a curved liquid crystal display device of claim 1, further comprising:
removing the electric field formed between the first substrate and the second substrate;
irradiating second ultraviolet rays at the alignment layer and the liquid crystal compound, after forming the alignment layer comprising the polymerized reactive mesogen, the second ultraviolet rays having different wavelength from the first ultraviolet rays.

23. The method of manufacturing a curved liquid crystal display device of claim 1, wherein the disposing of the alignment solution to form the polyimide alignment layer and the disposing of the reactive mesogen are performed simultaneously.

* * * * *